(12) United States Patent
Nix

(10) Patent No.: US 11,409,896 B2
(45) Date of Patent: *Aug. 9, 2022

(54) HOSTED DEVICE PROVISIONING PROTOCOL WITH SERVERS AND A NETWORKED INITIATOR

(71) Applicant: META PLATFORMS, INC., Menlo Park, CA (US)

(72) Inventor: John A. Nix, Evanston, IL (US)

(73) Assignee: META PLATFORMS, INC., Menlo Park, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/827,681

(22) Filed: Mar. 23, 2020

(65) Prior Publication Data
US 2020/0226258 A1    Jul. 16, 2020

Related U.S. Application Data

(63) Continuation of application No. 16/186,150, filed on Nov. 9, 2018, now Pat. No. 10,621,352, which is a
(Continued)

(51) Int. Cl.
*H04L 9/14* (2006.01)
*H04L 9/08* (2006.01)
(Continued)

(52) U.S. Cl.
CPC .......... *G06F 21/6218* (2013.01); *G06F 21/57* (2013.01); *H04L 9/006* (2013.01);
(Continued)

(58) Field of Classification Search
CPC ... G06F 21/57; G06F 21/6218; G06K 7/1417; H04L 63/0428; H04L 63/061;
(Continued)

(56) References Cited

U.S. PATENT DOCUMENTS 9,762,392 B2    9/2017 Carrer et al.
10,382,437 B2 *  8/2019 Bauer .................. H04L 63/0435
(Continued)

FOREIGN PATENT DOCUMENTS

WO    2014138430 A2    9/2014
WO    2014138430 A3    1/2015

OTHER PUBLICATIONS

WiFi Alliance, Device Provisioning Protocol Specification Version 1.0, Apr. 9, 2018, pp. 1-124.
(Continued)

*Primary Examiner* — Michael Simitoski
(74) *Attorney, Agent, or Firm* — Foley & Lardner LLP

(57) ABSTRACT

A network can operate a WiFi access point with credentials. An unconfigured device can (i) support a Device Provisioning Protocol (DPP), (ii) record responder bootstrap public and private keys, and (iii) be marked with a tag. The network can record initiator bootstrap public and private keys, as well as derived initiator ephemeral public and private keys. An initiator can (i) operate a DPP application, (ii) read the tag, (iii) establish a secure and mutually authenticated connection with the network, and (iv) send the network data within the tag. The network can record the responder bootstrap public key and derive an encryption key with the (i) recorded responder bootstrap public key and (ii) derived initiator ephemeral private key. The network can encrypt credentials using the derived encryption key and send the encrypted credentials to the initiator, which can forward the encrypted credentials to the device, thereby supporting a device configuration.

21 Claims, 16 Drawing Sheets

Related U.S. Application Data continuation of application No. 16/033,996, filed on Jul. 12, 2018, now Pat. No. 10,169,587.

(60) Provisional application No. 62/664,057, filed on Apr. 27, 2018.

(51) Int. Cl.

| | | |
|---|---|---|
| *H04L 9/32* | (2006.01) | |
| *H04W 12/04* | (2021.01) | |
| *H04W 12/041* | (2021.01) | |
| *G06F 21/62* | (2013.01) | |
| *G06F 21/57* | (2013.01) | |
| *H04W 12/50* | (2021.01) | |
| *H04L 9/00* | (2022.01) | |
| *H04L 9/40* | (2022.01) | |
| *H04W 12/06* | (2021.01) | |
| *H04W 4/60* | (2018.01) | |
| *H04W 12/08* | (2021.01) | |
| *G06K 7/14* | (2006.01) | |
| *H04W 84/12* | (2009.01) | |
| *H04W 88/02* | (2009.01) | |
| *H04W 4/70* | (2018.01) | |
| *H04W 4/80* | (2018.01) | |

(52) U.S. Cl.
CPC .......... *H04L 9/0838* (2013.01); *H04L 9/0844* (2013.01); *H04L 9/14* (2013.01); *H04L 9/3226* (2013.01); *H04L 63/0428* (2013.01); *H04L 63/061* (2013.01); *H04L 63/068* (2013.01); *H04L 63/08* (2013.01); *H04L 63/0838* (2013.01); *H04L 63/0876* (2013.01); *H04W 4/60* (2018.02); *H04W 12/04* (2013.01); *H04W 12/041* (2021.01); *H04W 12/06* (2013.01); *H04W 12/08* (2013.01); *H04W 12/50* (2021.01); *G06K 7/1417* (2013.01); *H04W 4/70* (2018.02); *H04W 4/80* (2018.02); *H04W 84/12* (2013.01); *H04W 88/02* (2013.01)

(58) Field of Classification Search
CPC ... H04L 63/068; H04L 63/08; H04L 63/0838; H04L 63/0876; H04L 9/006; H04L 9/0838; H04L 9/0844; H04L 9/14; H04L 9/3226; H04W 12/04; H04W 12/041; H04W 12/06; H04W 12/08; H04W 12/50; H04W 4/60; H04W 4/70; H04W 4/80; H04W 84/12; H04W 88/02

See application file for complete search history.

(56) References Cited

U.S. PATENT DOCUMENTS

| | | | | |
|---|---|---|---|---|
| 10,613,805 | B2* | 4/2020 | Tsuji | H04W 12/0431 |
| 10,873,842 | B2* | 12/2020 | McCann | H04W 12/50 |
| 10,979,412 | B2* | 4/2021 | Lambert | H04L 63/08 |
| 2007/0028106 | A1 | 2/2007 | Lauter et al. | |
| 2007/0043946 | A1* | 2/2007 | Lauter | H04L 9/0844 |
| | | | | 713/171 |
| 2011/0075589 | A1* | 3/2011 | Bradley | H04W 48/16 |
| | | | | 370/254 |
| 2015/0229475 | A1 | 8/2015 | Benoit et al. | |
| 2015/0257176 | A1* | 9/2015 | Vyas | H04W 76/40 |
| | | | | 370/338 |
| 2016/0360407 | A1 | 12/2016 | Benoit et al. | |
| 2017/0257819 | A1 | 9/2017 | Mccann et al. | |
| 2017/0295448 | A1 | 10/2017 | Mccann et al. | |
| 2017/0331679 | A1 | 11/2017 | Whittaker | |
| 2018/0069851 | A1 | 3/2018 | Terao | |
| 2018/0109381 | A1 | 4/2018 | Cammarota et al. | |
| 2018/0109418 | A1 | 4/2018 | Cammarota et al. | |
| 2018/0132092 | A1 | 5/2018 | Choi et al. | |
| 2018/0137261 | A1 | 5/2018 | Lattin et al. | |
| 2018/0248694 | A1 | 8/2018 | Benoit et al. | |
| 2018/0270049 | A1 | 9/2018 | Cammarota et al. | |
| 2018/0278625 | A1 | 9/2018 | Cammarota et al. | |
| 2019/0089532 | A1* | 3/2019 | Lambert | H04L 63/08 |

OTHER PUBLICATIONS

Wikipedia, Elliptic-curve Diffie-Hellman, Mar. 9, 2018, pp. 1-2.
IEEE, Std 802.11ac-2013, Part 11: Wireless LAN Medium Access Control (MAC) and Physical Layer (PHY) Specifications, Annex E, Dec. 11, 2013, pp. 406-412.
NIST Special Publication 800-56A Revision 3, Recommendation for Pair-Wise Key-Establishment Schemes Using Discrete Logarithm Cryptography, Apr. 2018, pp. 1-152.
D. Harkins, Public Key Exchange, IETF draft-harkins-pkex-05, Jan. 24, 2018, pp. 1-44.
Wikipedia, Elgamal Encryption, Apr. 18, 2018, pp. 1-4.
Lan, Zuowen. "An improvement on a three-party authentication key exchange protocol using elliptic curve cryptography." Journal of Convergence Information Technology 5.4 (201 0): 120. (Year: 2010).
International Search Report and Written Opinion for application No. PCT/US2019/027968, dated Jul. 16, 2019, 166 pages.
Anonymous: 11 Wi-Fi Alliance Device Provisioning Protocol (DPP)—Draft Released for Public Review and Comments v0.0.23, WiFi Alliance, vol. v.0.0.23, Jul. 26, 2016, pp. 1-89, XP009501333, Retrieved from the Internet: URL:https://www.wi-fi.org/downloads-registered-guest/WiFi_DPP_Tech_Spec_v0_0_23.pdf pp. 24 and 45-50.
Wikipedia: "Hash table—Wikipedia", Jan. 31, 2018, pp. 1-17, XP055602768, Retrieved from the Internet: URL: https://en.wikipedia.org/w/index.php?title=Hash_table&oldid=823310127 [retrieved on Jul. 5, 2019] p. 1.

\* cited by examiner

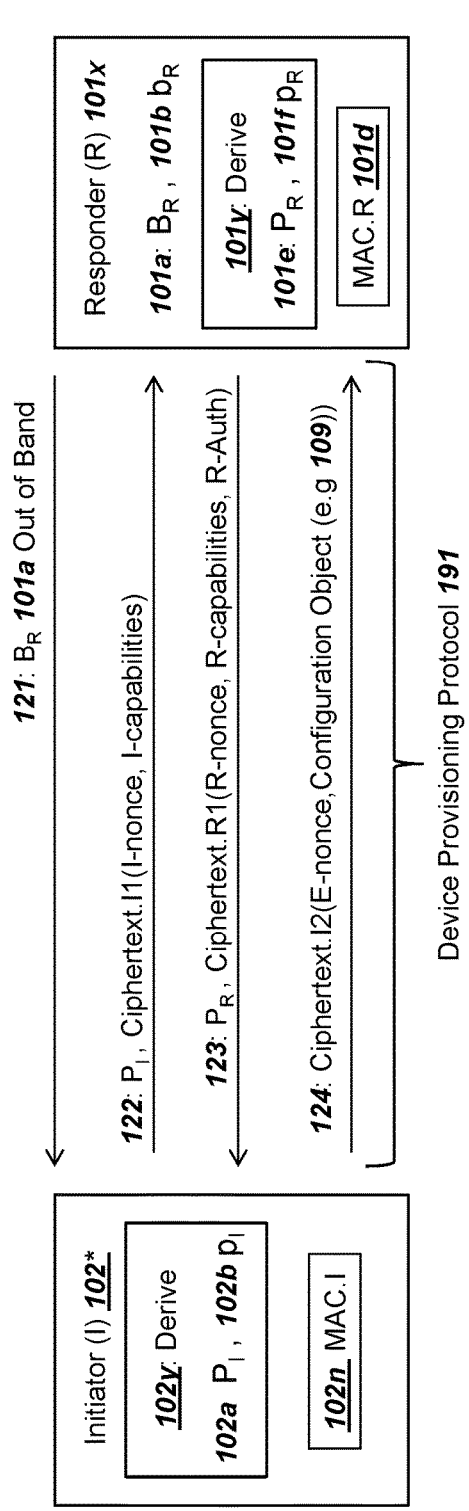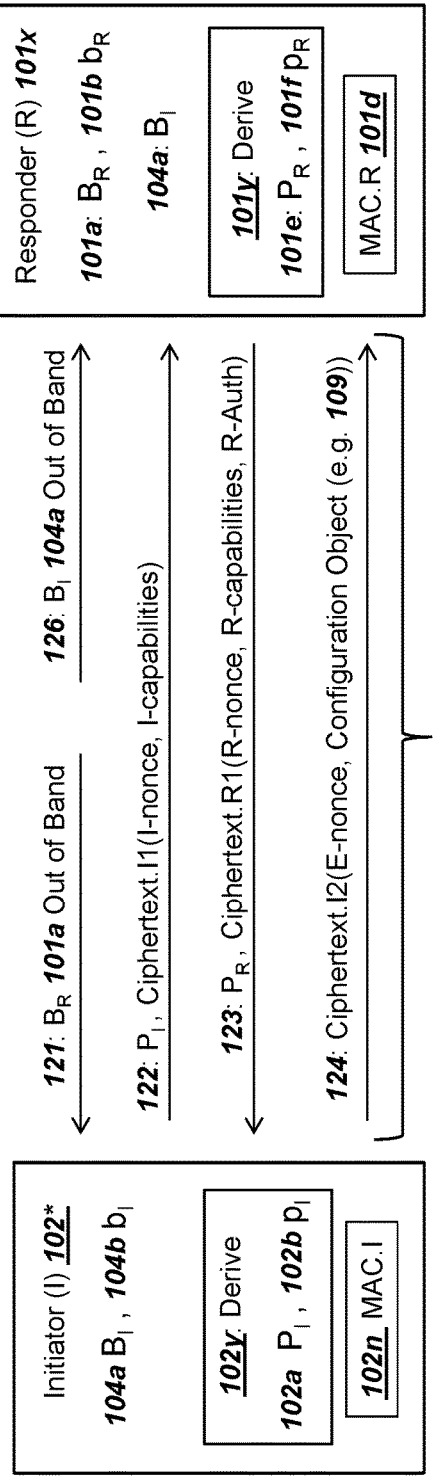

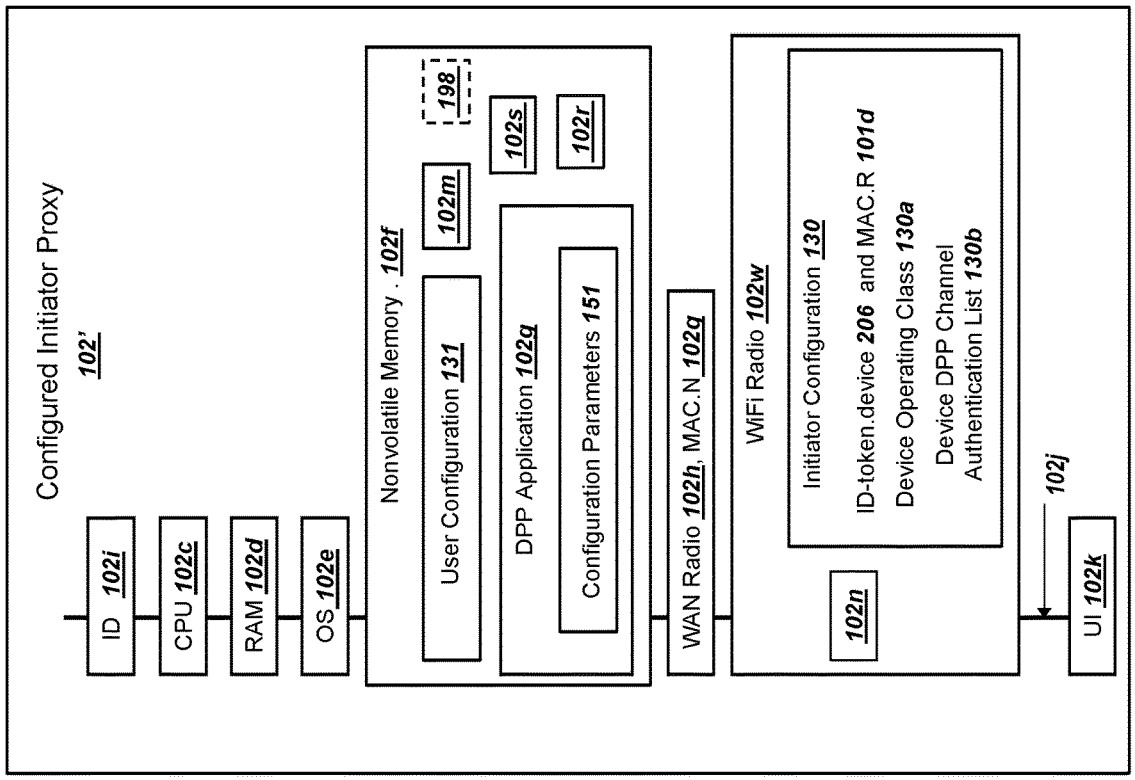
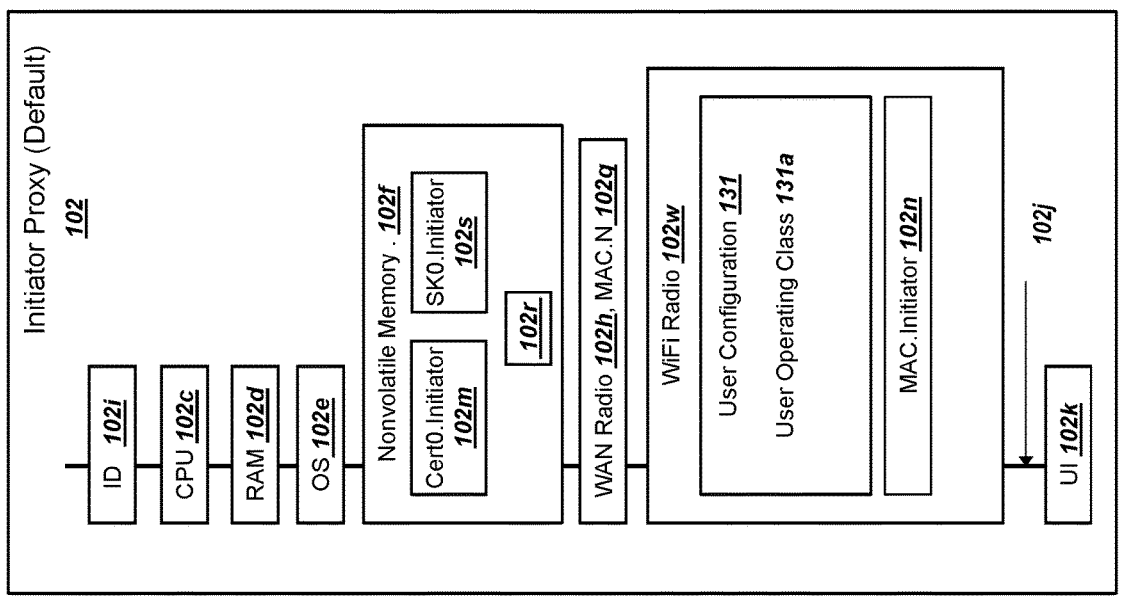
Figure 1d

Figure 2b

Device Database 104

| ID-token. Device 206 | Device Identity 101i | MAC. Responder 101d | Global Operating Class 130a | Channel List 130b | Cryptog. Params 199 |
|---|---|---|---|---|---|
| IRLRNZXW | 20001 | 38607720A | 81 | 12, 13 | A |
| QFIXHKMC | 20002 | 386077209 | 83 | 2,7, 9 | A |
| KOWXGVTS | 20003 | 386077400 | 84 | 5, 6 | A, B |
| VPMJSLMV | 20004 | 3860773cc | 117 | 40 | A, C |
| WKYPUABJ | 20005 | 386077a09 | 125 | 149, 153 | A, D |
| ● ● ● | | | | | |

Key Table 104k

| PKEX Key 198 | Responder Bootstrap Public Key 101a | Initiator Bootstrap Public Key 104a | Initiator Bootstrap Private Key 104b |
|---|---|---|---|
| X1 | Br-1 | Bi-1 (Shared bi-1 | |
| X2 | Br-2 | Bi-1  Keys) bi-1 | |
| NA | | Bi-3(A), Bi-3(B) | bi-3(A), bi-3(B) |
| X4 | Br-4(A), Br-4(C) | Bi-4(A), Bi-4(C) | bi-4(A), bi-4(C) |
| X5 | Br-5(A), Br-5(D) | Bi-5(A), Bi-5(D) | bi-5(A), bi-5(D) |

(Unique Keys)

Cryptographic Parameters 199

Parameters Table 104p

| Set 199a | Key Length 199b | Curve 199c | Hash 199e | AES-SIV Key Length 199f | Nonce Length 199g |
|---|---|---|---|---|---|
| A | 256 | p256 | SHA-256 | 256 | 128 |
| B | 384 | p384 | SHA-384 | 384 | 192 |
| C | 512 | secp521r1 | SHA-512 | 512 | 256 |
| D | 384 | Curve25519 | SHA-3 | 384 | 192 |
| ● ● ● | | | | | |

Device Database 104

Device Table 104d

| ID-token. Device 206 | Initiator Bootstrap Keys Seq. # 197 | PKEX Key 198 | Responder Bootstrap Public Key 101a | Initiator Bootstrap Public Key 104a | Initiator Bootstrap Private Key 104b |
|---|---|---|---|---|---|
| IRLRNZXW | 1 | X1a | Br-1 | Bi-1a | bi-1a |
| IRLRNZXW | 2 | X1b | Br-1 | Bi-1b | bi-1b |
| IRLRNZXW | 3 | X1c | Br-1 | Bi-1c | bi-1c |
| IRLRNZXW | 4 | X1c | Br-1 | Bi-1d | bi-1d |
| ● ● ● | | | | | |

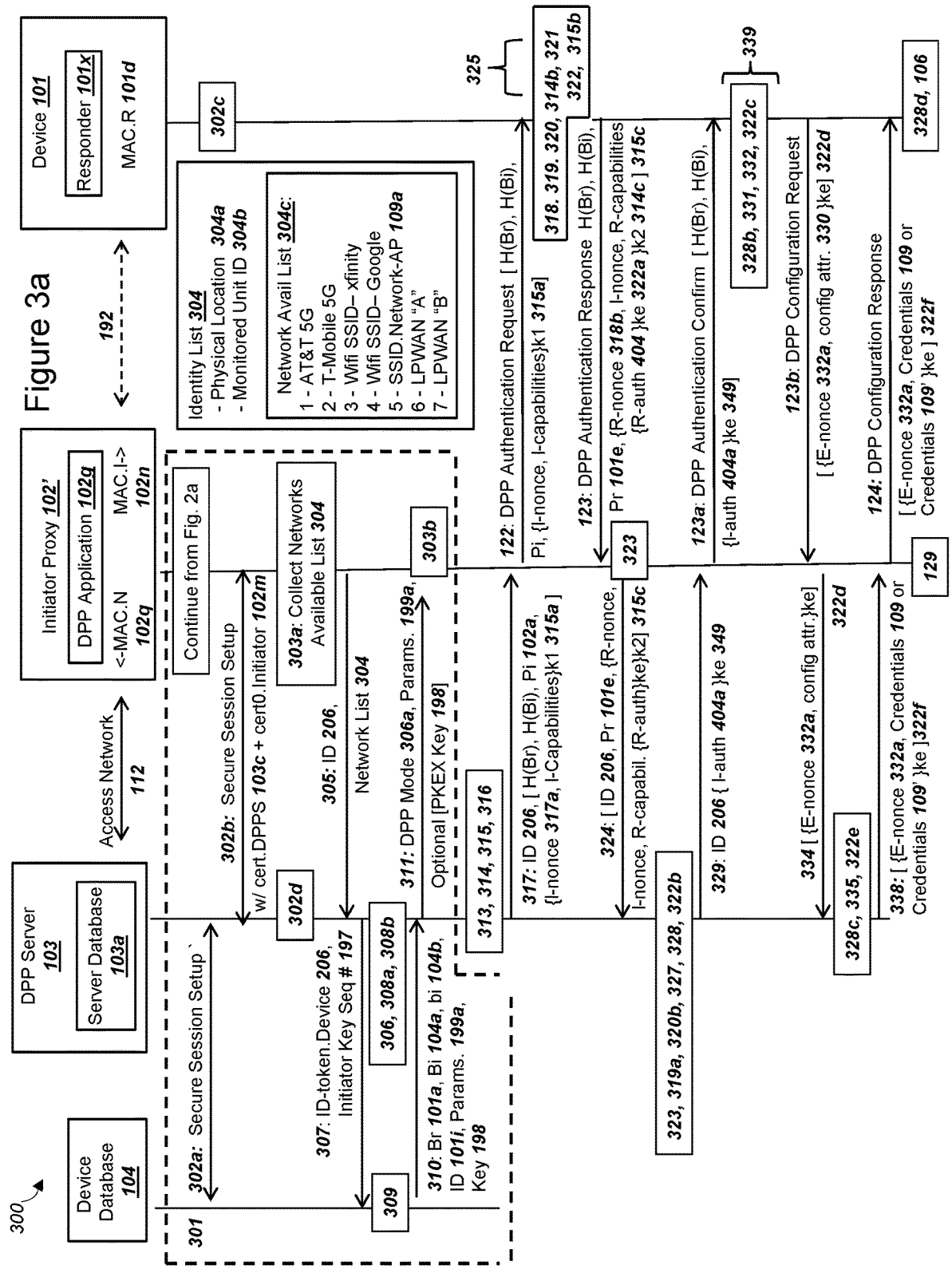

Figure 3b

Server Database 103a

| iD-token.Device 206 | MAC. Responder 101d | MAC. Initiator 102q | Initiator Mode 306a | Cryptog. Params 199a | Initiator Ephem. Public Key 102a | Initiator Ephem. Private Key 102b | Resp. Ephem. Public Key 101e | Initiator Bootstrap Keys Seq.# 197 | Bootstrap keys 399 | PKEX Key 198 | Shared Secret k1 314a | Shared Secret k2 314c | Shared Secret ke 327a |
|---|---|---|---|---|---|---|---|---|---|---|---|---|---|
| IRLRNZXW | 386077204 | 6cf049080 | Fig. 3 | A | Pi-1 | pi-1 | Pr-1 | 4 | Br-1, Bi-1, bi-1 | X1 | k1-1 | k2-1 | ke-1 |
| QFIXHKNC | 386077209 | 1c6f654d2 | Fig 5a | A | - | - | Pr-2 | 1 | Br-2, Bi-1, bi-1 | NA | - | - | - |
| KOWXGVTS | 386077400 | 7071bce29 | Fig 5b | B | - | pi-3 | Pr-3 | 2 | {Br-3, Bi-3, bi-3} B | NA | - | - | - |
| VPMJSLMV | 386077Jcc | 7071bce29 | Fig 3 | A | Pi-4 | pi-4 | Pr-4 | 1 | {Br-4, Bi-4, bi-4} A | X4 | k1-4 | k2-4 | ke-4 |
| WKYPUABJ | 386077a09 | 7071bce29 | 102" | D | - | - | - | 1 | {Br-5, Bi-5, bi-5} D | X5 | - | - | - |

Device Credentials Table 340

| iD-token.Device 206 | Selected Network (Primary) 308aa | Selected Network (Backup) 308ab | Primary Network Credentials 109 | Backup Network Credentials 109 |
|---|---|---|---|---|
| IRLRNZXW | 109a - 1 | 304a - 3 | 109 - 1 | From xFinity |
| QFIXHKNC | 109a - 1 | 304a - 6 | 109 - 1 | From LPWAN A |
| KOWXGVTS | 304c - 2 | 109a - 1 | From T-Mobile | 109 - 1 |
| VPMJSLMV | 304c - 4 | 109a - 2 | From Google | 109 - 2 |
| WKYPUABJ | 109a - 3 | 304a - 4 | 109 - 3 | From Google |

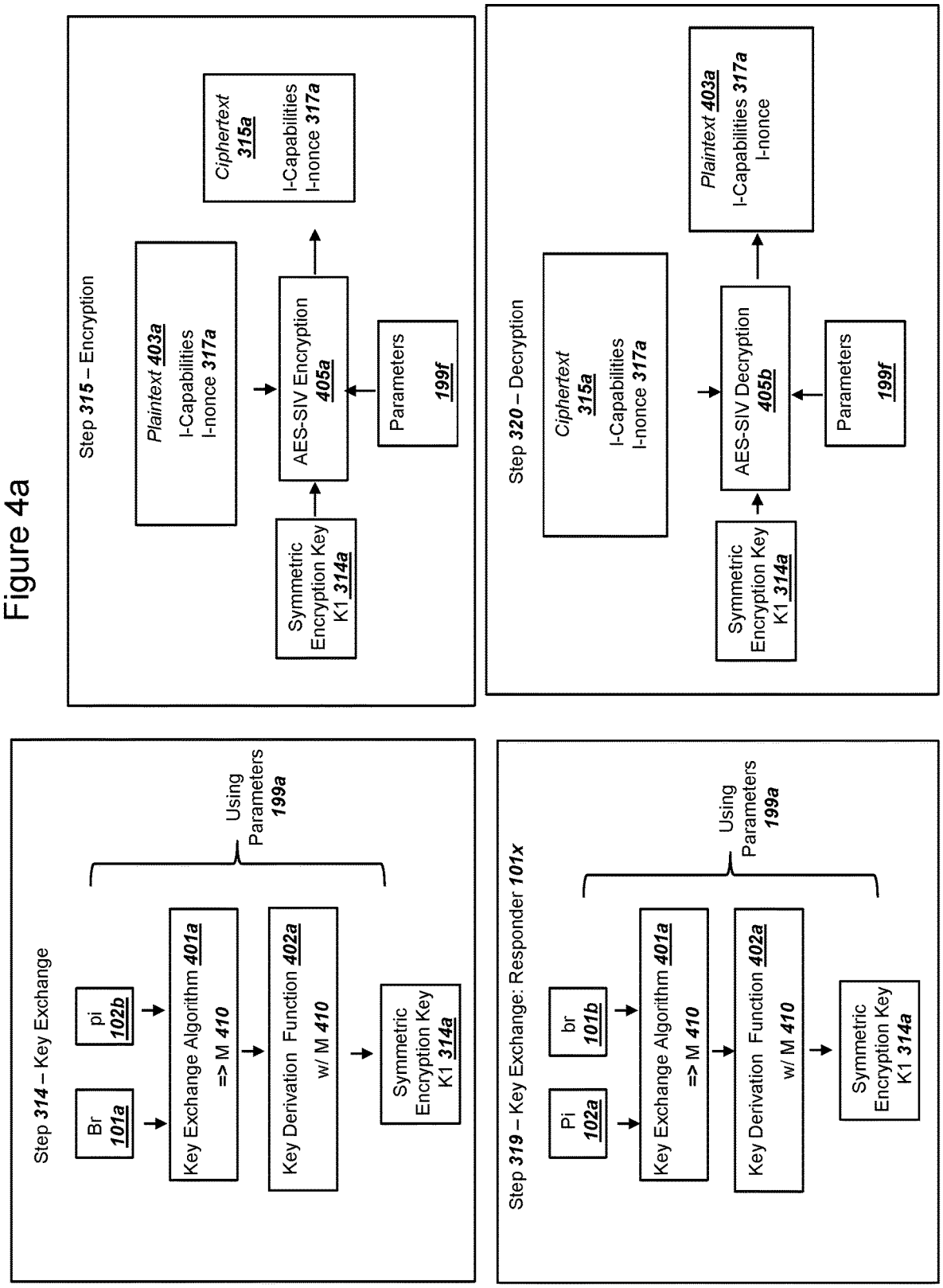

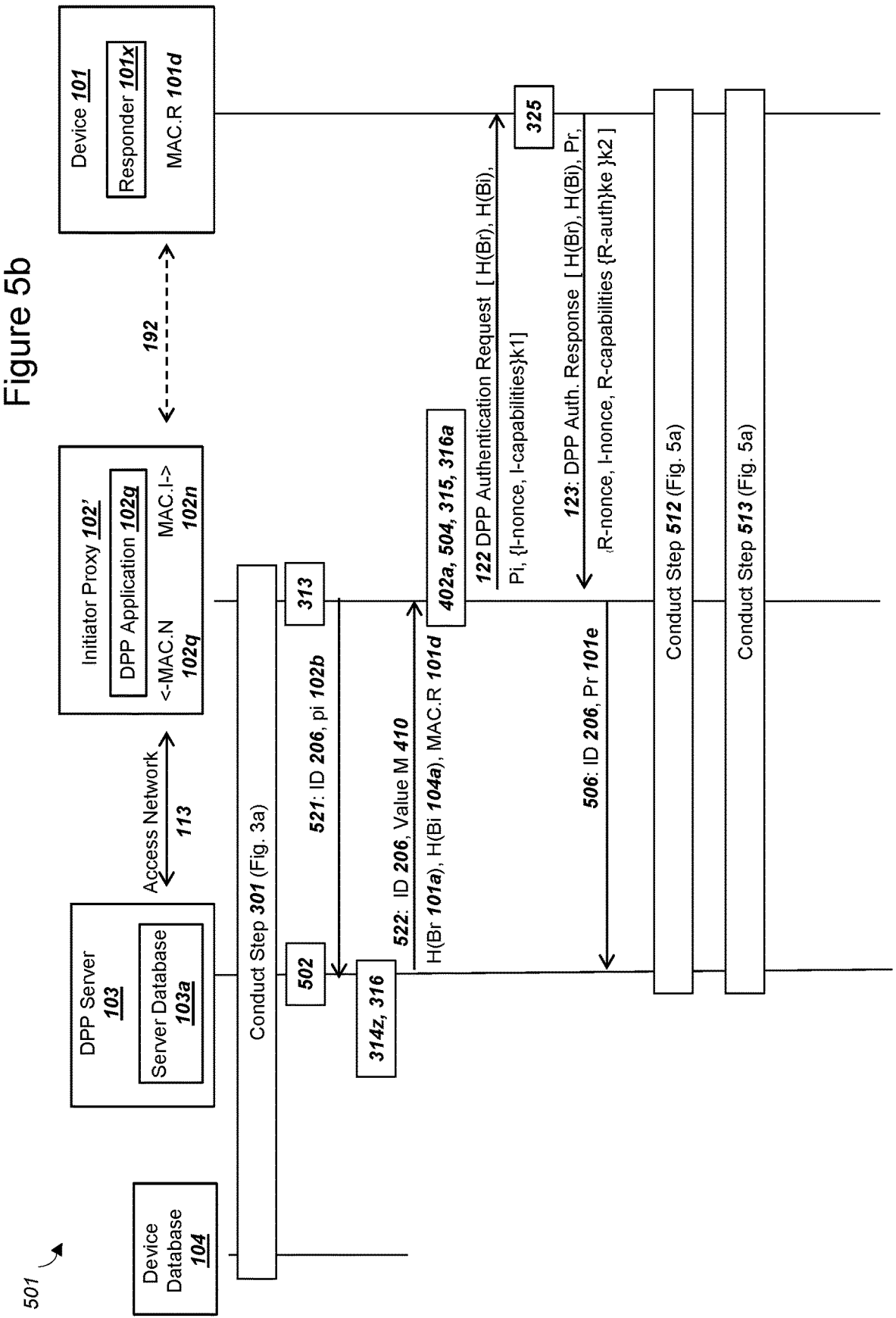

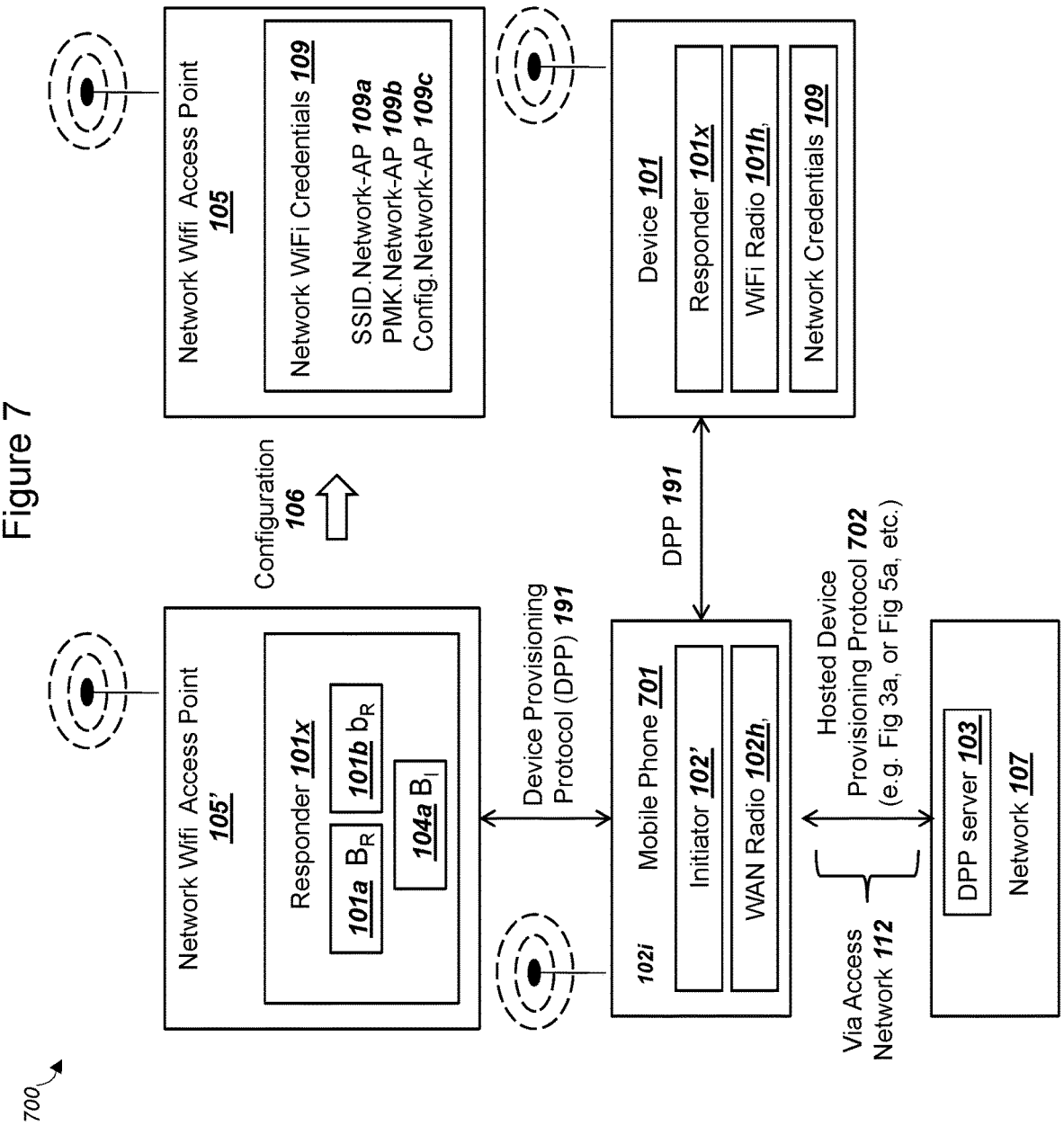

HOSTED DEVICE PROVISIONING PROTOCOL WITH SERVERS AND A NETWORKED INITIATOR

CROSS-REFERENCE TO RELATED APPLICATIONS

The present application is a continuation of U.S. application Ser. No. 16/186,150 filed on Nov. 9, 2018, which in turn is a continuation of U.S. application Ser. No. 16/033,996 filed Jul. 12, 2018 that issued as U.S. patent Ser. No. 10/169,587 on Jan. 1, 2019, which claims priority to U.S. Provisional Patent Application No. 62/664,057, filed Apr. 27, 2018. These applications are herewith incorporated by reference into the present application in their entirety.

BACKGROUND

Technical Field

The present systems and methods relate to authentication and configuration of WiFi radios, and more particularly, to using a Device Provisioning Protocol with a networked initiator and a set of servers that record PKI keys, in order securely transfer a set of credentials to a device.

Description of Related Art

The ability to connect transducers such as sensors and actuators with a network is a growing field with many economical applications. As the costs for both electronic hardware and bandwidth continue to decrease, the use of networked transducers is expected to continue increasing over the coming decades. Connecting transducers to a network can be referred to as "machine-to-machine (M2M) communications" or "the Internet of Things (IoT)." Among many potential benefits, IoT technologies allow automated monitoring and/or control of assets, equipment, personnel, or a physical location where manual monitoring may not be economical. Many applications for the "Internet of Things" significantly reduce costs by using automated monitoring instead of manual techniques. Prominent examples of IoT applications today include monitoring and control for building heating/air-conditioning, automobiles, alarm systems, and tracking devices. Fast growing markets for IoT applications today include health applications such as the remote monitoring of a person's fitness activity, heartbeat, or glucose levels, monitoring of industrial equipment deployed remotely in the field, and also security systems.

Many IoT applications can leverage wireless networking technologies, in addition to wired technologies such as Ethernet. Wireless technologies such as wireless local area networks and wireless wide area networks have proliferated around the world over the past 30 years, and usage of these wireless networks is also expected to continue to grow. Wireless local area network (LAN) technologies include WiFi based on the series of 802.11 standards from the Institute of Electrical and Electronics Engineers (IEEE). The many options to connect a transducer device to a wireless network creates opportunities for new products and services, but also creates several classes of problems that need to be solved. Many of these problems or needs in the art pertain to securely and efficiently configuring the transducer devices. A need exists in the art to allow a user or a network to securely and easily upload to the device a set of network access credentials for a wireless network.

Manually configuring devices to (i) use different security keys, (ii) apply new network access credentials to connect with the owner's selected wireless network, and/or (iii) update running firmware can be time consuming and difficult for users. Entering network access credentials is also prone to errors and especially difficult for devices with limited user interfaces, where a limited user interface is common for many devices supporting applications for the "Internet of Things". Loading credentials and network configuration into a device in order to obtain connectivity to a network can also be known as device provisioning or device configuration. In an attempt to address these needs to simplify or automate device provisioning, the WiFi Alliance™ released a Device Provisioning Protocol (DPP) specification on Apr. 9, 2018 as version 1.0 (DPPv1.0). Although the DPPv1.0 defines a series of messages between an initiator and a responder in order to support a device configuration, several unmet needs remain in the art in order to securely and easily deploy a Device Provisioning Protocol at wide scale with potentially billions of devices over many years.

To highlight one example unmet need by a DPPv1.0, WiFi capable devices currently being designed and deployed may have an expected life of more than a decade. During that timeframe, the device may need to undergo a configuration or device provisioning step more than one time. Reasons could include either (i) the device undergoes a "factory reset", or (ii) the device needs to be provisioned a second time, such as if the device owner changes or the device is moved to a different network, and other reasons exist as well. But, as stated in DPPv1.0, "threats against this bootstrapping method are possible if public keys and/or codes are reused." A need exists in the art to support a Device Provisioning Protocol in a manner where bootstrapping public keys can be securely reused. A need exists in the art for bootstrapping PKI keys to be securely updated after a first instance of conducting a DPP, such that the updated bootstrapping PKI keys can be subsequently used at a later time for a second instance of conducting a DPP.

In order to securely provision a device, a device may prefer to conduct mutual authentication with an initiator that records and operates with initiator PKI keys. The device could be a high value piece of equipment, such as an automobile, health monitoring equipment in a hospital, or industrial equipment, etc. that could be targets for potential hackers seeking to "provision" the devices to a network under their control or a network providing the hackers access to the device. In these cases, an owner or user of a device may prefer that a device provisioning protocol use mutual authentication. The DPPv1.0 supports mutual authentication in order to securely authenticate a device and an initiator before transferring network access credentials to the device, but creates a new and shifted problem of both (i) securely providing an initiator bootstrap private key to an initiator and (ii) the corresponding initiator bootstrap public key to a target device for configuration. In other words, recording an initiator bootstrap public key in a device can be difficult if there is no pre-existing relationship or communication between a device and an initiator before the start of a device provisioning protocol. In addition, an insecure initiator may have no pre-existing relationship with a target network to provide connectivity to the device, yet the network may need to securely transfer credentials to the device through the insecure initiator. A need exists in the art to securely and readily enable an initiator to have access to an initiator bootstrap private key while also enabling a device to have access to the corresponding initiator bootstrap public key A need exists in the art for a network to securely transfer credentials to a device though an insecure initiator.

With the widespread deployment of WiFi access points, a device may have access to potentially a plurality of different access points associated with potentially different networks. Although DPPv1.0 supports configuration of a device, DPPv1.0 does not suggest (i) which of a possible plurality of potential different access points should be selected, nor (ii) how credentials for a selected access point could be obtained by an initiator. Need exists in the art for an initiator to automatically determine a list of available networks and to automatically and securely receive a set of credentials for a preferred network for the device. A need exists in the art for the credentials to be encrypted in a manner such that the initiator cannot feasibly read the credentials, but the device can receive the encrypted credentials and convert the encrypted credentials into plaintext form in order for the device to load and use the plaintext credentials.

A network can use DPPv1.0 in order to connect devices to the network using an initiator. The security for conducting a device provisioning protocol according to DPPv1.0 depends on the security of an initiator, since as envisioned by DPPv1.0 the initiator (i) records an initiator bootstrap private key and (ii) conducts key exchanges with the initiator bootstrap private key. However, an initiator for conducting a DPP may be outside the control of a network and may also be an insecure device. An initiator could be a "rooted" mobile phone operated by a hacker, as one example. Or, the initiator could simply be a mobile device that is insecure or operates with security policies that do not meet the standards of the network. A need exists in the art for an insecure initiator to conduct a device provisioning protocol that is compatible with DPPv1.0, while simultaneously keeping (i) the initiator bootstrap private key and (ii) cryptographic operations with the initiator bootstrap private key under the control or within the security policies of a network.

The secure use of a device provisioning protocol can depend on an initiator having access to a responder bootstrap public key. Access to the responder bootstrap public key for the initiator is described in DPPv1.0 as supported in an "out of band" operation. The security of a device provisioning protocol can depend on the security of the steps for an initiator to gain access to the responder bootstrap public key. The initiator could also comprise an insecure device, as described in the paragraph above. If the responder bootstrap public key is externally readable by an initiator, such as contained in a QR code, then potentially many different initiators could read the responder bootstrap public key and attempt a DPP with a device. Although this ease may be preferred for some devices and applications, many devices may require a higher level of security such that a responder bootstrap public key can only be accessed by an authorized initiator. A need exists in the art for an initiator to have access to a responder bootstrap public key, while simultaneously keeping the responder bootstrap public key secured.

Many other examples exist as well for needs in the art to support efficient yet secure device configuration or provisioning, and the above are examples are just a few and intended to be illustrative instead of limiting.

SUMMARY

Methods and systems are provided for a networked initiator to conduct a device provisioning protocol (DPP) with a responder operating in a device. The device provisioning protocol can support the Device Provisioning Protocol specification version 1.0 and subsequent versions from the WiFi Alliance™. Conducting a DPP with a device can transfer a set of network credentials to the device, in order for the device to connect with a network using the network credentials. The set of network credentials can also include a network configuration, where the network configuration includes settings to use with a WiFi radio in the device, in order for the WiFi radio to communicate with other nodes with the credentials, including an access point which can provide connectivity to an IP network for the device.

A device can operate a responder, which listens for an authentication request from an initiator. The responder can record and operate an initiator configuration, specifying a frequency band to utilize, a WiFi networking technology to implement (e.g. 802.11 ac, 802.11ah, etc.) and a channel list. When the device is awake or powered on, the responder can listen for incoming authentication requests using a WiFi radio for the device. The responder can record a responder bootstrap public key, a responder bootstrap private key, and, when supporting mutual authentication with an initiator, an initiator bootstrap public key. The PKI keys can be associated with a selected set of cryptographic parameters, where the parameters specify settings to use for cryptographic operations with the PKI keys by a responder. The responder can also include a random number generator, a PKI key pair generation algorithm, a secure hash algorithm, an elliptic curve Diffie Hellman (ECDH) key exchange algorithm, and a symmetric ciphering algorithm. The device with the responder can be marked with a tag, such that the tag records an identity for the device and a uniform resource locator (URL) for a server or a file on a server.

A network can operate an access point, where the access point operates with a set of credentials. The credentials can include an identifier for the network such a service set identifier (SSID), a pairwise master key (PMK) or a pre-shared key (PSK), a pairwise master key identifier (PMKID), and also a configuration. The access point can support wireless networking standards in the series of 802.11 standards. A network can also operate a plurality of access points. The network can operate or be associated with a Device Provisioning Protocol (DPP) server, a device database, an authentication server, and a discovery server. The network can be connected to an IP network, which can comprise the globally routable public Internet. Different servers within a network can be connected using an Intranet, a virtual private network (VPN), Internet Protocol Security (IPSEC), or similar techniques to secure communication between the servers.

The network can operate or communicate with the device database. The DPP server in the network can also communicate with the device database. The device database can record information for a plurality of devices before responders in the devices conduct the device provisioning protocol with the initiator or a plurality of initiators. The device database can record the device identity, a responder identity, which could be in the form of a responder medium access control (MAC) address, an initiator configuration, and a key table. The key table in a device database can record for each device a responder bootstrap public key, an initiator bootstrap public key, and an initiator bootstrap private key. Recorded data within a device database can be obtained by a network (i) upon device manufacturing from a device manufacturer, or (ii) before distribution of a device to the location of the network's access point.

The DPP server for a network can operate a server database, where the server database records information for a plurality of devices connecting with the network. The server database can record the device identity, medium access control (MAC) addresses for devices and initiators, an initiator mode, a selected set of cryptographic parameters for each device, an initiator bootstrap private key, the initiator bootstrap public key, the responder bootstrap public key, an initiator ephemeral public key, and initiator ephemeral private key, an initiator bootstrap key sequence number to identify and track the initiator bootstrap PKI keys, a public key exchange (PKEX) key, a first, second, and third derived shared secret key for a responder. Depending on the initiator mode, (a) not all PKI keys and secret shared keys may be recorded in the server database, and (b) some PKI keys and shared secret keys may be recorded within an initiator instead. The DPP server can also include a set cryptographic algorithms, where the cryptographic algorithms can include a random number generator, a PKI key pair generation algorithm, a secure hash algorithm, an elliptic curve Diffie Hellman key exchange algorithm, a symmetric ciphering algorithm, and a digital signature algorithm. The cryptographic algorithms within a DPP server can be compatible with the equivalent set of cryptographic algorithms in the responder and also the initiator.

An initiator can be a computing device that includes a WiFi radio and can be associated with an initiator user. The initiator can operate the WiFi radio with an initiator configuration in order for the initiator to send and receive messages with the responder. The initiator is located in sufficient proximity with the responder so that the WiFi radio for the initiator and the WiFi radio for the responder can communicate using 802.11 standards. The initiator can operate a DPP application, where the DPP application can also include the set of cryptographic algorithms, which are compatible with cryptographic algorithms in both the responder and the DPP server. The initiator can use an access network in order to communicate with the network with the DPP server via an IP network. The initiator can record a user configuration for the WiFi radio, where the user configuration can be temporarily replaced with the initiator configuration in order to conduct the device provisioning protocol (DPP) session with the responder. After the DPP session, the initiator configuration can be replaced with the user configuration, such that the initiator is restored to its previous state before the DPP session.

The discovery server for a network can operate a discovery server database. The discovery server can receive requests from initiators, where the requests include a device identity from the tag of the device. The discover server database can record configuration provisioning data for the device with the device identity, and a URL for an authentication server for use by the initiator in order for the initiator to (i) authenticate with the network before conducting the device provisioning protocol and (ii) receive information from the DPP server. The initiator can send a request to the discovery server with the device identity, where the device operates a responder. The discovery server can query the discovery server database with the device identity in order to reply to the initiator with the configuration provisioning data for the initiator, where the configuration provisioning data includes the URL for the authentication server.

The initiator can call the URL for the authentication server and conduct an authentication step with the authentication server. After authentication of the initiator, the authentication server can query the device database in order to obtain information for the initiator to use in order to conduct a device provisioning protocol. The information for the initiator can include a URL for the DPP server, an initiator configuration, and optionally the initiator bootstrap public key and the responder bootstrap public key, where the optional information can depend on the initiator mode for a DPP selected by the network.

The initiator can call the URL for the DPP server and setup a secure session via TLS or similar standards. The initiator can then use the WiFi radio and wireless WAN radio to conduct a radio frequency scan in order to collect a networks available list. The networks available list can include identities broadcast by wireless networks and available at the physical location of the initiator near the device. The initiator can send the networks available list to the DPP server. The DPP server can use the networks available list to select a primary access network for the device and obtain credentials for the primary access network for the device with the responder to use. The DPP server can also select an initiator mode, which can specify the subsequent series of steps for the initiator and DPP server to take in order to conduct a DPP session with the responder. The DPP server can send the initiator the initiator mode, where a DPP application operating in the initiator implements the mode. The DPP server can obtain the initiator bootstrap PKI keys and the responder public key from the device database, as well as a selected set of cryptographic parameters in order to use the PKI keys.

In a first initiator mode, the DPP server can then conduct a series of steps in order to generate data for a Device Provisioning Protocol (DPP) authorization request. The DPP server can derive an initiator ephemeral PKI key pair. The DPP server can conduct a first initiator ECDH key exchange with the responder bootstrap public key and the derived initiator private key to derive a key k1. The initiator can derive an initiator nonce and encrypt the initiator nonce using the derived key k1, where the encrypted initiator nonce can comprise a first ciphertext. The initiator can send (i) secure hash values for the initiator bootstrap public key and the responder bootstrap public key, the (ii) derived initiator ephemeral public key, and (iii) the first ciphertext to the initiator. The initiator can send a DPP authentication request to the responder. For embodiments without use of authentication of the initiator (e.g. a "responder-only" authentication), then the use of an initiator bootstrap public key can be omitted.

The responder can receive and process with DPP authentication request. The responder can record a plurality of initiator bootstrap public keys, where the plurality of initiator bootstrap public keys could be recorded during manufacturing or distribution of the device with the responder before the device was placed in the physical proximity of the network access point. At least one of the recorded initiator bootstrap public keys can be selected based on the hash value for the initiator bootstrap public key received in the DPP authentication request. The responder can generate a responder ephemeral PKI key pair. The responder can conduct a first responder key exchange using the recorded responder bootstrap private key and the received initiator ephemeral public key in order to derive the key k1. The responder can conduct a second responder key exchange using the derived responder ephemeral private key and the received initiator ephemeral public key in order to derive a key k2. The responder can conduct a third key exchange using the selected initiator bootstrap public key and a combination of (i) the responder ephemeral private key and the responder bootstrap private key in order to derive a key ke. The responder can decrypt the first ciphertext using the key k1 and read the plaintext initiator nonce. The responder can calculate a responder authentication value using the initiator nonce and encrypt the value using the key ke, creating a second ciphertext. The responder can generate a responder nonce and encrypt both the responder nonce and the second ciphertext using the key k2, creating a third ciphertext. The responder can send a DPP authentication response to the initiator, where the response includes the third ciphertext and the derived responder ephemeral public key.

The initiator can receive the DPP authentication response from the responder. The initiator can send the third ciphertext and the responder ephemeral public key to the DPP server, along with an identity for the device. The DPP server can conduct a second initiator key exchange using the responder ephemeral public key and the initiator ephemeral private key in order to derive the key k2. The DPP server can conduct a third initiator key exchange using (i) a combination of the responder bootstrap public key and the responder ephemeral public key and (ii) the initiator bootstrap private key in order to derive the key ke. The combination of the responder bootstrap public key and the responder ephemeral public key can be calculated by an ECC point addition operation. The DPP server can decrypt the third ciphertext using the derived key k2. The DPP server can read the plaintext responder nonce and the second ciphertext. The DPP server can decrypt the second ciphertext using the derived key ke. The DPP server can read the plaintext responder authentication value from the second ciphertext. The DPP server can calculate the responder authentication value, and if the received responder authentication value from the second ciphertext matches the calculated responder authentication value, then the responder is authenticated.

The DPP server can calculate an initiator authentication value using the received responder nonce. The DPP server can encrypt the initiator authentication value using the key ke, thereby creating a fourth ciphertext. The DPP server can send the fourth ciphertext to the initiator. The initiator can send a DPP authentication confirm message to the responder with the fourth ciphertext. The responder can decrypt the fourth ciphertext using the derived key ke and read the plaintext initiator authentication value. The responder can calculate the same initiator authentication value, and if the received authentication value matches the calculated authentication value then the initiator is authenticated with the responder.

After the mutual authentication, the responder can take the roll of an enrollee and the initiator can take the roll of a configurator. The responder can generate an enrollee nonce and also a configuration attribute, where the configuration attribute describes WiFi capabilities for the device. The responder can create a fifth ciphertext by encrypting the enrollee nonce and the configuration attribute with the derived key ke. The responder can send a DPP configuration request to the initiator, where the DPP configuration request can include the fifth ciphertext. The initiator can send the fifth ciphertext to the DPP server.

The DPP server can receive the fifth ciphertext from the initiator and decrypt the fifth ciphertext using the derived key ke, in order to read the plaintext enrollee nonce and the configuration attribute. Using the selected primary network from above and the configuration attribute, the DPP server can process the selected network credentials using the received configuration attribute. The selected network credentials were described above and can be obtained by a DPP server using the networks available list from the initiator. The DPP server can encrypt the received enrollee nonce and the network credentials using the derived key ke, creating a sixth ciphertext. The DPP server can send the sixth ciphertext to the initiator. The initiator can forward the sixth ciphertext to the responder in a DPP configuration response message.

The responder can receive the DPP configuration response message and decrypt the sixth ciphertext using the derived key ke in order to read the plaintext network credentials. The responder can pass the network credentials to the device, which can apply the credentials with the WiFi radio for the device. The device can subsequently connect with the network access point using the received network credentials. The network access point can provide connectivity to an IP network for the device. The device can establish a secure session with the DPP server using the network access point. The DPP server can derive a new initiator bootstrap PKI key pair and send the new initiator bootstrap public key to the device via the secure session. The device can record the new initiator bootstrap public key for use in a subsequent DPP session, if necessary, for a later time. The DPP server can send the device database the new initiator bootstrap PKI keys along with an identity for the new initiator bootstrap PKI keys comprising a sequence number. The DPP server and the device can record that the DPP session is successfully completed.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1b is a graphical illustration of a device provisioning protocol for authentication and configuration of a responder, in accordance with conventional technology;

FIG. 1c is a graphical illustration of a device provisioning protocol for (i) authentication and configuration of a responder and (ii) authentication of an initiator, in accordance with conventional technology;

FIG. 1d is a graphical illustration of hardware, firmware, and software components for an initiator, including an initiator configuration step, in accordance with exemplary embodiments;

FIG. 2b is an illustration of an exemplary device database, with tables for a device database recording exemplary data, in accordance with exemplary embodiments;

FIG. 3a is a simplified message flow diagram illustrating an exemplary system with exemplary data sent and received by a device database, a DPP server, an initiator proxy, and a responder, in accordance with exemplary embodiments;

FIG. 3b is an illustration of an exemplary server database, with tables for a server database recording exemplary data, in accordance with exemplary embodiments;

FIG. 4a is a flow chart illustrating exemplary steps for conducting a key exchange using PKI keys in order to derive a shared secret key, and for using the derived shared secret key to encrypt and decrypt data, in accordance with exemplary embodiments;

FIG. 5b is a simplified message flow diagram illustrating an exemplary system with exemplary data sent and received by a device database, a DPP server, an initiator proxy, and a responder, in accordance with exemplary embodiments;

FIG. 7 is a graphical illustration of an exemplary system, where an access point conducts a configuration step for a device using a hosted device provisioning protocol, in accordance with exemplary embodiments; and, FIG. 8 is a graphical illustration of an exemplary system, where an access point operates as an initiator for a device with a responder, in order transfer a set of network credentials to the device, in accordance with exemplary embodiments.

DETAILED DESCRIPTION

FIG. 1a

Figure 1A:
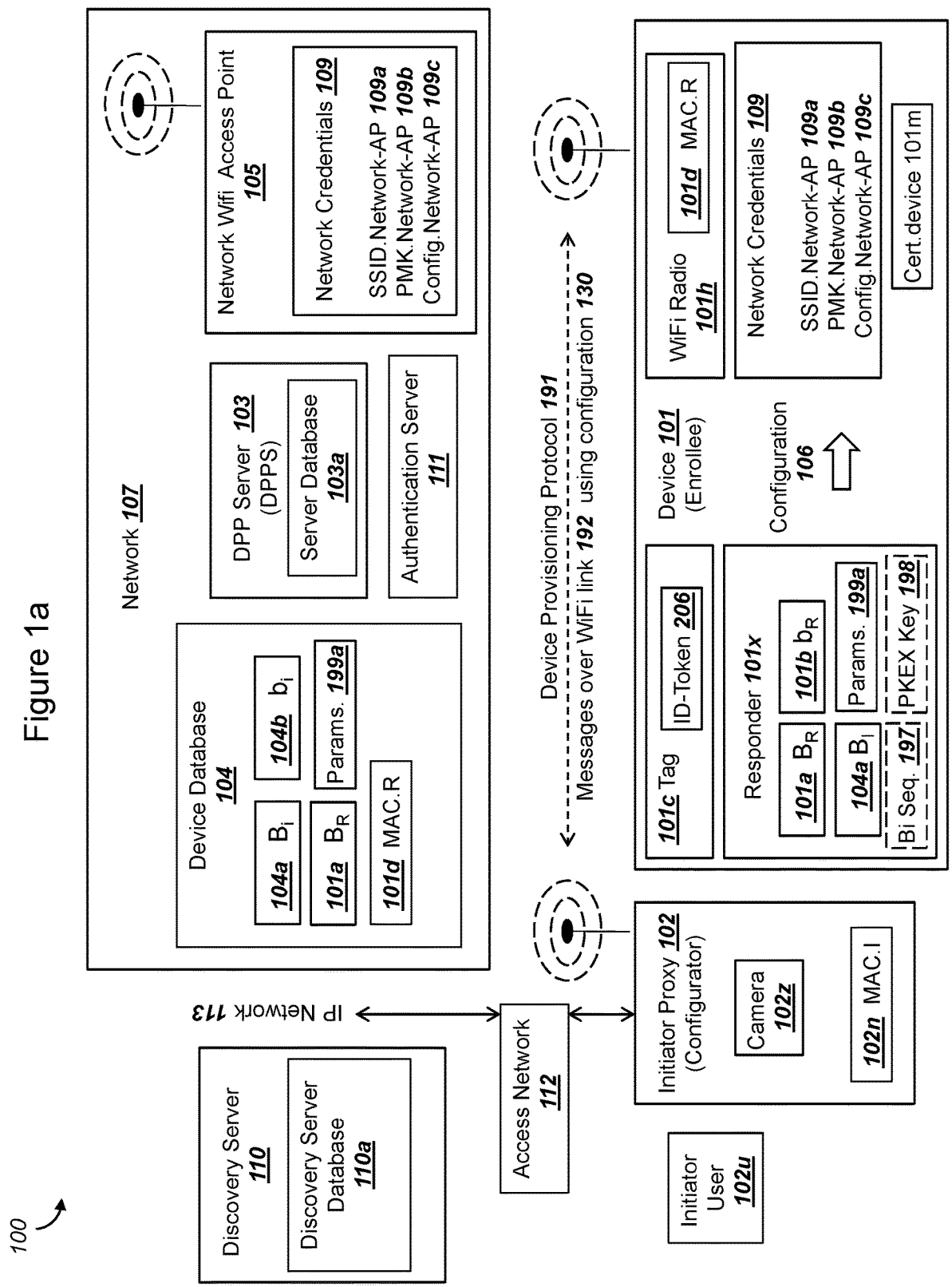
FIG. 1a is a graphical illustration of an exemplary system, where an initiator communicates with a network and a responder in a device, in order to conduct a device provisioning protocol, in accordance with exemplary embodiments.

FIG. 1a is a graphical illustration of an exemplary system, where an initiator communicates with a network and a responder in a device, in order to conduct a device provisioning protocol, in accordance with exemplary embodiments. The system 100 can include an initiator 102, a device 101, a network 107, and a discovery server 110. In exemplary embodiments, initiator 102 can communicate with network 107 and discovery server 110 through an access network 112, which provides communication to an Internet Protocol (IP) network 113. Initiator 102 can also be associated with an initiator user 102u, which could be an end user, group of people, or business entity controlling or operating initiator 102. Initiator 102 could comprise a computing device that operates a radio and processor in order to transmit and receive wireless data. Additional details for electrical and hardware components within an initiator 102 are provided below in FIG. 1d. In some exemplary embodiments, initiator 102 could comprise a mobile phone or "smart phone" with an operating system such as Android® from Google® or IOS® from Apple®. In other exemplary embodiments, an initiator 102 could comprise a portable device, such as laptop, tablet, wearable device such as a smart watch, a USB device including a "USB memory stick", etc. In exemplary embodiments, the function of initiator 102 could be combined with network WiFi access point 105 (such as depicted and described in connection with FIG. 8 below), and a separate physical unit for initiator 102 could be omitted for some embodiments of a system 100

Initiator 102 could operate as an initiator proxy 102 and send and receive messages with device 101 according to a device provisioning protocol (DPP) 191 as specified in the "Device Provisioning Protocol Specification version 1.0" from the WiFi Alliance™ (DPPv1.0), which is hereby incorporated by reference in its entirety. Subsequent and related versions of a DPP 191 could be supported as well by device 101 and an initiator 102. A summary of the message flows between initiator 102 and device 101 according to the DPP 191 are depicted and described in connection with FIG. 1b and FIG. 1c below, as well as subsequent figures herein. The message flows for a DPP 191 between initiator 102 and device 101 could be via a WiFi data link 192, where the WiFi data link 192 can use a configuration 130 (not shown in FIG. 1a, but shown in FIG. 1d below). Initiator proxy 102 could operate a camera 102z and a WiFi radio as depicted, where the WiFi radio could record a medium access control (MAC) address MAC.I 102n. MAC.I 102n for initiator 102 could comprise a string of octets to identify initiator 102 with any of a WiFi access point 105, device 101, network 107, and discovery server 110. In order to acquire the data to function as an initiator according to a DPP 191 and/or DPPv1.0, initiator 102 in FIG. 1a can communicate and transmit/receive data from network 107 via access network 112. Additional details regarding the electrical components within an initiator 102 are depicted and described in connection with FIG. 1d below.

Embodiments of the present invention contemplate both (i) some of the functionality of an initiator in the DPP specification DPPv1.0 operates within initiator proxy 102 depicted in FIG. 1a, and (ii) other functionality of an initiator according to the DPP protocol in DPPv1.0 resides within network 107. Depictions and descriptions below in the present invention may utilize the term "initiator 102", which can also comprise an "initiator proxy 102" depicted in FIG. 1a. In other words, (x) from the perspective of device 101, initiator proxy 102 can operate as an initiator according to the DPP Specification DPPv1.0, but (y) in the present invention some of the functionality and data for an initiator as contemplated by the DPP Specification remains in the network 107. This configuration of operating an initiator proxy 102 in a system 100 (along with proper operation of a network 107) can address and solve the needs in the art described above. Initiator proxy 102 can communicate with network 107 via access network 112.

Access network 112 could be either a Local Area Network (LAN) or a Wide Area Network (WAN), or potentially a combination of both. Access network 112 could comprise a network supporting either IEEE 802.11 (WiFi) standards. Initiator 102 and access network 112 could also utilize a variety of WAN wireless technologies to communicate, including Low Power Wide Area (LPWA) technology, 3rd Generation Partnership Project (3GPP) technology such as, but not limited to, 3G, 4G Long-Term Evolution (LTE), or 4G LTE Advanced, NarrowBand-Internet of Things (NB-IoT), LTE Cat M, proposed 5G networks, and other examples exist as well. A wired initiator 102 can connect to the access network 112 via a wired connection such as, but not limited to, an Ethernet, a fiber optic, or a Universal Serial Bus (USB) connection (not shown). In some exemplary embodiments, access network 112 for initiator proxy 102 can be provided by access point 105, where initiator proxy 102 may also record a compatible set of network credentials 109.

IP network 113 could be a public or private network supporting Internet Engineering Task Force (IETF) standards such as, but not limited to, such as, RFC 786 (User Datagram Protocol), RFC 793 (Transmission Control Protocol), and related protocols including IPv6 or IPv4. A public IP network 113 could utilize globally routable IP addresses, and a private IP network 113 could utilize private IP addresses which could also be referred to as an Intranet. Other possibilities for IP Network 113 exist as well without departing from the scope of the invention. Although not depicted in FIG. 1a, elements within a system 100 could each operate or be associated with a firewall, such that packets from IP network 113 are filtered or restricted in order to secure the communication between the nodes.

Device 101 can comprise a computing device with a WiFi radio for transmitting and receiving data such as via WiFi data link 192. Device 101 can include a tag 101c and a WiFi radio 101h. WiFi radio 101h can operate with a medium access control (MAC) address MAC.R 101d. The tag 101c can record an identity for the device 101, which can be ID-token.device 206 as described in FIG. 2a below. For the system depicted in FIG. 1a, device 101 operating a responder 101x can have a roll of an enrollee, and initiator proxy 102 can operate as a roll of a configurator. Device 101 can operate a responder 101x and, after a configuration step 106, also operate a set of network WiFi credentials 109 that are compatible with an access point 105. Device 101 could be powered via any of (i) traditional "wall power" potentially with an AD/DC adapter, (ii) a battery which may be periodically recharged or replaced, (iii) power over a wired LAN connection such as "power over Ethernet", and other possibilities exist as well. A device 101 can record a certificate cert.device 101m, which can record a device public key, which can be associated with a device private key also recorded in device 101, but not shown in FIG. 1a.

The responder 101x in device 101 can record a responder bootstrap public key Br 101a, a responder bootstrap private key br 101b, an initiator bootstrap public key Bi 104a, a set of cryptographic parameters 199a for the PKI keys, and optionally (i) an initiator bootstrap public key sequence number 197, and (ii) a public key exchange protocol (PKEX) shared secret key 198. The responder 101x in device 101 can comprise a process operated by a processor and recorded in memory for device 101. Although not depicted in FIG. 1a, a responder 101x can also include a random number generator, a PKI key pair generation algorithm, a secure hash algorithm, an elliptic curve Diffie Hellman key exchange algorithm, a symmetric ciphering algorithm, and a digital signature algorithm.

A network 107 can operate an access point 105, where the access point operates with a set of credentials 109. The credentials 109 can include an identifier for the network such an SSID.network-AP 109a, a pairwise master key (PMK) PMK.network-AP 109b or a preshared key (PSK), a pairwise master key identifier (PMKID) (not shown), and also a configuration Config.network-AP 109c. The access point can support wireless networking standards in the series of 802.11 standards, as well as subsequent or related versions of wireless networking standards. A network 107 can also operate a plurality of access points 105. In addition, access point 105 can comprise a plurality of different WiFi radios to collectively function as one access point 105, such as with "mesh" WiFi networks. Or, access point 105 can operate as a single WiFi router. The network 107 can include or be associated with a Device Provisioning Protocol (DPP) server 103, a device database 104, an authentication server 111, and a discovery server 110. Different servers within the network 107 can be connected using an Intranet, a virtual private network (VPN), Internet Protocol Security (IPSEC), or similar techniques to secure communication between the servers.

The network 107 can operate or communicate with the device database 104. The DPP server 103 in the network 107 can also communicate with the device database 104. The device database 104 can record information for a plurality of devices 101 before responders 101x for the device 101 conducts the device provisioning protocol 191 with the initiator 102. The device database 104 can record the device identity 206, a responder identity 101d, which could be in the form of a responder medium access control (MAC) address MAC.R 101d, an initiator configuration 130, and a key table. The key table in a device database 104 can record for each device 101a responder bootstrap public key Br 101a, an initiator bootstrap public key Bi 104a, and an initiator bootstrap private key bi 104b. Recorded data within a device database 104 can be obtained by a network from either (i) upon manufacturing from a device manufacturer, or (ii) before distribution of a device to the location of the network's access point. Some data in a device database 104 could also be acquired by an initiator 102 prior to the start of a DPP 191.

The DPP server 103 for a network 107 can operate a server database 103a, where the server database 103a records information for a plurality of devices 101 connecting with the network 107. The server database 103a can record a medium access control (MAC) address MAC.R 101d in the device 101 a set of cryptographic parameters 199a for each device, an initiator bootstrap private key bi 104b, the initiator bootstrap public key Bi 104a, and the responder bootstrap public key Br 101a. A server database can also record additional data for responders 101x in devices 101, as depicted and described in connection with FIG. 3b below. Depending on an initiator mode 306a in FIG. 3 below, not all PKI keys and secret shared keys may be recorded in the server database 103a. The DPP server 103 can also include a set cryptographic algorithms, where the cryptographic algorithms can include a random number generator, a PKI key pair generation algorithm, a secure hash algorithm, an elliptic curve Diffie Hellman key exchange algorithm, and a symmetric ciphering algorithm. The cryptographic algorithms within a DPP server 103 can be compatible with the equivalent set of cryptographic algorithms in the responder 101x and also the initiator proxy 102.

Note that the security of communications between a device 101 and an access point 105 may generally depend on the security of a configuration step 106, which in turn may rely on a device provisioning protocol 191. Further, a manufactured device 101 may not have the credentials 109 or configuration in order to communicate with an access point 105 without successfully completing a DPP 191 and a configuration step 106 in order for device 101 to secure receive and use network credentials 109. After a DPP 191 and a configuration step 106 described in the present invention and in multiple figures below, device 101 can communicate with access point 105 using credentials 109.

FIG. 1b

FIG. 1b is a graphical illustration of a device provisioning protocol for authentication and configuration of a responder, in accordance with conventional technology. FIG. 1b depicts a summary of the WiFi Device Provisioning Protocol (DPP) specification, version 1.0 which was published on Apr. 9, 2018. The summary depicted in FIG. 1b highlights recorded bootstrap PKI keys, derived ephemeral PKI keys, and messages transmitted and received between an initiator 102* and a responder 101x. The use of keys and messages for a DPP 191 can accomplish both (i) authenticating the responder 101x and (ii) transfer a configuration object to responder 101x, where the configuration object could comprise a set of network access credentials 109 from FIG. 1a. Initiator 102* is depicted with a "*" and has several differences than an initiator proxy 102 depicted in FIG. 1a and subsequent figures below, although some functionality is shared. Both initiator 102* and initiator proxy 102 (from FIG. 1a and other Figures below) can send and receive the full and complete set of a DPP messages for a Device Provisioning Protocol 191.

In other words, initiator 102* and an initiator proxy 102 can send equivalent messages such that a responder 101x would process the messages in the same manner and would not normally be able to detect to discern whether a initiator proxy 102* or an initiator 102 was transmitting and receiving messages for the Device Provisioning Protocol 191. In the present invention, initiatory proxy 102* can operate as an initiator according to the DPP Specification 1.0. Initiator proxy 102* or an initiator 102 can be (x) a process, program, firmware, or software application operating in a computing device with a WiFi compatible radio, in order to (y) communicate with a responder 101x via a WiFi data link 192 (in FIG. 1a). Exemplary additional configurations for an initiator 102 and a responder 101x within computing devices is depicted and described in connection with FIGS. 7 and 8 below, and other possibilities exist as well without departing from the scope of the present invention.

Other differences between an initiator 102* and an initiator proxy 102 can exist in the present invention. For a system 100 with an initiator proxy 102 in FIG. 1a and Figures below, the recordation of PKI keys, PKI key derivation, and cryptographic processes such as symmetric encryption and decryption can be distributed between an initiator proxy 102 and a DPP server 103, while an initiator 102* can internally record the keys necessary for symmetric key exchange, key derivation, and symmetric encryption and decryption. The distributed storage and operation with PKI keys for a system that includes an initiator proxy 102 is depicted and described in connection with FIG. 3, FIG. 5a, FIG. 5b, and FIG. 6a below. Additional details for internal components, memory structures, values, and operation of an initiator proxy 102 in order to provide equivalent functionality as initiator 102* for a responder 101x are described in Figures below.

Initiator 102* can record bootstrap keys, ephemeral keys, and derive symmetric encryption keys in order to authenticate the responder 101x and transfer the network access credentials 109 according to a Device Provisioning Protocol 191. For a system with responder authentication 141, an initiator proxy 102* can record a medium access control (MAC) address MAC.I 102n. MAC.I 102n can be associated with a WiFi radio within Initiator proxy 102* and comprise a string of octets in order to uniquely identify initiator 102* within a wireless network. With current, convention technology, MAC.I 102n can comprise a string of 6 octets, although other possibilities exist as well for a MAC.I 102n. Initiator 102* can also operate a key pair generation function 102y in order to derive ephemeral PKI keys such as an initiator ephemeral public key Pi 102a and an initiator ephemeral private key pi 102b. As contemplated herein, an ephemeral PKI key can also be referred to as a "protocol" key. In other words, key Pi 102a can be referred to as initiator protocol public key Pi 102a or initiator ephemeral public key Pi 102a, which can both represent the same numeric value, number, or sequence of digits.

Although not depicted in FIG. 1b, a key pair generation function 102y could use (i) a random number generator in order to derive the PKI private key and (ii) a selected set of cryptographic parameters 199a (depicted in FIG. 2b below) in order to specify an elliptic curve cryptography (ECC) curve name, key length, key formatting, etc. As contemplated herein, the algorithms used with ECC PKI keys in the present invention can be compatible and substantially conform with ECC algorithms and keys as specified in (i) the IETF Request for Comments (RFC) 6090 titled "Fundamental Elliptic Curve Cryptography Algorithms", and (ii) IETF RFC 5915 titled "Elliptic Curve Private Key Structure", and also subsequent and related versions of these standards. With a random number generated by initiator 102* or an initiator proxy 102, a key pair generation function 102y, a derived ephemeral initiator private key pi 102b can be used to derive a corresponding ephemeral initiator public key Pi 102a. The two derived PKI keys can be used in conjunction for subsequent operations such as an Elliptic Curve Diffie Hellman key exchange. As contemplated in the present invention, the use of a capital letter as the first character for a PKI key can represent a public key, the use of a lower case letter as the first character for a PKI key can represent a private key, and the second letter for a PKI key can represent the entity the key is associated with or belongs to. Further, the letter "B" or "b" as the first character for a PKI key can represent a recorded bootstrap key, which could be static or relatively static over the lifetime of a responder or initiator, and the letter "P" or "p" the first character for a PKI key can represent an ephemeral key.

Responder 101x in FIG. 1b, FIG. 1c, and other Figures below can include functionality to operate as a responder according to the DPP Specification version 1.0. As depicted in FIG. 1a, responder 101x could operate within a device 101, although other possibilities exist as well for the location or equipment operating a responder 101x without departing from the scope of the present invention. For a DPP 191, a responder 101x can record a responder bootstrap public key Br 101a, a responder bootstrap private key br 101b, a MAC address MAC.R 101d, and also operate a key pair generation algorithm 101y. Responder bootstrap public key Br 101a and responder bootstrap private key br 101b could comprise an ECC key pair selected and formatted according to a selected set of parameters 199a (in FIG. 1a above).

Ephemeral bootstrap PKI keys for responder 101x could also be formatted and selected with a compatible set of cryptographic parameters 199a as Pr 101e and pr 101f. Bootstrap PKI keys for responder 101x could be recorded in responder 101x or nonvolatile memory for a device 101 operating a responder 101x. The bootstrap PKI keys could be recorded in responder 101x during manufacturing or a configuration of responder 101x before delivery of a device 101 to the location of an access point 105 from FIG. 1a. MAC address MAC.R 101d can comprise an identity of responder 101x or a device 101 on a WiFi network, and can be similar to MAC.I 102d for an initiator 102* as described above. Key pair generation algorithm 101y can be equivalent to key pair generation algorithm 102y described above for initiator proxy 102*. Key pair generation algorithm 101y can derive ephemeral PKI keys for responder 101x comprising public key Pr 101e and private key pr 101f, which could also be derived using a compatible set of parameters 199a for Br 101a, br 101b, Pi 102a and pi 102b.

An initiator 102* and a responder 101x can conduct a Device Provisioning Protocol (DPP) 191. Again, as contemplated herein, an exemplary Device Provisioning Protocol 191 according to conventional technology could comprise the "Device Provisioning Protocol Specification" version 1.0 as published by the WiFi Alliance™. In message 121, an initiator 102* can receive the bootstrap public key Br 101a for responder 101x. The "out of band" transfer of Br 101a in message 121 could comprise several different possible methods for initiator 102* to receive Br 101a, which are also described in the DPP specification 1.0, such as via reading a QR code, reading a near-field communications tag, using a Bluetooth wireless connection to read Br 101a from responder 101x, and other possibilities exist as well. A DPP 191 also contemplates that associated information for responder 101x could be transferred in message 121, such as a device identity for device 101, MAC.R 101d, in addition to Br 101a and possible parameters 199a.

Initiator 102* can receive Br 101a and derive PKI keys Pi 102a and pi 102b. Initiator 102* can conduct an Elliptic Curve Diffie Hellman key exchange algorithm 401a as depicted and described below in key exchange 314 step for FIG. 4a in order to derive a shared secret key with responder 101x. Initiator 102* can derive a random number comprising an initiator nonce and also determine a set of capabilities for the initiator, such as a configurator or enrollee as specified in DPP specification version 1.0. Initiator 102* can encrypt the initiator nonce and the initiator capabilities using the derived shared secret key as depicted and described in connection with an encryption step 315 in FIG. 4a below. Initiator 102* can send the derived public key Pi 102a and a ciphertext with the encrypted data in a message 122. Although not depicted in FIG. 1b, initiator 102* can also send a hashed value of Br 101a in message 122.

As specified in DPP specification version 1.0, message 122 could also include a hashed value for initiator bootstrap public key Bi 104a, but for a responder authentication 141 the value of Bi 104a may be omitted or may not be used (since responder 101x may not record the corresponding initiator bootstrap public key Bi 104a for a responder authentication 141 as depicted in FIG. 1b). The hash algorithm on a bootstrap public key could comprise the SHA-256 hash algorithm according to IETF RFC 5754 titled "Using SHA2 Algorithms with Cryptographic Message Syntax". Other hash algorithms could be used as well and specified in a selected set of cryptographic parameters 199 as depicted and described in connection with FIG. 2b below, such as SHA-3, SHA-384, etc. Message 122 can comprise a Device Provisioning Protocol Authentication Request according to DPP specification version 1.0. Additional details for a message 122 are provided in section 6.2.2 of DPP specification version 1.0.

Responder 101x can receive message 122 and follow the steps for a responder according to the section 6.2.3 of DPP specification version 1.0, in order to generate a Device Provisioning Protocol Authentication Response, which could comprise message 123. Responder 101x can conduct an Elliptic Curve Diffie Hellman key exchange algorithm 401a as depicted and described below in key exchange 319 step for FIG. 4a in order to mutually derive a first shared secret key with initiator 102*. Responder 101x could decrypt the initiator nonce and the initiator capabilities using the derived shared secret key as depicted and described in connection with an decryption step 320 in FIG. 4a below. Responder 101x can use the key pair generation algorithm 101y in order to derive an ephemeral responder public key Pr 101e and a corresponding ephemeral private key pr 101f. Responder 101x can use the derived responder ephemeral private key pr 101f and the received initiator ephemeral public key Pi 102a in order to conduct a key exchange algorithm 314b as depicted below in FIG. 4b and derive a second secret shared key. The first mutually derived symmetric key can comprise k1 and the second mutually derived symmetric key can comprise k2 according to the DPP specification version 1.0. Responder 101x can derive a random number comprising a responder nonce and also determine a set of capabilities for the responder, such as a configurator or enrollee as specified in DPP specification version 1.0.

Responder 101x could also generate a responder authentication value, which could comprise a hash value over the initiator nonce received in message 122 and the generated responder nonce. Responder 101x could use the first shared secret key and the second shared secret key in order to derive a third shared secret key. Responder 101x could encrypt the responder authentication value with the third shared secret key and also then include the encrypted responder authentication value with the responder nonce and responder capabilities in a ciphertext. The ciphertext could be encrypted with the second symmetric key, as depicted and described in connection with an encryption step 315b in FIG. 4b below. Responder 101x could send the derived ephemeral responder public key Pr 101e and the ciphertext in a message 123.

Figure 4B:
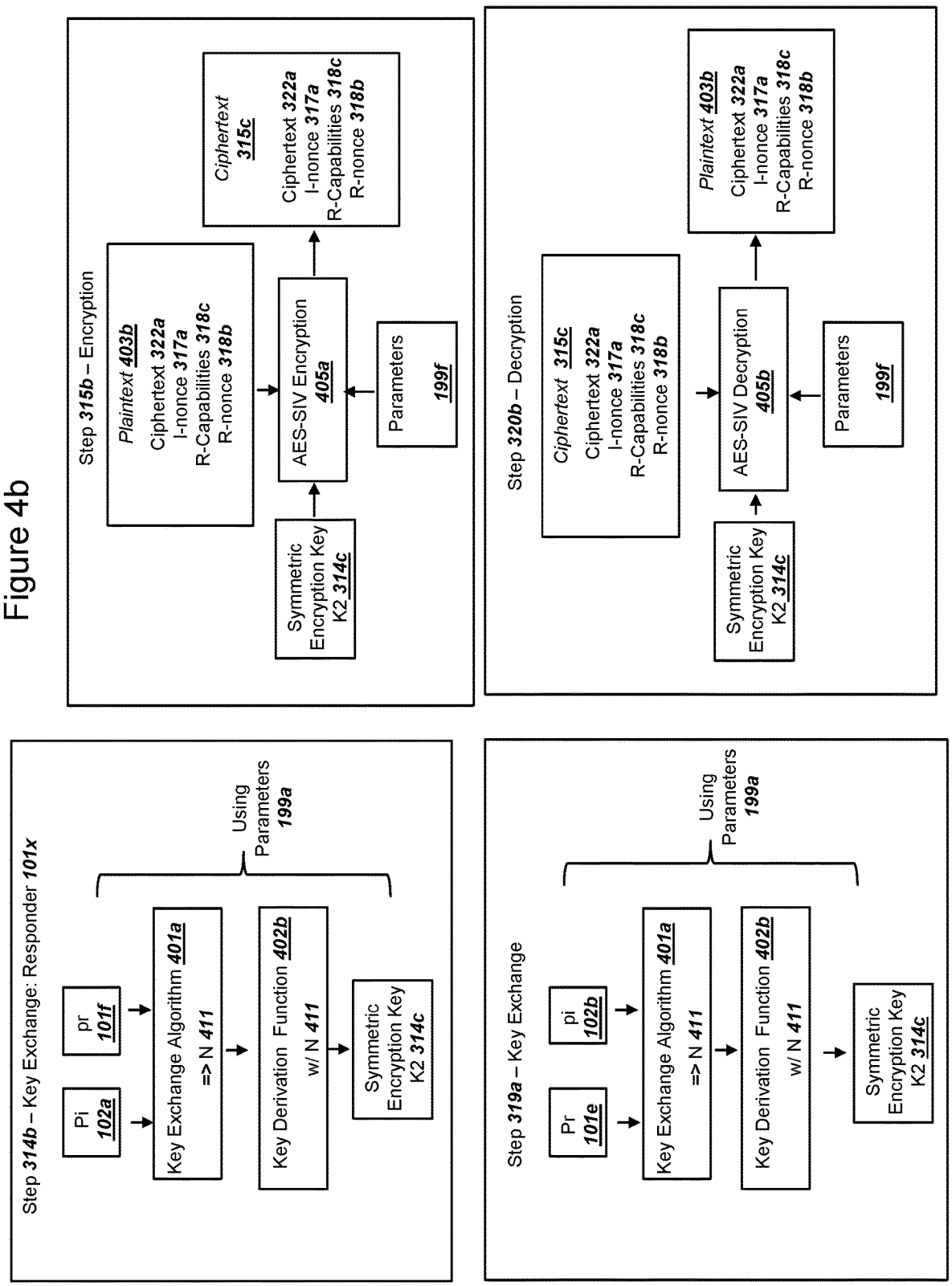
FIG. 4b is a flow chart illustrating exemplary steps for conducting a key exchange using PKI keys in order to derive a shared secret key, and for using the derived shared secret key to encrypt and decrypt data, in accordance with exemplary embodiments.

Initiator 102* can receive message 123 and record the received ephemeral responder public key Pr 101e. Initiator 102* can follow the steps in section 6.2.4 of DPP specification version 1.0 in order to process message 123 and confirm the authentication response from responder 101x in message 123. Initiator 102* can mutually derive the second symmetric key using the received ephemeral responder public key Pr 101e and the derived initiator ephemeral private key pi 102b, using a key exchange algorithm 319a as depicted in FIG. 4b. Initiator 102* can decrypt the ciphertext in message 123 using the second mutually derived symmetric key and a decryption step 320b in FIG. 4b. Initiator 102* can derive a third symmetric key using at least the first mutually derived symmetric key and the second mutually derived symmetric key, Initiator 102* can use the third symmetric key to decrypt the encrypted responder authentication value using a decryption step 328 in FIG. 4c. Initiator 102* can calculate a value for the responder authentication, and if the calculated value for the responder authentication matches the received value for the responder authentication, then responder 101x can be considered authenticated.

Although not depicted in FIG. 1b, after authenticating responder 101x, initiator 102* can send an authentication confirm message, which could comprise a DPP authentication confirm message according to section 6.2.4 of the DPP specification version 1.0. The authentication confirm message can also include an initiator authentication value, which could be encrypted with the third symmetric key. The responder 101x can receive the encrypted authentication confirm value and decrypt the value and also internally calculate the initiator authentication value. If the received initiator authentication value and the calculated authentication confirm values are equal, then the initiator is authenticated with the responder 101x. Note that for a responder authentication 141 in FIG. 1b, the authentication of initiator 102* by responder 101x is weak and only comprises verifying that initiator 102* records the bootstrap public key Br 101a for responder 101x. Also, although not depicted in FIG. 1b, responder 101x could have the capabilities of an enrollee and send a DPP configuration request message to initiator 102*, which could take the role of a configurator. The DPP configuration request message can be according to section 6.3.2 of the DPP specification version 1.0, and can include an enrollee nonce, which could be a random number generated by the enrollee.

As depicted in FIG. 1b, initiator 102* can then send a configuration object in a ciphertext in message 124. Message 124 could comprise a DPP configuration response message according to section 6.3.3 of the DPP specification version 1.0. Initiator 102* can record the configuration object before sending message 124. In the present invention, the configuration object comprises the network credentials 109 depicted in FIG. 1a above. In other words, a configuration object can be configuration information for a device 101 with responder 101x to use in order to connect with other devices via a wireless network. Configuration object could contain a list of network identifiers, device identifiers, RF band and channel information, configuration parameters, pre-share keys, PKI keys, names, passwords, group temporal keys, a shared secret 198 for a PKEX key exchange, etc. An exemplary list of possible values for a configuration object is depicted in table 14 of DPP specification version 1.0. In message 124, the network credentials 109 as a configuration object can be sent in a ciphertext using the third mutually derived symmetric key. As depicted in FIG. 1b, the ciphertext can include both the enrollee nonce and the network credentials. Responder 101x can receive message 124, decrypt the ciphertext using the third mutually derived symmetric key, and record the network credentials 109. Device 101 can then apply the network credentials 109 and communicate with access point 105.

FIG. 1c

FIG. 1c is a graphical illustration of a device provisioning protocol for (i) authentication and configuration of a responder and (ii) authentication of an initiator, in accordance with conventional technology. FIG. 1c depicts a summary of the WiFi Device Provisioning Protocol (DPP) specification, version 1.0 which was published on Apr. 9, 2018, supporting a mutual authentication 142 by both initiator 102* and responder 101x. The summary depicted in FIG. 1c highlights recorded bootstrap PKI keys, derived ephemeral PKI keys, and messages transmitted and received between an initiator 102* and a responder 101x. Many of (i) the PKI keys for initiator 102* and responder 101x, and (ii) the messages transmitted between the nodes are equivalent to those depicted and described in connection with FIG. 1b. This description of FIG. 1c herein focuses upon the differences from FIG. 1b in order for initiator 102* and responder 101x to mutually authenticate.

In order to support a mutual authentication between initiator 102* and responder 101x, initiator 102* can record an initiator bootstrap public key Bi 104a and an initiator bootstrap private key bi 104b. Although bootstrap public key Bi 104a is depicted within initiator 102*, another entity besides initiator 102* could record the public key and make it available to other nodes such as a responder 101x. As contemplated by the DPP Specification, the initiator bootstrap keys can be recorded with initiator 102* before conducting a DPP 191 authentication and configuration with responder 101x. For example, the bootstrap PKI keys for the initiator could be recorded during manufacturing of the initiator, or loaded by an initiator user 102u before conducting the depicted communications with responder 101x. Bootstrap public keys for the initiator can support a selected set of cryptographic parameters 199a, where the selected set of cryptographic parameters 199a can match the parameters used by keys in responder 101x. The DPP specification version 1.0 identifies the minimal set of cryptographic parameters in order to ensure compatibility, which can comprise the "set A" for a set of cryptographic parameters 199 depicted in FIG. 2b below.

In order to conduct a mutual authentication 142 in addition to the responder authentication 141 depicted in FIG. 1c, a responder 101x should have access to the initiator bootstrap public key Bi 104a and also record the initiator bootstrap public key Bi 104a. In message 126, a responder 101x can receive the initiator bootstrap public key Bi 104a for initiator 102*. The "out of band" transfer of Bi 104a in message 126 could comprise several different possible methods for responder 101x to receive Bi 104a, which are also described in the DPP specification 1.0, such as via reading a QR code, reading a near-field communications tag, using a Bluetooth wireless connection to read Bi 104a from initiator 102*, and other possibilities exist as well, including using WiFi direct to first establish a "peer-to-peer" WiFi connection. A DPP 191 also contemplates that associated information for responder initiator 102* could be transferred in message 126, such as a device identity for initiator 102*, MAC.I 102n, in addition to Bi 104a. As depicted in FIG. 1c, the responder 101x can also record the initiator bootstrap public key Bi 104a, which can be used to authenticate the initiator 102* as described below.

For a mutual authentication 142 between device 102* and responder 101x, the two nodes can exchange the same or equivalent messages as message 122 and message 123, which were also described above in connection with FIG. 1b. For mutual authentication, the third shared encryption key ke in DPP specification version 1.0 can be derived by a responder 101x using a key exchange step 321 and the received initiator bootstrap public key Bi 104a as depicted and described in connection with FIG. 4c below. The use of public key Bi 104a for the key exchange step 321 is described in section 6.2.3 of the DPP Specification version 1.0. The difference between the third mutually derived symmetric key ke for a mutual authentication 142 and a responder authentication 141 is the inclusion of initiator bootstrap public key Bi 104a in the key exchange algorithm 401c and key derivation function 402c in FIG. 4c. The first mutually derived symmetric key can comprise k1 and the second mutually derived symmetric key can comprise k2. The third mutually derived symmetric key ke is used by the responder 101x to encrypt the responder authentication value as depicted in an encryption step 322 in FIG. 4c. The responder authentication value can include a random number "initiator nonce" or I-nonce from the initiator 102* in message 122. The responder authentication value can comprise the value "R-auth" in step 3 of section 6.2.3 of DPP specification version 1.0.

Initiator 102* can also mutually derive the third symmetric encryption key ke using the initiator bootstrap private key bi 104b and key exchange step 327 depicted and described below in connection with FIG. 4c. Initiator 102* can subsequently decrypt the responder authentication value using the mutually derived third symmetric encryption key ke and a decryption step 328 as depicted and described in connection with FIG. 4c below. Initiator 102* can calculate the same value for the responder authentication value as described in section 6.2.4 of DPP specification version 1.0 If the received, decrypted responder authentication value matches the calculated responder authentication value, then the responder 101x is authenticated. The initiator 102* can calculate an initiator authentication value using the received responder nonce in message 123 and encrypt the initiator authentication value using the mutually derived third symmetric key ke (from a key exchange step 327) and send the initiator authentication value in a message (not shown in FIG. 1c). The responder 101x can (i) decrypt the encrypted initiator authentication value using the third mutually derived symmetric key ke (from a key exchange step 321) and (ii) also calculate the initiator authentication value. If the calculated initiator authentication value by the responder 101x matches the received, decrypted initiator authentication value then the initiator 102* is authenticated with the responder 101x for a mutual authentication. The responder 101x can then receive a configuration object in a message 124. Message 124 can include network credentials 109 encrypted with the third mutually derived symmetric key ke. The responder 101x can pass the decrypted network credentials 109 to device 101, which can then apply the network credentials 109 in order to communicate with network access point 105.

FIG. 1d

FIG. 1d is a graphical illustration of hardware, firmware, and software components for an initiator, including an initiator configuration step, in accordance with exemplary embodiments. FIG. 1d is illustrated to include several components that can be common within an initiator 102. Initiator 102 may consist of multiple electrical components in order to both (i) communicate with a network 107 and (ii) transmit and receive messages with a responder 101x according to a device provisioning protocol 191. Initiator 102 can undergo an initiator configuration step 127 in order to configure the components in an initiator 102 to function as the enhanced initiator or initiator proxy as contemplated herein, such that an initiator bootstrap private key bi 104b can remain recorded with a network 107 as depicted in FIG. 1a above. As mentioned above in FIGS. 1b and 1c, initiator 102 and initiator 102' can be different than an initiator 102* since neither initiator 102 nor initiator 102' may not record or operate with the initiator bootstrap private key bi 104b.

In exemplary embodiments and as depicted in FIG. 1d, initiator 102 can include an initiator identity 102i, a processor 102c (depicted as "CPU 102c"), random access memory (RAM) 102d, an operating system (OS) 102e, storage memory 102f (depicted as "nonvolatile memory 102f"), a WiFi radio 102w, a system bus 102j, and a wireless wide area network (WAN) radio 102h. FIG. 1d depicts initiator 102 as both a default initiator 102 and a configured initiator 102'. The default initiator 102 can comprise the state of initiator 102 before a configuration step 127 and initiator 102' can comprise the state of initiator 102' after the configuration step 127. As depicted, both a default initiator 102 and a configured initiator 102' can contain the same hardware components such as CPU 102c, RAM 102d, etc., where a difference between initiator 102 and 102' can be in both (i) data recorded in storage memory 102f and (ii) the configuration of WiFi radio 102w.

Initiator identity 102i could comprise a preferably unique alpha-numeric or hexadecimal identifier for initiator 102, such as an Ethernet MAC address, an International Mobile Equipment Identity (IMEI), an owner interface identifier in an IPv6 network, a serial number, or other sequence of digits to uniquely identify each of the many different possible units for initiator 102. A system 100 depicted in FIG. 1a could operate with a plurality of different initiators 102. Initiator identity 102i can preferably be recorded in a non-volatile memory or written directly to hardware in initiator 102 by (i) an initiator manufacturer upon device manufacturing, or (ii) a pre-configuration step for initiator 102, The CPU 102c can comprise a general purpose processor appropriate for typically low power consumption requirements for a initiator 102, and may also function as a microcontroller. CPU 102c can comprise a processor for initiator 102 such as an ARM® based processor or an Intel® based processor such as belonging to the Atom or MIPS family of processors, and other possibilities exist as well. CPU 102c can utilize bus 102j to fetch instructions from RAM 102d and operate on the instruction. CPU 102c can include components such as registers, accumulators, and logic elements to add, subtract, multiply, and divide numerical values and record the results in RANI 102d or storage memory 102f, and also write the values to an external interface such as WiFi radio 102w.

RAM 102d may comprise a random access memory for initiator 102. RANI 102d can be a volatile memory providing rapid read/write memory access to CPU 102c. RANI 102d could be located on a separate integrated circuit in initiator 102 or located within CPU 102c. The RANI 102d can include data recorded in initiator 102' for the operation when collecting and communicating DPP messages 122 through 124 with responder 101x depicted in FIG. 1b and FIG. 1c above. The system bus 102j may be any of several types of bus structures including a memory bus or memory controller, a peripheral bus, and a local bus using any of a variety of bus architectures including a data bus. System bus 102j connects components within initiator 102 as illustrated in FIG. 1d, such as transferring electrical signals between the components illustrated. Initiator 102 can include multiple different versions of bus 102j to connect different components, including a first memory bus 102j between CPU 102c and RANI 102d, and a second system bus 102j between CPU 102c and WiFi radio 102w, which could be an I2C bus, an SPI bus, PCIe bus, or similar data busses.

The operating system (OS) 102e can include Internet protocol stacks such as a User Datagram Protocol (UDP) stack, Transmission Control Protocol (TCP) stack, a domain name system (DNS) stack, a TLS stack, a datagram transport layer security (DTLS) stack, etc. The operating system 101e may include timers and schedulers for managing the access of software to hardware resources within initiator 102, including CPU 102c and WiFi radio 102w. The operating system shown of 102e can be appropriate for a low-power device with more limited memory and CPU resources (compared to a server such as DPP server 103, discovery server 110, etc.). Example operating systems 102e for a initiator 102 includes Linux, Android® from Google®, IOS from Apple®, Windows® 10 IoT Core, or Open AT® from Sierra Wireless®. Additional example operating systems 102e for an initiator 102 include eCos, uC/OS, LiteOs, Contiki, OpenWRT, Raspbian, and other possibilities exist as well without departing from the scope of the present invention. Although depicted as a separate element within initiator 102 in FIG. 1d, OS 102e may reside in RAM 102d and/or storage memory 102f during operation of initiator 102.

Storage memory 102f (or "nonvolatile memory 102f") within initiator 102 can comprise a nonvolatile memory for storage of data when initiator 102 is powered off. Memory 102f may be a NAND flash memory or a NOR flash memory, and other possibilities exist as well without departing from the scope of the present invention. Memory 102f can record firmware for initiator 102. Memory 102f can record long-term and non-volatile storage of data or files for initiator 102. In an exemplary embodiment, OS 102e is recorded in memory 102f when initiator 102 is powered off, and portions of memory 102f are copied by CPU 102c into RAM 102d when initiator 102 powers on. Memory 102f (i) can be integrated with CPU 102c into a single integrated circuit (potentially as a "system on a chip"), or (ii) operate as a separate integrated circuit or a removable card or device, such as a removable SD card. Memory 101f may also be referred to as "device storage" and can include exemplary file systems of FAT16, FAT 32, NTFS, ext3, ext4, UDF, or similar file systems.

As depicted in FIG. 1d, nonvolatile memory 101f for a default initiator 102 may also contain a secret key SK0.initiator 102s, a certificate cert0.initiator 102m, and a certificate cert.CA.root 102r. A secret key SK0.initiator 102s in a nonvolatile memory 102f could comprise the private key for a PKI key pair, where the corresponding public key could be recorded in a certificate cert0.initiator 102m. A secret key SK0.initiator 102s and the corresponding public key in a certificate 102m could comprise values to use with asymmetric public key infrastructure (PKI) cryptography, and could utilize exemplary algorithms based on either Rivest Shamir Adleman (RSA) or elliptic curve cryptography (ECC). For use of ECC algorithms, parameters within certificate 102m (and other certificates herein) can specify elliptic curve names (e.g. NIST P-256, sect283k1, sect283r1, sect409k1, sect409r1, etc.). The same or equivalent ECC parameters can be used with bootstrap PKI keys in the form of parameters 199a. Further, elliptic curves that do not depend on parameters specified by NIST could be utilized as well for keys recorded in nonvolatile memory 101f, such as Curve22519, curve448, or FourQ, etc. For use of RSA algorithms, parameters within certificate 102m can specify a modulus and other associated values for using an RSA PKI key pair. For either asymmetric algorithms RSA or ECC for a PKI key pair herein, parameters in a certificate such as cert0.initiator 102m can specify key lengths, a duration for key validity, uses of the PKI key pair such as for key derivation or signatures, encoding rules, message digest algorithms, etc. Parameters in certificate 102m (and other certificates herein) may also include identifying information associated with the PKI key pair such as a sequence number, a serial number, a certificate revocation list or URL, a domain name of the server associated with the PKI key pair.

Certificate cert.CA.root 102r can comprise a root certificate for initiator 102 to authenticate a server certificate received from DPP server 103, authentication server 111, or discovery server 110, where these servers are depicted and described in connection with FIG. 1a, FIG. 2a, and FIG. 3, and other Figures below. Certificate cert.CA.root 102r can also be used to authenticate other servers or nodes or access points in a network 107 as well. After authenticating a server certificate received with cert.CA.root 102r, initiator 102 can conduct additional authentication steps contemplated by secure protocol standards such as Transport Layer Security (TLS), Datagram Transport Layer Security (DTLS), IPSec, etc. Root certificate cert.CA root 102r can comprise the list or a subset of the list of included root certificates from the Mozilla Foundation with Mozilla projects, where the aggregate list of community approved root certificates and associated parameters is in the widely distributed file certdata.txt from the Mozilla web site.

Initiator 102 and 102' can include a WiFi radio 102w to communicate wirelessly with networks such as AP 105, access network 112, and device 101 depicted and described in FIG. 1a above, including via WiFi data link 192. In exemplary embodiments, access network 112 can comprise all available wireless WAN and LAN networks in the range of initiator 102, such as the exemplary networks listed in a networks available list 304c depicted in FIG. 3a below. WiFi access point 105 can comprise a member of the set of all access networks 112 for initiator 102. WiFi radio 102w could connect with an antenna in order to transmit and receive radio frequency signals.

As depicted in FIG. 1d, a WiFi radio 102w in a configured initiator 102' can record or operate with an initiator configuration 130. The values for initiator configuration 130 could also specify a version of the 802.11 standards to utilize, such as, but not limited to, 802.11n, 802.11ac, 802.11ah, 802.11ax, or related and subsequent versions of these standards. The initiator configuration 130 can be compatible with the configuration of a target WiFi device 101 with responder 101x. The initiator configuration 130 could be obtained during an authentication step for initiator 102, such as depicted below in FIG. 2a, although initiator configuration 130 could be obtained at other times as well, such as possibly directly from reading a tag 101c on device 101 or from a DPP server 103. Initiator configuration 130 could also be obtained from a message 121 depicted and described in connection with FIG. 1b and FIG. 1c.

The initiator configuration 130 can include a device identity ID-token.device 206 (or alternatively ID.device 101i), a MAC address for responder 101x comprising MAC.R 101d, a device operating class 130a which can be selected from the plurality of potential global WiFi operating classes in table E-4 of IEEE standard specification 802.11ac, which is incorporated by reference herein. Recording a device identity 206 and MAC.R 101d with initiator configuration 130 can be used by an initiator 102' to select which set of initiator configuration 130 is associated with which devices 101. In other words, the present invention contemplates that an initiator 102' communicates with multiple responders 101x either concurrently, or over time. MAC.R 101d can be required for initiator 102' to send message DDP Authentication Request 122 as a unicast frame to responder 101x, such that a device 101 with responder 101x could receive message 122 by listening in a unicast mode for messages that include the device's MAC.R 101d. The device operating class 130 could specify if device 101 operates at 2.4 Ghz, 5 Ghz, UFH (ultra-high frequency), etc.

The initiator configuration 130 can also include Device DPP Channel Authentication List 130b, which can comprise a list of channels for initiator 102' to send DPP authentication request 122 messages in order to establish initial connectivity with device 101 and responder 101x. In exemplary embodiments, initiator configuration 130 for initiator 102' provides data for an initiator 102' to send data such as message 122 to responder 101x, where responder 101x may operate with different possible values for operating classes, listening channels, or MAC addresses MAC.R 101d used by a particular responder 101x in a particular device 101. In other words, without initiator configuration 130, an initiator 102' may not normally be able to (i) select the proper WiFi operating channel, and (ii) send unicast data to responder 101x. For embodiments where a Device DPP Channel Authentication List 130b is unknown or not available, then initiator 102' can periodically send DPP 122 messages over time on all available channels for a radio 102w. Note that in exemplary embodiments, the initiator configuration 130 is recorded in a configured device 102' with a WiFi radio 102w communicating with device 101 and responder 101x.

WiFi radio 102w can include standard radio components such as RF filters, RF amplifiers, a clock, and phased loop logic (PLL). WiFi radio 102w can support protocols and specifications according to the IEEE 802.11 family of standards. For example, if WiFi radio 102w operates according to 802.11n standards, WiFi radio 102w could operate at a radio frequency of 2.4 or 5 Ghz. In other embodiments where WiFi radio 102w supports 802.11ac standards, then WiFi radio 102w could also support radio frequencies of 0.054 through 0.79 Ghz in order to operate in "white space"

spectrum. Other possibilities exist as well for WiFi radio to support wireless LAN standards or 802.11 standards and radio frequencies, without departing from the scope of the present invention. WiFi radio 102w can access a nonvolatile memory 102f in order to record the depicted configuration values of user configuration 131 where the nonvolatile memory could be within WiFi radio 102w, or WiFi radio 102w could access memory 102f via bus 102j in order to record and read the values. User configuration 131 can include credentials for an initiator 102 with initiator user 102u, such as a list of SSIDs, identities, and passwords for operation of the initiator 102 with other networks besides network AP 105. For example, user configuration 131 may include a user operating class 131a, which could correspond to the WiFi global operating class, bands, and channel numbers for initiator 102 to communicate with other WiFi nodes besides device 101, such as a different access point for user 102u than access point 105

As depicted in FIG. 1d, a WiFi configured initiator 102' can include configuration data resulting from a configuration step 127, in order for initiator 102' to conduct a device provisioning protocol 191 with a device 101. A nonvolatile memory 102f for a WiFi configured initiator 102' can include data recorded for a default initiator 102, with the addition of recording a DPP application 102g and configuration parameters 151, and optionally shared secret key 198 for a PKEX key exchange, if bootstrap public keys between configured initiator 102' and device 101 are shared "in band" (e.g. via a radio link 192). The contents and source of DPP application 102g and configuration parameters 151 for initiator 102 will be further described in connection with FIG. 2a below, where the steps and message flows in FIG. 2a below also conclude with initiator 102 completing a configuration step 127 in order to transition to a configured initiator 102'.

Initiator 102 may also optionally include user interface 102k which may include one or more devices for receiving inputs and/or one or more devices for conveying outputs. User interfaces are known in the art and may be simple for many devices such as a few LED lights or and LCD display, and thus user interfaces are not described in detail here. User interface 102k could comprise a touch screen if initiator 102 has sophisticated interaction with user 102u. Initiator 102 can optionally omit a user interface 102k, if no user input or display is required for conducting a device provisioning protocol 191 between initiator 102' and device 101 with responder 101x. Although not depicted in FIG. 1d, initiator 102 and configured initiator 102' can include other components to support operation, such as a clock, power source or connection, antennas, etc. Other possibilities exist as well without departing from the scope of the present invention.

In exemplary embodiments, initiator 102 can also include a wide area network radio 102h. WAN radio 102h could support 4G LTE, 5G, and subsequent or related standards for use of devices with licensed radio spectrum operating potentially as public land mobile networks (PLMN). WAN radio 102h could also support wide area narrow-band technologies such as NB-IoT or LPWAN, and other examples exist as well. WAN radio 101h can provide connectivity through an access network 112 in order for initiator 102 or configured initiator 102' to communicate with network 107, DPP server 103, and discovery server 110 as depicted and described in connection with FIG. 1a. In other words, in the present invention, WAN radio 102h can provide a radio connection to an access network 112, which provides connectivity to an IP network 113 in order for initiator 102 and configured initiator 102' to communicate with remote servers in order to conduct a device provisioning protocol as contemplated herein. WAN radio 102h can include a MAC address MAC.N 102q, although the use of a MAC address for WAN radio 102h is not required. Further, WAN radio 102h can be omitted or not utilized by an initiator 102', in embodiments where initiator 102' can communicate with network 107 via network AP 105. For these embodiments, WAN radio 102h or WiFi radio 102w for initiator 102' can also record or utilize a first set of network credentials 109 in order to obtain access to network 107 while conducting a device provisioning protocol and the configuration object in message 124 from FIG. 1b and FIG. 1c can include a second set of network credentials 109 for responder 101x. Other possibilities exist as well for a configured initiator 102' to have access to network 107 while conducting a device provisioning protocol 191 without departing from the scope of the present invention.

Although not depicted in FIG. 1d, the various servers shown above in FIG. 1a such as DPP server 103, authentication server 111, and discovery server 110 and other servers as well can include equivalent internal electrical components depicted for an initiator 102 in order to operate as servers. The servers in FIG. 1a could include a processor similar to CPU 102c, with primary differences for the processor in a server being increased speed, increased memory cache, an increased number and size of registers, with the use of a 64 bits for datapath widths, integer sizes, and memory address widths, etc., In contrast, an exemplary 32 bit datapaths could be used for CPU 102c in initiator 102 (although CPU 102c could also use 64 bit wide datapath widths if initiator 102 comprises a mobile phone such as a smart phone). For embodiments where initiator 102 comprises a home WiFi router, then a CPU 102c in initiator 102 could comprise an exemplary 32 bit processor, although other possibilities exist as well. A processor for a DPP server 103 similar to CPU 102c could include a hardware-based encryption accelerator function, in order to conduct and speed symmetric ciphering operations such as with a symmetric encryption algorithm 405a and a symmetric decryption algorithm 405b depicted in FIGS. 4a, 4b, and 4c.

Figure 5A:
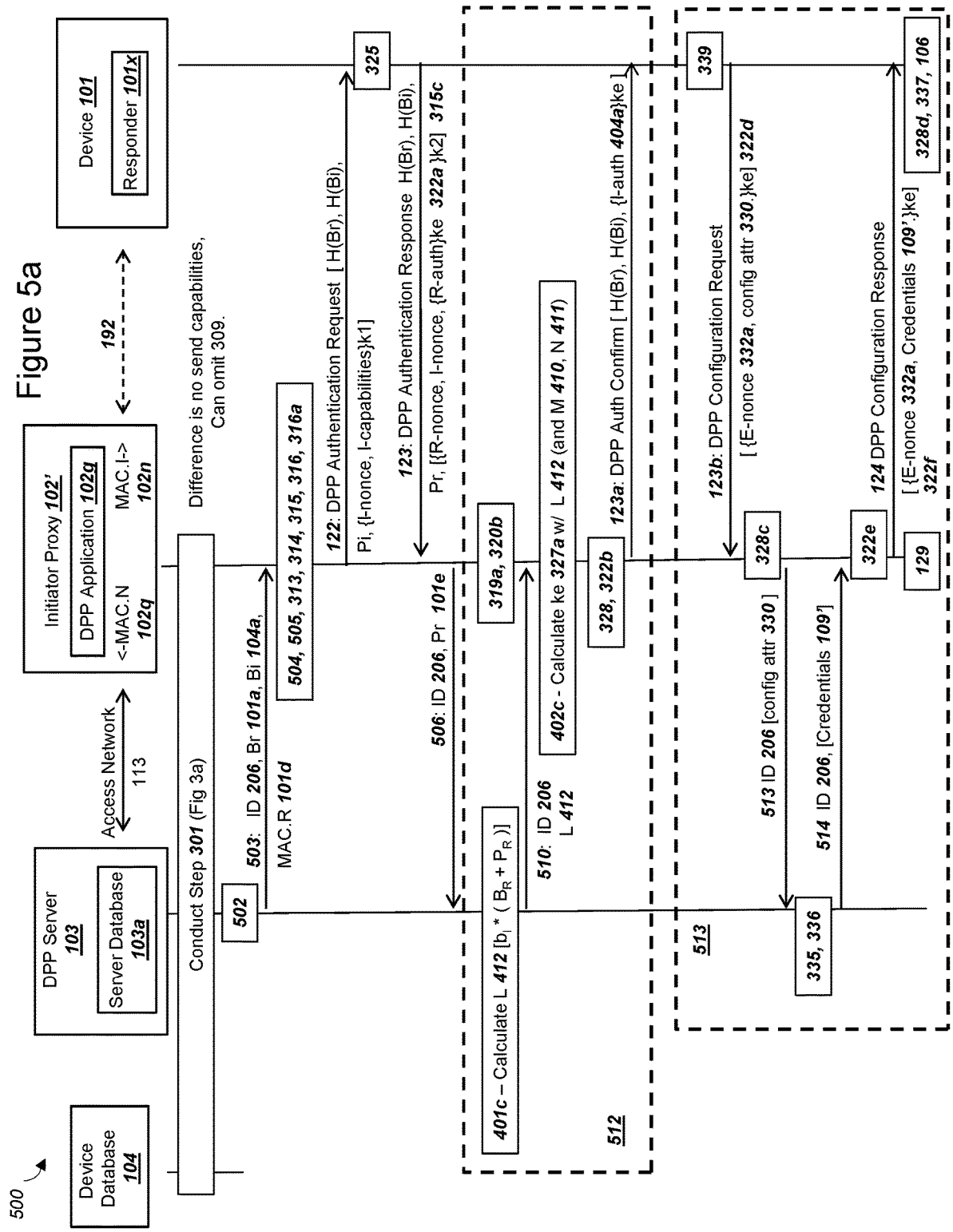
FIG. 5a is a simplified message flow diagram illustrating an exemplary system with exemplary data sent and received by a device database, a DPP server, an initiator proxy, and a responder, in accordance with exemplary embodiments.

Similarly, RANI in a server could be a RAM similar to RAM 102d in initiator 102, except the RANI in a server could have more memory cells such as supporting exemplary values greater than an exemplary 8 gigabytes, while RANI 102d in initiator 102 could support fewer memory cells such as less than an exemplary 4 gigabtyes. Nonvolatile memory for storage in a server in FIG. 1a could comprise disk storage, "solid state drives" (SSDs) or "storage area networks" (SAN) for a server. Instead of a radio 102w, in exemplary embodiments, a server in FIG. 1a could use a physical, wired LAN interface such as a high-speed Ethernet or fiber optic connection. The LAN interface for a server such as DPP server 103 could send and receive messages and data with initiator 102' as depicted in FIG. 3a, FIG. 5a, FIG. 5b, and subsequent Figures below. The LAN interface for a server such as DPP server 103 could also be used to setup secure sessions with initiator 102', such as sending and receiving messages according to a TLS protocol, VPN, SSH, IPSec, or similar standards.

FIG. 2a

Figure 2A:
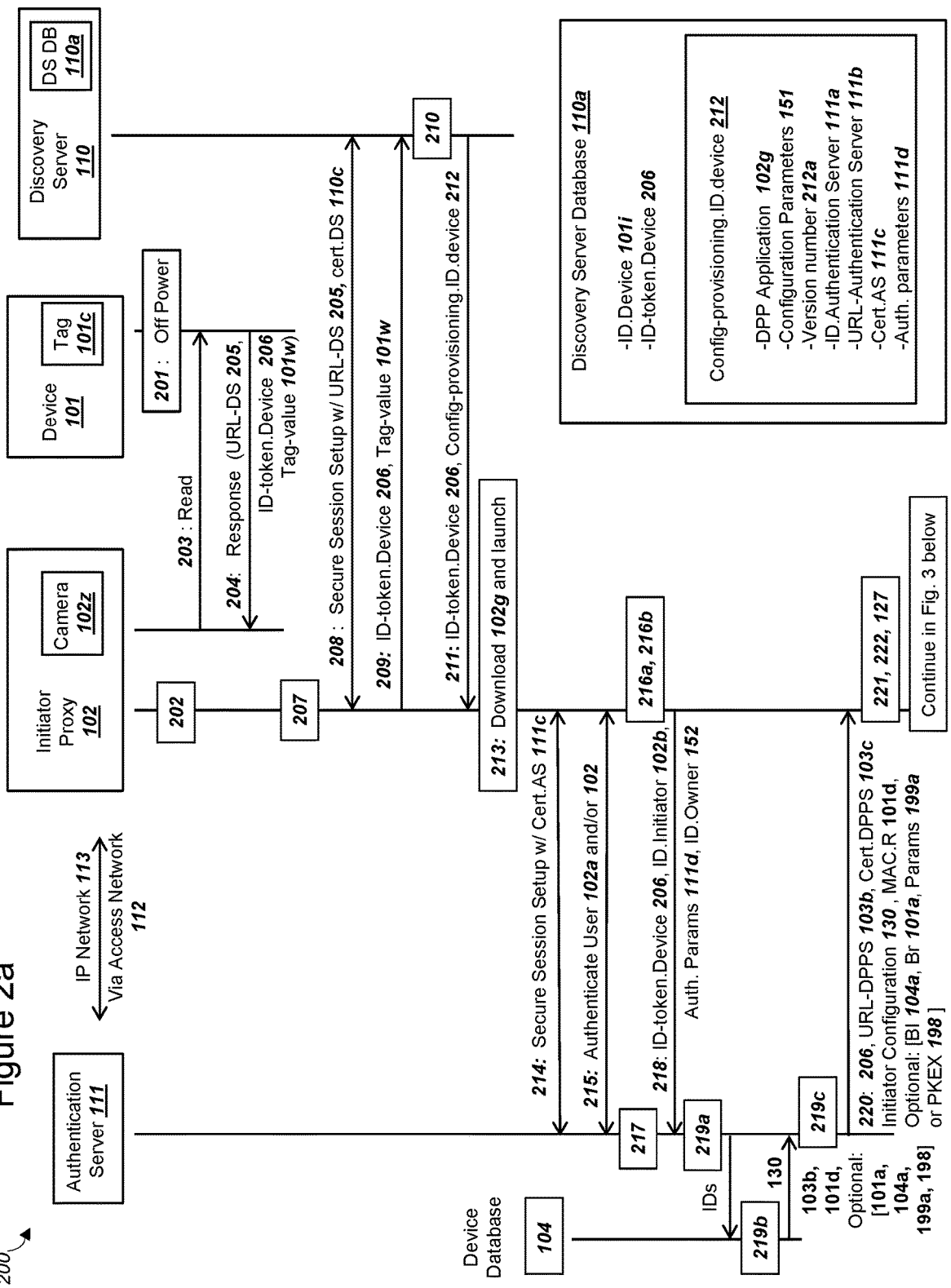
FIG. 2a is a simplified message flow diagram illustrating an exemplary system with exemplary data sent and received by an initiator, in accordance with exemplary embodiments.

FIG. 2a is a simplified message flow diagram illustrating an exemplary system with exemplary data sent and received by an initiator, in accordance with exemplary embodiments. System 200 can include an initiator 102, device 101, a discovery server 110 and authentication server 111. Initiator 102 can communicate with discovery server 110 and authentication server 111 via IP network 113, where access to IP network 113 can be provided via access network 112 for initiator 102 as depicted and described in FIG. 1a and FIG. 1d. Initiator 102 can comprise a smart phone such as, but not limited to, a phone based on an Android operating system from Google® or IOS from Apple®, and other possibilities exist as well. In addition, a mobile computing device with both a wireless WAN and wireless LAN connectivity could be used for an initiator 102 in system 200, such as a tablet, laptop computer, e-reader, etc. The present invention also contemplates that a fixed station initiator 102 could be utilized instead of a mobile unit in order to conduct the device provisioning protocol 191 and configuration step 106 with device 101. In exemplary embodiments, a fixed station initiator 102 could comprise a WiFi access point operated by a device owner, initiator user 102u, or network 107 in order to configure a plurality of device 101 in nearby physical proximity in order for the plurality of devices 101 to receive a plurality of sets of network access credentials 109.

Initiator 102 can include a battery, radio, and touch screen, as well as a camera 102z. Initiator 102 can connect with access network 112 in order to communicate with discovery server 110 and authentication server 111, as depicted in FIG. 1a above. The access network 112 used in a system 200 can be a different access network than access point 105 used by device 101 in FIG. 1a, although access network 112 for initiator 102 could also be through access point 105. For example, if device 101 is an access point to be configured, then initiator 102 could use WAN radio 102h in order to connect with network 107 via access network 112. If (i) an access point 105 is already operating with network access credentials 109, and (ii) a device 101 is to be configured to connect with access point 105, then initiator 102 could also use access point 105 for an access network 112 using a set of compatible network access credentials 109. In exemplary embodiments, access network 112 can comprise a wireless WAN such as 4G LTE, 5G, etc, which can comprise a primary access network for initiator 102 and backup network for device 101 (where the primary network for device 101 can comprise a wireless LAN through network access point 105).

Device 101 in system 200 can comprise a device 101 depicted in FIG. 1a and device 101 can also include a tag 101c. Tag 101c can comprise a recorded image on device 101 or packaging of device 101 and could be a bar code, QR code, or a serial number for device 101. Tag 101c can provide a unique identifier for device 101. In exemplary embodiments, if device 101 is a medical device, then tag 101c can include a Unique Device Identification (UDI). Although a device 101 could include a plurality of different tags 101c or markings for different purposes (such as shipping, inventory, a distributor code, etc.), for the purposes of conducting (i) a device provisioning protocol 191 and (ii) a read step 203 below by an initiator 102, the tag 101c as contemplated herein for device 101 could include distinct markings for an initiator user 102u to identify as the proper code to read for conducting a configuration step 127 of initiator 102. The distinct markings could comprise a pictogram or icon for a mobile phone or a wireless network next to the tag 101c, an outline around the tag 101c in a bright paint or distinguished color, and other possibilities exist as well for a device 101 to distinguish a tag 101c for a initiator user 102u from other markings, codes, serial numbers, etc. that may exist on a device 101.

In another embodiment for FIG. 2a, tag 101c could comprise a "near field communications" NFC tag such as a tag compatible with the NFC Forum standards for type 1 through type 5 tags (and subsequent or related standards). The NFC technology could also be NFC-A, NFC-B, or NFC-V, or subsequent standards. For these exemplary embodiments where tag 101c comprises an NFC tag, then initiator 102 could use an NFC reader instead of camera 102z, and the NFC reader could operate a NFC radio. Initiator 102 could utilize an NFC chip and antenna, where the NFC chip operates in read mode with tag 101c for device 101 as an NFC tag. In exemplary embodiments, discovery server 110 can include or be associated with a discover server database 110a. Database 110a could record information about a plurality of devices 101, such as ID.device 101i, and ID-token.device 206, and a dataset config-provisioning.ID.device 212, which will be described in further detail below for FIG. 2a.

At step 201 in FIG. 2a, device 101 can be in a powered off state. For a step 201 device 101 could be shipped from a manufacturer to a distributor and then to a device user or an initiator user 102u. A device 101 could also be taken to the physical proximity (e.g. WiFi RF range) of network access point 105 in a step 201. In some embodiments, device 101 could be powered on at step 201, although power for device 101 is not required for embodiments with the steps and message flows outlined in FIG. 2a. At step 202, initiator 102 could be powered on and placed in proximity of device 101. Initiator 102 could be operated by an initiator user 102u at step 202. At step 203, initiator user 102u could use camera 101z in initiator 102 to conduct a "read" step 203, where initiator 102 can (i) take a picture of a tag 101c for device 101, or (ii) read a bar code, QR code, printed serial number, or similar code or markings on device 101. As mentioned above, tag 101c could comprise a bar code, QR code, or other encoding of data for device 101, including a serial number. For the alternative embodiment where (i) initiator 102 uses an NFC reader and (i) tag 101c comprises an NFC tag, the initiator 102 could conduct an NFC read of tag 101c for step 203 and step 204.

At step 204, initiator 102 can receive data from tag 101c, such as a response, where the response can consist of a uniform resource locator (URL) for discovery server 110, URL-DS 205, an ID-token.device 206, and a tag value 101w. The response at step 204 could be recorded in the tag 101c. URL-DS 205 could include a domain name for discovery server 110 and parameters such as the use of HTTP or HTTPS and a destination TCP or UDP port number for initiator 102 to send packets to discovery server 110. ID-token.device 206 can be an identifier for device 101 and/or responder 101x and could be a token for ID.device 101i, or a value or unique pseudo-random number associated with device 101 and/or ID.device 101i. ID-token.device 206 could be a value that obfuscates ID.device 101i but can preferably uniquely map to ID.device 101i in a system 100 or 200 with a plurality of devices 101. Through the use of ID-token.device 206 that is readable by initiator 102, then a normal operating value for ID.device 101i with a network 107 can remain confidential at step 204. Or, in some exemplary embodiments an ID.device 101i can be the same as ID-token.device 206.

Tag value 101w in response 204 can include data associated with tag 101c and device 101, such as versions of software supported, product validity or expiration dates, a responder bootstrap public key Br 101a, cryptographic parameters 199 supported (e.g. RSA or ECC), a curve name utilized for an ECC cryptographic algorithm, a name or URL for Certificate Authority 107 used by manufactured device 101, a certificate for device cert0.device 101m (equivalent to cert0.initiator 102m in FIG. 1d), or a subset of the values in config-provisioning.ID.device 212. In an exemplary embodiment, tag value 101w could comprise some values of config-provisioning.ID.device 212 upon manufacturing of device 101, which could be subsequently updated at a later date in discovery server DB 110a before installation or operation of device 101 with AP 105 and/or network 107. For exemplary embodiments where tag 101c comprises a bar code or QR code or similar markings, then tag value 101w can be limited to fewer bytes such as listing URL-DS 205 and ID-token.device 206. For exemplary embodiments where tag 101c comprises an NFC tag capable of storing an exemplary few thousand bytes, then tag value 101w could include more values and data listed in the first sentence of this paragraph.

In other exemplary embodiments where a lower level of security can be required in order to have simplified functionality, tag value 101w can comprise MAC.R 101d, responder bootstrap public key Br 101a, a parameter set 199a, configuration 130, and/or a version number 212a. For these simplified embodiments, initiator 102 can (i) read tag value 101w, load a DPP application 102g compatible with version number 212a and parameter set 199a, (iii) optionally send Br 101a to a DSS server 103, and (iii) load configuration 130 for WiFi radio 102w, and thereby skip the remaining steps and message flows depicted in FIG. 2a. In other exemplary embodiments where a higher level of security is desired and a system 100 or 200 could comprise millions of devices, or high-value devices, and thousands or more initiators 102, then the full set of steps and message flows depicted in FIG. 2a may be preferred.

At step 207, initiator 102 could process the data received in response 204. For embodiments where tag 101c is an image such as a bar code or QR code, at step 207 initiator 102 could process the image and extract the data or values for ID-token.device 206, URL-DS 205, and tag value 101w. Continuing at step 207, initiator 102 could connect with an access network 112 in order to call the URL in URL-DS 205, which could be an HTTPS/TLS session in exemplary embodiments. In exemplary embodiments, URL-DS 205 is combined with ID-token.device 206, such that the HTTPS session is a unique request to discovery server 110 for each different device 101. In exemplary embodiments, the value ID-token.device 206 can have enough information entropy or pseudo randomness that it cannot be easily guessed, such as (i) appearing to be an exemplary 32 byte random number, and (ii) not related to a value ID-token.device 206 for another device 101 in any externally observable manner such as in sequence, or sharing similar common factors, etc. By combining a URL-DS 205 with a unique and a sufficiently randomized ID-token.device 206, only an initiator 102 physically in the presence of device 101 (or by reading tag 101c) could feasibly query discovery server 110 with a fully and properly formed query/URL to fetch the subsequent data from discovery server 110. At step 207, initiator 102 could perform additional checks and steps in preparation for communication with device 101, such as verifying data in tag value 101w is compatible with software or settings in initiator 102, including DPP application 102g (if DPP application 102g is already installed in initiator 102).

In message flow 208, initiator 102 can establish a secure HTTPS session with discovery server 110 using the URL-DS 205, and the secure session could comprise a transport layer security (TLS) session such as TLS version 1.2, TLS version 1.3, or similar and subsequent standards. As part of the setup of message flow 208, initiator 102 can receive a certificate cert.DS 110c from discovery server 110. Cert.DS 110c could comprise an X.509 certificate and include a signed public key for discovery server 110. In exemplary embodiments, initiator 102 verifies the certificate cert.DS 110c and parent certificates through root certificate cert.CA.root 102r. The verification of signatures using public keys in certificates can use the signature verification steps as specified in the US National Institute of Standards and Technology (NIST) FIPS 186-4 titled "Digital Signature Standard" and subsequent or related versions. Note that a secure session 208 is not required for some exemplary embodiments, and confidentiality and/or data integrity could be acquired via other means besides HTTPS and/or TLS or DTLS, including embodiments were data flow from discovery server 110 to initiator 102 be signed. Other possibilities exist as well for a message flow 208 to be adequately secured.

In exemplary embodiments initiator 102 can also authenticate with discovery server 110, such as an initiator user 102u associated with initiator 102 entering user credentials in a web site for discovery server 110. Or initiator 102 could send discovery server 110 a certificate for initiator 102 cert.initiator 102m, which the discovery server 110 could verify using a signature verification step. As contemplated herein, a message flow 208 and all subsequent message flows depicted and described can comprise a series of parts or sub-messages, where the collection of sub-messages or parts can comprise the message. In other words, a message depicted with multiple elements for sets of data within the message does not require that all data be transferred together or in a single flow of TCP or UDP data. Transferring the message could comprise sending exemplary data within the message in parts, where upon conclusion of the message, (i) exemplary data depicted and described could be transferred in parts or portions and (ii) the collection of sending different parts or portions for the message could comprise sending the message, such as a message 208.

In message 209 and after the secure HTTPS/TLS session setup in message flow 208, initiator 102 can send discovery server 110 ID-token.device 206 and data from tag value 101w. Or, the value for ID-token.device 206 could be included in the URL called by initiator 102 when accessing discovery server 110, and in this manner a value ID-token.device 206 does not need to be sent again in a separate message 209. Initiator 102 could alternatively send discovery server 110 a subset of the data for ID-token.device 206 and/or tag value 101w.

At step 210, discovery server 110 can use data in ID-token.device 206 and message 209 to query discovery server database 110a for the values or data sets ID.device 101i and config-provisioning.ID.device 212. Discovery server database 110a may comprise a database with tables to track configuration information for a plurality of devices 101 and record values for config-provisioning.ID.device 212 for each device 101 in a system 200. A device manufacturer or device owner could send initial data for a device 101 to discovery server 110 and discovery server database 110a. In exemplary embodiments, config-provisioning.ID.device 212 contains data used by initiator 102 for the configuration of device 101, including conducting a device provisioning protocol 191. Exemplary data depicted for config-provisioning.ID.device 212 in FIG. 2a includes DPP application 102g, configuration parameters 151, version number 212a, ID.Authentication Server 111a, URL-authentication Server 111b, cert.AS 111c, auth. parameters 111d. Additional or other data for initiator 102 and device 101 could be included in discovery server database 110a and values for config-provisioning.ID.device 212. The data for config-provisioning.ID.device 212 can comprise a set of values or a table of data for initiator 102 and/or a DPP application 102g to use in order to conduct a configuration step 106 with device 101, where a specific device 101 can be identified by either ID-token.device 206 or ID.device 101*i*.

DPP application 102*g* in a config-provisioning.ID.device 212 can specify the name or URL of a software application for initiator 102 to utilize (e.g. a field with less than a few hundred bytes), instead of comprising the full software package for DPP application 102*g* in exemplary embodiments (where the full DPP application 102*g* could comprise several megabytes or more). For these exemplary embodiments, initiator 102 could utilize the name or URL to fetch the software for DPP application 102*g*. DPP application 102*g* could be a public or private application for the operating system 102*e* of initiator 102. For embodiments where initiator 102 utilizes an Android-based operating system, DPP application 102*g* could be downloaded from the Google Play store or a private web site associated with network 107. For embodiments where initiator 102 utilizes an Apple®/IOS-based operating system, DPP application 102*g* could be distributed through a developer enterprise program or downloaded through an "App Store" or iTunes®. Other possibilities exist as well without departing from the scope of the present invention for an initiator 102 to download a DPP application 102*g*, where the name of DPP application 102*g* is received from a discovery server 110, after initiator 102 sends a message 209 with an identity for device 101 to a discovery server 110.

As depicted in FIG. 2*a*, values for config-provisioning.ID.device 212 sent to initiator 102 and received by initiator 102 may also include configuration parameters 151 and version number 212*a*. Configuration parameters 151 may include values and data for initiator 102 to utilize with configuration application 102*g* and communicate with device 101 using a WiFi radio 102*w*. Exemplary uses of parameters 151 with initiator 102 conducting a configuration step 106 can comprise (i) cryptographic algorithms to utilize, (ii) ECC curve names and key lengths and associated data, (iii) selection and parameters for a WiFi radio 102*w* in initiator 102 to communicate with device 101, including the selection of one of multiple possible radios in initiator 102, (iv) addresses, names, and port numbers to utilize with IP network 113 including IP version number such as IP4 or IP6, (v) timers and retry counts for communication with device 101 or DPP server 113 or authentication server 111, (vi) parameters for network 107 including a certificate authority, RSA PKI keys, selected cryptographic algorithms, etc, and (vii) parameters for communicating with device 101, etc.

Version number 212*a* for config-provisioning.ID.device 212 may specify a version number of DPP application 102*g* to utilize, or a list or dataset of version numbers of standards supported, such as IP version of IP network 113, WiFi radio 101*h* type such as 802.11ac or 802.11ax, TLS or DLTS version supported by device 101, etc. In exemplary embodiments, not all of the values depicted for config-provisioning.ID.device 212 are sent from a discovery server 110 to an initiator 102, and only a subset of the depicted values are sent instead. In an exemplary embodiment, similar but different to that depicted in FIG. 2*a*, the data within config-provisioning.ID.device 212 and a message 211 can include all the data for a message 220 below, and in these embodiments an initiator 102 could use config-provisioning.ID.device 212 to conduct a configuration step 127 for initiator 102 and then proceed to step 301 in FIG. 3*a*, thereby omitting the subsequent steps depicted in FIG. 2*a*.

As depicted in FIG. 2*a*, config-provisioning.ID.device 212 sent to initiator 102 may also include ID.authentication Server 111*a*, URL-authentication Server 111*b*, cert.AS 111*c*, auth. parameters 111*d*. ID.Authentication Server 111*a* could comprise an identity or name for authentication server 111, such as a domain name or multiple domain names for multiple servers. URL-Authentication Server 111*b* could comprise a URL for configuration application 102*g* to call in order to authenticate with authentication server 111. In some exemplary embodiments, URL-authentication server 111*b* includes either ID.Device 101*i* or ID-token.Device 206, so that when initiator 102 using DPP application 102*g* calls URL-authentication Server 111*b*, the URL includes a unique string that identifies device 101. Or, in another exemplary embodiment, initiator 102 can (a) call URL-authentication server 111*b* without an identity for device 101, and subsequently (b) send either ID.Device 101*i* or ID-token.Device 206. Cert.AS 111*c* could comprise a certificate for authentication server 111 where cert.AS 111*c* could include (i) a public key for authentication server 111 and (ii) a signature of a certificate authority. Authentication parameters 111*d* can include parameters for DPP application 102*g* to utilize with authentication server 111, such as, but not limited to, hash or message digest algorithms, digital signature algorithms, padding schemes, key lengths, nonce or challenge lengths, timers, and retry counts, encoding rules, TLS or DTLS versions supported, cipher modes supported (e.g. AES-CBC, AES-CTR), etc.

Message 211 from discovery server 110 to initiator 102 can communicate the above fields and values described for config-provisioning.ID.device 212 and ID.device 101*i*, as depicted in FIG. 2*a*. In an exemplary embodiment, discovery server 110 can send initiator 102 the full DPP application 102*g* with the response 211 (e.g. several megabytes or more) instead of a name or URL for DPP application 102*g* (e.g. less than a few hundred bytes), if the current, updated DPP application 102*g* is not already downloaded by initiator 102. In another exemplary embodiment, initiator 102 can download DPP application 102*g* in a step 213 as depicted in FIG. 2*a*, if initiator 102 has not already installed the software for DPP application 102*g* after receiving message 211. For example, response or message 211 could include a version number 212*a* that is higher or different than initially utilized by initiator 102 and/or an initial DPP application 102*g*, and consequently the higher version number 212*a* could indicate to initiator 102 that a different DPP application 102*g* would be required in order to communicate with device 101 operating responder 101*x*. In exemplary embodiments, DPP application 102*g* downloaded in a step 213 can include a hash signature that can be verified by initiator 102 before using the software for a DPP 191 with device 101.

Step 213 may comprise initiator 102 loading and launching the DPP application 102*g* and applying a subset of configuration parameters 151 or tag-value 101*w*. If any of the steps depicted in FIG. 2*a* fail, error codes or messages could be displayed through initiator 102 to initiator user 102*u*. After successful launch of DPP application 102*g*, initiator 102 can connect with authentication server 111. The subsequent steps shown performed by an initiator 102 after a step 213 in FIG. 2*a* could be performed by a DPP application 102*g* using data within config-provisioning.ID.device 212. In exemplary embodiments, DPP application 102*g* could be included with the operating system 102*e* for initiator 102, and in this case a separate download of DPP application 102*g* may not be required.

Secure session setup 214 could comprise a secure HTTPS session with authentication server 111 using the URL-authentication server 111*b*, and the secure session could comprise a transport layer security (TLS) session such as TLS version 1.2, TLS version 1.3, or similar and subsequent standards. Other networking standards besides HTTPS and TLS could be utilized as well for secure session setup 214, such as an IPSec tunnel. As part of the setup of secure session setup 214, initiator 102 can receive a certificate cert.AS 111c from authentication server 111, if initiator 102 had not already received cert.AS 111c from discovery server 110. Initiator 102 could verify cert.AS 111c after receiving the certificate, such as verifying a signature from a certificate authority and parent certificates of cert.AS 111c as well all the way to recorded cert.CA.root 102r, which is depicted above in FIG. 1d. In other words, a secure session setup 214 can mutually authenticate both authentication server 111 and initiator 102, such as using certificates from both sides with TLS. An additional layer of authentication can be performed by an initiator user 102u, although authentication for all of authentication server 111, initiator 102, and initiator user 102u is not required for some embodiments.

In message 215, initiator 102 transmits authentication information to authentication server 111, and authentication server 111 verifies the authentication information in a step 217. The authentication information transmitted in a message 215 could comprise information to authenticate (i) initiator user 102u, (ii) initiator 102, or (iii) both initiator user 102u and initiator 102. The authentication information in message 215 may comprise an initiator user 102u entering identification and credential information in a touch screen of initiator 102, and the information is passed to authentication server 111 (possibly in an encrypted or hashed form). In exemplary embodiments, initiator user 102u provides biometric data such as a fingerprint, an image of the user's face, or similar data, where initiator 102 transmits confirmation or signatures for the data through secure session setup 214 to authentication server 111, and the authentication server 111 verifies the biometric data or signatures of the biometric data is associated to initiator user 102u. In some exemplary embodiments, a separate authentication of an initiator user 102u can be omitted from a message 215, and authentication and/or authorization of initiator 102 can be accomplished from other steps and messages without departing from the scope of the present invention.

Message 215 may also request the verification of initiator 102 with authentication server 111. In exemplary embodiments, initiator 102 records a certificate Cert0.initiator 102m for initiator 102. The certificate for initiator 102 includes a public key for the initiator 102 and a signature by a certificate authority. In an authentication step 217, authentication server can use the information in message 215 to verify the identity of an initiator user 102u and/or initiator 102. In embodiments where initiator 102 uses a device certificate for initiator 102 (which could be a Cert0.initiator 102m), authentication server 111 could verify that initiator 102 also records the private key SK0.initiator 102s, by (i) sending a challenge/random nonce and (ii) verifying a signature for the challenge/nonce from initiator 102 using the private key 102s for cert0.initiator 102m. Authentication server 111 can verifiy the signature using the public key for initiator 102 from Cert0.initiator 102m. Message 215 and authentication 217 could be conducted using authentication parameters 111d, which could be previously included in Config-provisioning.ID.device 212. A network 107 can require that an authentication step 217 is successfully completed for initiator 102 and/or initiator user 102u before sending a message 220 below.

In step 216a of FIG. 2a, initiator 102 may also authenticate authentication server 111, using cert.AS 111c. In step 216b, initiator user 102u can enter device owner information into initiator 102, such as an owner name, a DNS name associated with owner, or a code or other value to identify a device owner. Device owner information could be automatically recorded for DPP application 102g or initiator 102 before a configuration step 106 from FIG. 1a. For example, initiator 102 with DPP application 102g may operate on a mobile phone, and the owner of device 101 can be associated with or specified by the initiator user 102u. For example, if a home owner with a mobile phone wishes to configure a plurality of devices 101 for his or her home, an owner identity 152 can be selected based on the user of a mobile phone which could be the initiator user 102u. An owner identity 152 or device owner information could comprise a telephone number for initiator user 102u, an email address, or a user name. Other possibilities exist as well without departing from the scope of the invention. The value identifying a device owner could be ID.owner 152, although the use of ID.owner 152 could be optionally omitted.

In some embodiments, the value of ID.owner 152 could be recorded in a tag 101c, such as if device 101 comprises leased equipment that is owned by a different entity than an initiator user 102u. Note that a tag 101c could also comprise a collection of different tags, such that a first tag could specify a URL-DS 205 (which could be a label or sticker applied by a manufacturer), and a second tag could specify ID.owner 152 (which could be a label or sticker or mark applied to device 101 by an owner). A step 216b can function to associate (i) device 101 with device owner for (ii) a network 107. In exemplary embodiments, millions of devices 101 could be distributed out to millions of device owners. Network 107 may prefer to know which devices 101 are associated with which device owners by using a value of ID.owner 152. In an exemplary embodiment, the value ID.owner 152 could be included in a set of Config-provisioning.ID.device 212 for cases where device owner can register the ID.device 101i with discovery server 110 before initiator 102 sends message 209 to discovery server 110.

In message 218, initiator 102 can send a first set of identities to authentication server 111 through the secure session setup in 214, and also send authentication parameters 111d. Note that in some embodiments the set of authentication parameters 111d can be sent from authentication server 111 to an initiator 102 in a response to message 218. The list of identities in a message 218 can include an ID.device 101i (or ID-token.device 206), ID.initiator 102bi, and ID.owner 152, as depicted in FIG. 2a.

In step 219a, authentication server 111 can process the first set of identities received in message 218. A step 219a could comprise authentication server 111 verifying that initiator 102 with initiator user 102u is authorized to configure or provision device 101. In other words, the prior step 217 could be an initial step to verify or authenticate identities, and then the subsequent step 219a could be verifying that the authenticated identities for initiator 102 have privileges or authorization to conduct a configuration step 106 or a DPP 191 with device 101. For a step 219a, authentication server 111 may communicate with a device database 104 in order to confirm that initiator 102 with an initiator user 102u is authorized to conduct configuration step 106 and a DPP 191 with device 101 identified by ID.device 101i or ID-token.device 206. Authentication server 111 can utilize any or all of the identities received in message 218 in order to identify and communicate with the correct device database 104 and determine authorization for initiator 102 and/or initiator user 102u. In exemplary embodiments, an identity for a device or initiator such as ID.device 101i or ID.initiator 102i includes a domain name (e.g. 12345.example.com), and an entity receiving the identity can locate a home network and/or servers associated with the identity using the domain name portion of the identity using DNS security (DNSSEC).

Although not depicted in FIG. 2a, authentication server 111 could utilize a mutually authenticated secure channel such as TLS v1.3 with a device database 104 in a step 219a. In some exemplary embodiments, a step 219a could be optionally omitted, for example if a device owner is also an initiator user 102u, such as a home owner using initiator 102 and installing a device 101 in their home. In these embodiments, an authentication step 217 may be sufficient to allow/authorize initiator 102 to conduct the DPP 191 and configuration step 106. Other possibilities exist as well for an authentication server 111 use a step 219a to authorize that an authenticated initiator 102 and/or initiator user 102u can conduct a DPP 191 and configuration step 106 without departing from the scope of the present invention.

After the authorization step 219a for initiator 102, authentication server 111 can query device database 104 for (i) initiator configuration 130 for device 101 using ID.device 101i or ID-token.device 206, and (ii) a DPP server URL 103b for initiator 102 to utilize in order to conduct a device provisioning protocol 191 and configuration step 106 with device 101, (iii) MAC address for responder 101x of MAC.R 101d, and (iv) optionally, responder public bootstrap keys Bi 104a and Br 101a or a PKEX key 198 for conducting a public key exchange protocol. The optional sending of bootstrap public keys and MAC address for responder 101x can depend on the selected operation of initiator 102 for conducting a DPP 191, which is also referred to as initiator mode 306a below including FIG. 3a. For embodiments depicted in FIG. 3a below, the bootstrap public keys Bi 104a and Br 101a can remain in DPP server 103, and in these embodiments and initiator modes 306a, then the query to device database 104 after step 219a can query for (i) through (iii) in the first sentence of this paragraph. In other words, for the embodiments depicted in FIGS. 3a and 5b, the public bootstrap keys Bi 104a and Br 101a, may optionally not be queried and sent back to authentication server 111 and initiator 102, but remain in a network 107 for enhanced security purposes.

Figure 6A:
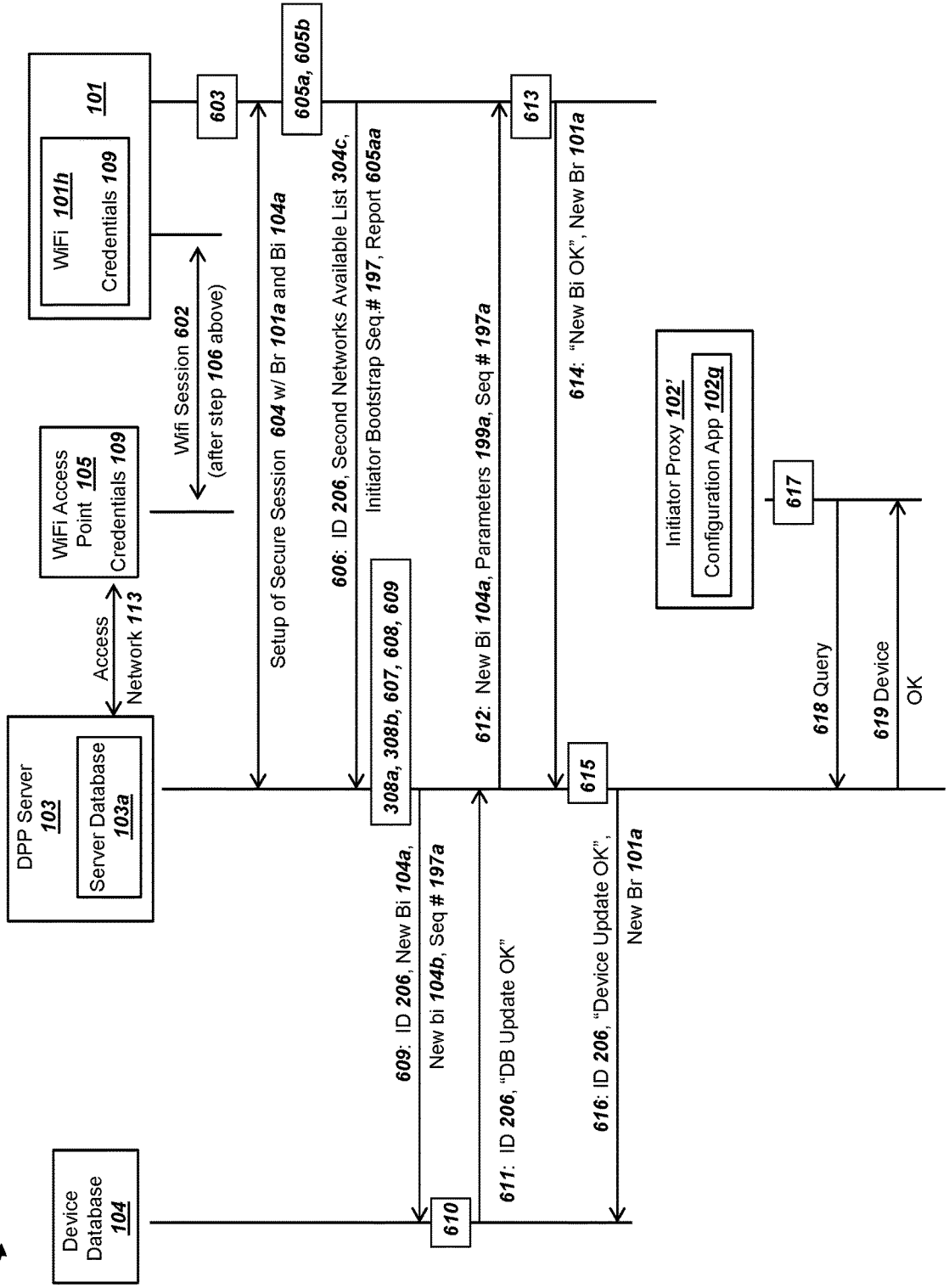
FIG. 6a is a simplified message flow diagram illustrating an exemplary system with exemplary data sent and received by a device database, a DPP server, a WiFi access point, and a device, in accordance with exemplary embodiments.

For embodiments depicted in FIG. 5a, the public bootstrap keys Bi 104a and Br 101a, may optionally be queried and sent back to authentication server 111 and initiator 102, in order for initiator 102 and DPP server 103 to conduct the steps and message flows depicted and described in connection with FIG. 5a. Other possibilities exist as well for a query and communication of data between an authentication server 111 and a device database 104 after an authorization step 219a without departing from the scope of the present invention. Note that in exemplary embodiments, initiator bootstrap private key bi 104b can continue to reside within device database 104 and/or network 107 and may optionally not be sent back to initiator 102. By not sending key bi 104b to initiator 102, the secure operation of a DPP 191 can be enhanced using the combined operation of an initiator 102 and DPP server 103 as depicted in FIG. 3a, FIG. 5a, and FIG. 6a.

A device database 104 in FIG. 2c can comprise a database for a plurality of devices 101, and device database 104 was depicted in FIG. 1a above and also FIG. 2b below. Device database 104 can record data for the plurality of devices 101 in a system 100, including data for device identities, responder MAC addresses 101d, device public bootstrap keys Br 101a, initiator bootstrap PKI keys, PKEX keys 198, and initiator configuration 130, and other data as well in order to support the operation of a DPP 191 using an initiator 102 with DPP server 103. A device database 104 could also record additional data pertaining to device 101 with ID.device 101i, such as (i) a DPP server 103 to use with device 101 and/or initiator 102, where the location or identity of DPP server 103 could be in the form of a DPP server URL 103b (depicted as URL-DPPS 103b), and also (ii) a certificate for DPP server 103 comprising cert.DPPS 103c. In a step 219b. device database 104 can use the identities received from authentication server 111 in order to query for data such as (i) through (iv) described in two paragraphs above.

For a step 219b, if device database 104 does not record or have the device 101 identity ID.device 101i or ID-token.device 206, or initiator configuration 130, and/or URL-DPPS 103b, then for step 219b device database 104 could point authentication server 111 to another server or location for the exemplary queried data (i) through (iv) described in three paragraphs above and depicted in FIG. 2a. The other server or location for queried data (i) through (iv) could be recorded possibly by a device manufacturer which could also record a second device database 104. Note that a device manufacturer could record some of the data for a device database 104, since the data such as MAC address, public bootstrap keys, etc. could be recorded upon manufacturing, although other possibilities exist as well.

Recording URL-DPPS 130b in a database 104 can provide greater flexibility for conducting a DPP 191 and configuration step 106 with a device 101 since an initiator user 102u or device owner may prefer that a DPP 191 or configuration step 106 be performed using a particular DPP server 103. However, that the DPP server 103 may not be known by a device manufacturer at the time of manufacturing of device 101. In other words, (a) a device manufacturer cannot write a value for a URL-DPPS 103b to memory of device 101 (or on a tag 101c) if (b) the device manufacturer does not know the value before the device 101 is shipped away from the device manufacturer facilities. Further, an initiator 102 may not know which of a plurality of possible DPP servers 103 to utilize when conducting a DPP 191 with a device 101 without receiving the data for a URL-DPPS 130b via IP network 113 such as from a network 107 or authentication server 111. Thus, URL-DPPS 130b can be queried or selected in a step 219b after initiator 102 sends network 107 an identity for device 101 in a message 218 along with an identity for initiator 102.

At step 219c, authentication server 111 could receive and process data from device database 104. The received data could comprise (i) initiator configuration 130 for ID.device 101i or ID-token.device 206, and (ii) a DPP server URL 103b for initiator 102 to utilize in order to conduct a device provisioning protocol 191 and configuration step 106 with device 101 (possibly with a certificate cert.DPPS 103c), (iii) MAC address for responder 101x of MAC.R 101d, and (iv) optionally, public bootstrap keys Bi 104a and Br 101a or a PKEX key 198 for conducting a public key exchange protocol. Although not depicted, an identity for device 101 or initiator 102 could also be returned in the data received for step 219c, since authentication server 111 may process data for a plurality of different initiators 102 and devices 101. In another exemplary embodiment, authentication server 111 could record a device database 104 for a plurality of devices 101 in a system 100 and system 200 and in this embodiment then step 219c could represent querying a locally stored or locally accessible device database 104 for authentication server 111 to obtain the depicted data. Further, in exemplary embodiments where initiator 102 can operate as an initiator 102* depicted in FIG. 1b (and not as an initiator proxy 102' depicted in FIG. 3a, FIG. 5a, and FIG. 5b below), then the present invention also contemplates that initiator bootstrap private key bi 104b could also be received by authentication server 111 and subsequently sent in a message 220 to initiator 102.

As depicted in FIG. 2a, authentication server 111 can send initiator 102 a message 220 through secure connection 214, where message 220 can include a device 101 identity such as ID-token.device 206 (since initiator 102 may communicate with a plurality of devices 101), (i) initiator configuration 130 for ID.device 101i or ID-token.device 206, and (ii) a DPP server URL of URL-DPPS 103b for initiator 102 to utilize in order to conduct a device provisioning protocol 191 and configuration step 106 with device 101 (possibly with a certificate cert.DPPS 103c), (iii) MAC address for responder 101x of MAC.R 101d, and (iv) optionally, public responder bootstrap keys Bi 104a and Br 101a or a PKEX key 198 for conducting a public key exchange protocol. For embodiments where public bootstrap keys Bi 104a and Br 101a are sent in message 220, then also associated data for the keys could be sent such as a selected set of parameters 199a, such that an initiator 102 could determine which cryptographic parameters are associated with the keys (such as an ECC curve name, key lengths, hash algorithms, etc.) An authentication server 111 could receive a selected set of cryptographic parameters 199a for bootstrap keys from device database 104.

Initiator 102 could receive message 220 and read and record the data received. ID-token.device 206 can be useful in a message 220 for initiator 102, because initiator 102 could communicate with a plurality of devices 101 over time and thus keep track of which message 220 is for which device 101. Note that ID.device 101i could be sent instead of or in addition to ID-token.device 206.

At step 221, initiator 102 could process data received in message 220. Initiator 102 could determine if data for initiator configuration 130 is supported by initiator 102, such as if a WiFi radio 102w supports a specified operating class 130a. For example, responder 101x may operate on WiFi at 60 Ghz and WiFi radio 102w may not support 60 Ghz, and in this case initiator 102 could in step 221 abort attempts to conduct a device provisioning protocol 191 with responder 101x. At step 221, initiator 102 could also determine if other data received in message 220 is supported by initiator 102, such as if key lengths or associated parameter sets 199a for any keys received in message 220 are supported by initiator 102 and potentially DPP application 102g. For example, if a bootstrap public key Br 101a is received in message 220 with a selected set of cryptographic parameters 199a that are not supported by DPP application 102g (such as a curve name not supported by initiator 102 with DPP application 102g), then initiator 102 could terminate further attempts at conducting a DPP 191 and also notify initiator user 101a.

Note that as contemplated herein, the transfer of a PKI key in a message can also be with the transfer of a corresponding selected set of cryptographic parameters 199a. If a message is depicted in FIG. 2a (and other figures below), as transferring a PKI key, such as, but not limited to, Br 101a, then a selected set of cryptographic parameters 199a can be sent with the key as well. If parameters 199a are not received by a node when receiving a PKI key, or the parameters are otherwise unknown (such as the parameters not being previously selected and sent/received), then initiator 102 can operate with the assumption the PKI keys are for set "A" in a set of parameters 199 below in FIG. 2b, which would also comprise the basic set of parameters for device interoperability as specified by cryptographic suite 1 in section 3.2.3 of DPP specification version 1.0.

Figure 8:
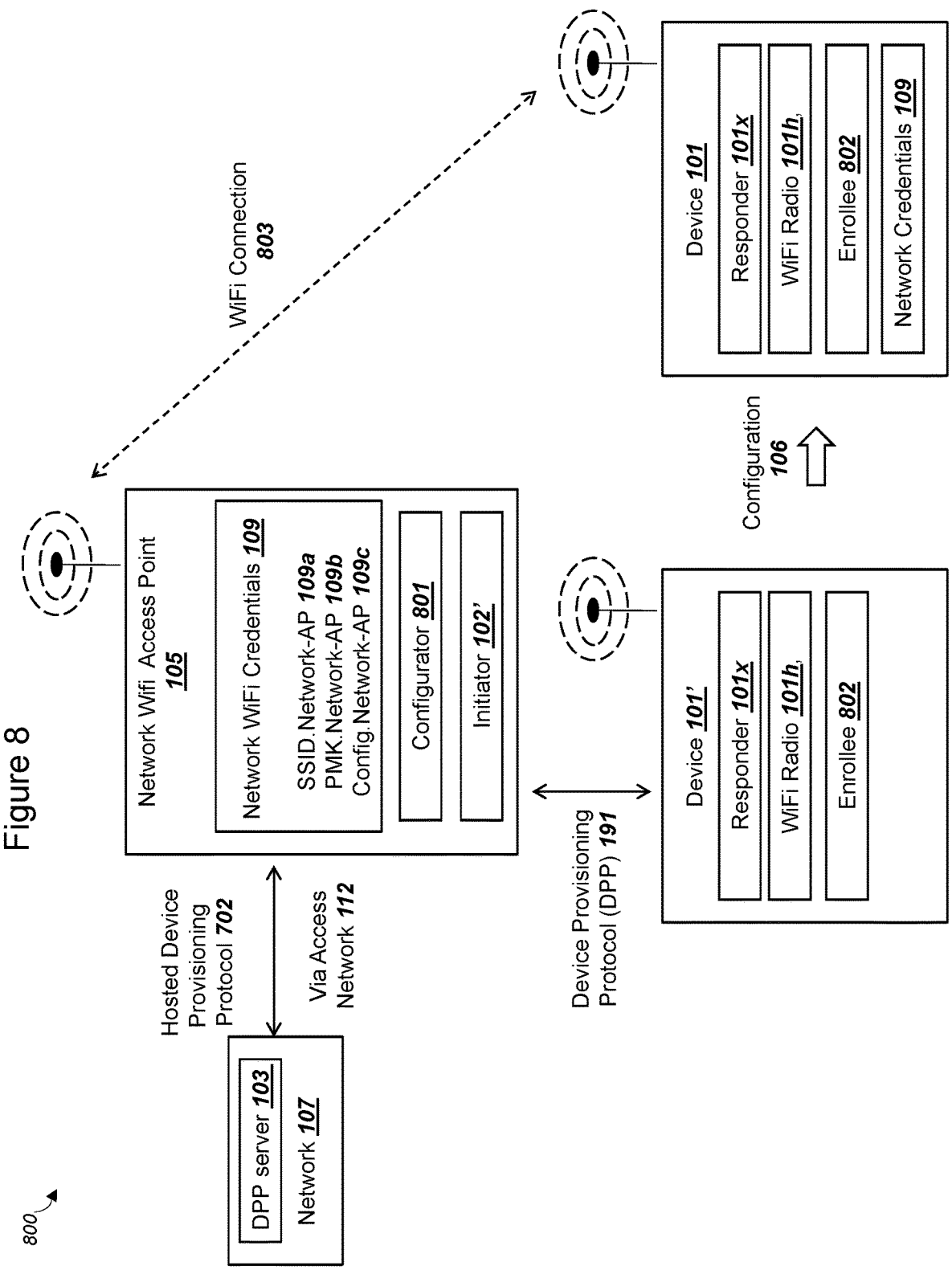

At step 222, initiator 102 could determine an initiator mode 306a (from FIG. 3a below) for conducting a device provisioning protocol 191 and configuration step 106, using data received in a message 220. If the key comprising Br 101a, with possibly parameters 199a is received in message 220 along with a command for initiator 102 to conduct responder only authentication 141, then initiator 102 could operate as an initiator 102* depicted in FIG. 1b. If the keys comprising Br 101a, Bi 104a, bi 104b are received in a message 220 along with a command for initiator 102 to conduct a mutual authentication 142, then initiator 102 could operate as an initiator 102* depicted in FIG. 1c. If no bootstrap PKI keys are received by initiator 102 in a message 220 (but other data is valid such as initiator configuration 130), then initiator 102 can begin operating as an initiator proxy 102' as depicted in FIG. 3a. If only bootstrap PKI keys Br 101a and Bi 104a are received in a message 220, then initiator 102 could proceed with a configuration mode to support subsequent DPP 191 and configuration step 106 as depicted in FIG. 5a below. Other possibilities exist as well for an initiator 102 to select the steps for conducting a device provisioning protocol 191 using data or commands in a message 220 without departing from the scope of the present invention. In another exemplary embodiment, a DPP server 103 sends initiator 102' the initiator mode 306a (in FIG. 3a) for initiator 102' to use for a DPP 191 with DPP server 103. Note that as contemplated herein, steps or actions that are described as initiator 102 or initiator 102' performing the action could also be performed by (i) a DPP application 102g or (ii) the computing device operating initiator 102, such as a mobile phone, smart phone, tablet, or even (iii) a WiFi access point 105 operating an initiator 102' as depicted in FIG. 8 below.

Initiator 102 could then conduct configuration step 127, which was depicted and described in connection with FIG. 1d above. In summary, initiator 102 could backup or record any previously active user configuration 131 operating for a WiFi radio 102w in initiator 102, such as (a) recording user operating class 131a in a nonvolatile memory 102f in order to (b) restore the configuration 131 at a later time. In exemplary embodiments, a step 127 comprises initiator 102 reading the initiator configuration 130 and activating them with WiFi radio 102w in order to transmit DPP message 122 to responder 101x, optionally using MAC.R 101d in order to send unicast messages to responder 101x. As depicted and described in connection with FIG. 1d above, a configuration step 127 can convert the initiator 102 from an unconfigured state (for purposes of a DPP 191) to an initiator 102'. Initiator 102' can also be referred to as an initiator proxy 102'. Thus, subsequent figures such as FIG. 3a, FIG. 5a, etc. depict a configured initiator 102' instead of the unconfigured initiator 102 in FIG. 2a.

In an alternative exemplary embodiment to that depicted in FIG. 2a, discovery server 110 could be optionally omitted, and data within tag 101c or tag value 101w could specify authentication server 111 as well as data for Config-provisioning.ID.device 212. However, the use of a discovery server 110 can be preferred for some exemplary embodiments since a discovery server 110 could provide increased flexibility over the lifetime of device 101, which could be a decade or longer, since parameters Config-provisioning.ID.device 212 and related data could change over time. Including all data for config-provisioning.ID.device 212 in tag value 101w or tag 101c may reduce flexibility for changing or updating the data over time, such as specifying (i) an updated DPP application 102g (where app versions for smartphones may be updated relatively frequently such as more than once a year), or other (ii) updated data for network 107 over time. Further, the use of a discovery server 110 can support potentially millions of devices communicating potentially with many different authentication servers 111 and DPP servers 103.

For another alternative exemplary embodiment to that depicted in FIG. 2a, although message 220 with data for initiator 102 is depicted as flowing from authentication server 111 to initiator 102, other possibilities exist as well for a initiator 102 to receive the data within message 220 without departing from the scope of the present invention. In some embodiments, data within message 220 could be obtained by initiator 102 from a DPP server 103 directly, and for these embodiments, a mutually authenticated secure session similar to secure session 214 could be set up between initiator 102 and DPP server 103. Further, the functionality for different servers in FIG. 2a could be combined, such that an authentication server 111 also operates as a discovery server 110. In another embodiment, a DPP server 103 could operate as all of a discovery server 110 and authentication sever 111, and other possibilities exist as well without departing from the scope of the present invention.

FIG. 2b

FIG. 2b is an illustration of an exemplary device database, with tables for a device database recording exemplary data, in accordance with exemplary embodiments. A device database 104 depicted and described above in connection with FIG. 1a and FIG. 2a can record data for (i) an unconfigured initiator 102 or (ii) a configured initiator 102' and a DPP server 103 to conduct a device provisioning protocol 191 with a device 101 operating a responder 101x. A database 104 could record a plurality of tables for a plurality of devices 101 and/or responders 101x, such as the depicted values for a key table 104k, a cryptographic parameters table 104p, and a device table 104d, Other possibilities exist as well for the organization, tables, and recorded data within a device database 104 without departing from the scope of the present invention. Data within device database 104 could be encrypted using a symmetric key. As depicted in FIG. 1a, a network 107 could operate and record a device database 104, although another entity besides network 107 could also operate and record the device database 104, such as a device manufacturer or a device owner.

Device database 104 can record sets of ID-token.device 206, ID.device 101i, MAC.R 101d for the MAC address of the responder 101d, global operating class 130a, channel list 130b, cryptographic parameters 199, and a secret shared key 198 for a public key exchange protocol (PKEX). These values within a device database 104 could be recorded in a device 101 and/or responder 101x upon manufacturing of a device 101. The exemplary data in device database 104 could be obtained from the manufacturer. For embodiments where some data is not previously recorded in a device database 104 before an initiator 102' conducts a step 301 as depicted below in FIG. 3a, then a network 107 operating device database 104 could query the device 101 manufacturer or a device 101 distributor in order to receive and record values for a device database 104, and other possibilities exist as well for the source of device 101 data within a device database 104.

In device database 104, ID-token.device 206 can comprise a unique, obfuscated identity for device 101, such as the identity read from a tag 101c on device 101. ID.device 101i can comprise an identity for device 101i that is not obfuscated, and could be a serial number for device 101.

Although FIG. 2a above depicts a tag 101c as recording ID-token.device 206, the tag 101c could alternatively record ID.device 101i and send the non-obfuscated identity to initiator 102 in FIG. 2a. The two identity values shown for a device 101 in a device database 104 allows a DPP server 103 to map between ID-token.device 206 and ID.device 101i, and also convert one value into another. MAC.R 101d can comprise the MAC address used by a responder for conducting a device provisioning protocol 191. In other words, MAC.R 101d can be the MAC address used by responder 101x in order to listen for DPP authentication request 122 messages from an initiator 102'. In other words, MAC.R 101d can be used by an initiator 102' in order to send a unicast message. In some exemplary embodiments, MAC.R 101d can be omitted from a device database 104 or otherwise not available to a network 107, and in this case an initiator 102' can send a DPP authentication request message 122 as a broadcast message on a WiFi radio link 192 to responder 101x.

Global operating class 130a and channel list 130b can specify the settings a device 101 WiFi radio 101h will use with responder 101x, where responder 101x periodically listens or monitor for DPP authentication request messages 122 over time as using different RF frequencies or channel numbers within ISM band RF radio spectrum. As depicted in FIG. 2b, an initiator configuration 130 can include channel list 130b and cryptographic parameters 199. An initiator configuration 130 could also include the global operating class 130a and other information could be included as well in an initiator configuration, such as timer values for retry of sending DPP 191 messages, timer values for timeouts for sending and receiving messages, as well as counters for a maximum number of retries on sending mesages.

Although not depicted in FIG. 2b, an initiator configuration 130 in a device database 104 could also specify an initiator mode 306a (in FIG. 3a and FIG. 3b below) for initiator 102' to operate with responder 101x, where different modes could comprise (i) DPP server 103 records and operates on all boostrap PKI keys for initiator 102', or (ii) initiator 102' records and operates on bootstrap public keys and derived ephemeral keys, but not initiator bootstrap private key bi 104b (e.g. as depicted in FIG. 5a), and other possibilities exist as well. Sets of cryptographic parameters 199 in device database can represent different sets of cryptographic parameters supported by responder 101x in order to conduct a device provisioning protocol 191. For example, some devices 101 may use a first set of cryptographic parameters with PKI keys such as bootstrap and ephemeral keys, and other devices may use a second set of cryptographic parameters, which could be specified by cryptographic parameters 199. Note that devices 101 can optionally support more than one set of cryptographic parameters, as depicted.

Device database 104 can record a key table 104k, which could comprise exemplary keys as depicted. A key table 104k can include a secret shared PKEX key 198, responder bootstrap public key Br 101a, initiator bootstrap public key Bi 104a and initiator bootstrap private key bi 104b. PKEX key 198 could be used with a public key exchange protocol as specified in IETF draft document "Public Key Exchange", which is hereby incorporated by reference in its entirety. In some exemplary embodiments, a PKEX key 198 can be omitted, such as for the example data depicted with an "NA" in FIG. 2b. The values depicted of X1, X2, etc. for a PKEX key 198 could comprise the secret key for each device 101 identified by ID-token.device 206 or MAC.R 101d. For the exemplary database 104 depicted in FIG. 2a and other tables herein, a numeric value following a constant name can depict a subsequent or different instance or numeric value for the constant. In other words, "X1" and "X2" for a PKEX key 198 can represent different values of "X" for the PKEX. Similarly, values of "Br-1" and "Br-2" depict different values for a responder bootstrap public key Br 101a, but exemplary values of "Br1" and then a second "Br1" can depict that the same value or number may be used for two different responders 101x.

Responder bootstrap public key Br 101a in a device database 104 can represent the bootstrap public key for responder 101x. Br 101a was depicted and described above in connection with FIG. 1a and FIG. 1b above. In exemplary embodiments, a device database 104 can record a plurality of different responder bootstrap public keys Br 101a, where each key can be associated with different responders 101x. Although not depicted in FIG. 2b, for some embodiments different responders 101x could also share the same numeric value for a responder bootstrap public key Br 101a. Different responder bootstrap public keys Br 101a can be associated with a different selected set of parameters 199a. The manufacturer or entity configuring responder 101x in device 101 may not know which of a plurality of different possible sets of cryptographic parameters 199 may be utilized by an initiator 102 for conducting a DPP 191. For example, DPP specification version 1.0 identifies several possible sets of cryptographic parameters 199 for bootstrap keys that could be utilized in a DPP 191, such as the different values for cryptographic parameters shown in Appendix A of DPP specification version 1.0. As depicted in FIG. 2b, a responder bootstrap public key Br 101a of "Br-3 (A)" can represent a third instance or number for Br 101a which uses the selected set "A" of cryptographic parameters 199 (e.g. curve p256 with SHA-256), while responder bootstrap public key Br 101a of "Br-3 (B)" can represent a third instance of Br 101a which uses the selected set "B" of cryptographic parameters 199 (e.g. curve p384 with SHA-384).

Initiator bootstrap public key Bi 104a and corresponding initiator bootstrap private key bi 104b in a device database 104 can represent the bootstrap public key and the bootstrap private key for initiator 102'. Bi 104a and bi 104b were depicted and described above in connection with FIG. 1a and FIG. 1b above. In exemplary embodiments, a device provisioning protocol 191 using an initiator 102' and a DPP server 103 can utilize a plurality of different initiator bootstrap PKI keys, and different values for the initiator bootstrap PKI keys Bi 104a and bi 104b can be associated with different responders 101x. As discussed above in connection with FIGS. 1a and 1b, a responder 101x could optionally record an initiator bootstrap public key Bi 104a, and subsequently the value recorded for the responder 101x could also be stored in a device database 104. The initiator bootstrap public key Bi 104a and corresponding initiator bootstrap private key bi 104b could be stored by a device database 104 concurrently with the responder bootstrap public key Br 101a, where the responder bootstrap key could be received from a device manufacturer or device distributor. Or, in exemplary embodiments a device manufacturer or a device distributor could operate a device database 104 and subsequently record the exemplary keys and values depicted for a responder 101x in a device database 104 in FIG. 2a. As depicted in FIG. 2b, some responders 101x could share a common initiator bootstrap public key Bi 104a, which could be associated with a common initiator bootstrap private key bi 104b.

The sharing of initiator bootstrap public keys Bi 104a among multiple responders 101x can simplify the manufacturing and distribution of devices by using a common initiator bootstrap public key Bi 104a for some embodiments. For the present invention, the potential tradeoff of greater simplicity for reduced security (by reusing an initiator bootstrap public key Bi 104a in multiple devices 101) can be avoided, since the initiator bootstrap private key bi 104b may optionally not be sent to the initiator 102'. Yet, with the present invention, the full set of device provisioning protocol messages 191 can be sent and received with a responder 101x using mutual authentication 142. Embodiments for the present invention depict and describe the initiator bootstrap private key bi 104b as residing within a DPP server 103 when an initiator 102' conducts a DPP 191 (as depicted and described in connection with FIG. 3a, FIG. 5a, and FIG. 5b below). Consequently, (i) the initiator bootstrap private key bi 104b does not need to be recorded by an initiator 102* (as in FIG. 1c), and (ii) an initiator bootstrap public key Bi 104a can be commonly shared between multiple responders 101x.

Thus, the present invention resolves the potential tradeoff of security versus simplification by supporting manufacturing and distribution of devices 101 with responders 101x with commonly shared initiator bootstrap public key Bi 104a (depicted in FIG. 2b as "shared keys"). Additional details for maintaining security will be provided in FIG. 3a, FIG. 5a, and FIG. 5b below. The initiator bootstrap private key bi 104b can be recorded in a device database 104 and subsequently sent to a DPP server 103, but preferably not sent to initiator 102', and initiator 102' can still conduct a device provisioning protocol 191 with mutual authentication 142 in the manner depicted in FIG. 1c, where responder 101x would not "know" or be aware that intiator 102' does not record or calculate with the initiator bootstrap private key bi 104b. In exemplary embodiments, only an initiator bootstrap public key Bi 104a is recorded inside an initiator 102, while a device database 104 can record both the initiator bootstrap public key Bi 104a and the initiator bootstrap private key bi 104b.

Cryptographic parameters 199 can specify sets of cryptographic parameters that are supported by responder 101x when using bootstrap PKI keys. Cryptographic parameters 199 can be recorded in a device database 104 as a parameters table 104p. Cryptographic parameters 199 can record a collection of cryptographic algorithms or specifications such as a set identifier 199a, a key length 199b, an ECC curve name 199c, a hash algorithm 199e, a key length for a symmetric ciphering algorithm 199f, and a nonce length 199g. As contemplated herein, when a selected set of cryptographic parameters such as using the words or description "parameters 199a" or "cryptographic parameters 199a" can specify a row of parameters or values in a set of cryptographic parameters 199, such that the collection of values in the row can be used with a device provisioning protocol 191. Set identifier 199a can be an identity for a row or set of values for cryptographic parameters 199. For example, set "A" can comprise cryptographic suite 1 as specified in section 3.2.3 of DPP specification version 1.0. Key length 199b can be the length of keys in bits for PKI keys used with a device provisioning protocol with a responder 101x. ECC Curve name 199b can be a name for an ECC curve used with PKI keys for a device provisioning protocol with a responder 101x.

Hash algorithm 199e in cryptographic parameters 199 can be the name of a secure hash algorithm, such as the exemplary SHA-256 algorithm depicted, which may also be referred to as "SHA-2". Hash algorithm 199e can be used in a key derivation function and also to generate a signature based on a received nonce. A key length for a symmetric ciphering algorithm 199f can specify the length of a symmetric key in bits to use with a symmetric ciphering algorithm. The depicted algorithm in FIG. 2b for algorithm 199f is "AES-SIV", although other symmetric ciphering algorithms could be specified in a set of cryptographic parameters as well. In other words, an additional, different column in cryptographic parameters 199, such as an exemplary "symmetric algorithm" 199z (not depicted) could specify the symmetric ciphering algorithm to utilize with a responder for a device provisioning protocol. Nonce length 199g can specify the length in bits for nonces or random numbers generated by both initiator 102' and responder 101x, where the nonces can be used for generating signatures and encryption keys.

As depicted in FIG. 2b, a device database 104 can also record a device table 104d. Device table 104d can record a plurality of different PKI keys for the same responder 101x. Device table 104d can include ID-device 206, initiator bootstrap keys sequence number 197, secret shared PKEX key 198, responder bootstrap public key Br 101a, initiator bootstrap public key Bi 104a and initiator bootstrap private key bi 104b. Devices 101 may be designed to be utilized for a decade or longer, and during that time it may be desirable for a device 101 with responder 101x to undergo more than one instance of a device provisioning protocol. As one of many possible examples, a device 101 could have performed a "factory reset" or equivalent clearing of nonvolatile memory, such that device 101 is restored to an unconfigured state. Or, device 101 may be sold or transferred to a different owner, where the new owner wishes to conduct a device provisioning protocol 191 with the same device 101 a second time. These are just a few of the many possible reasons why a device 101 could undergo more than one instance of a device provisioning protocol 191 during the lifetime of device 101, and other examples are possible as well. Through the use of a device table 104d, different values for an initiator bootstrap PKI keys could be utilized with the same device 101 with responder 101x over time, where the different values for PKI keys used with responder 101x could be identified by initiator bootstrap keys sequence number 197. Note that a PKEX key 198 could also change for a device 101 over time, and initiator bootstrap keys sequence number 197 could also identify a new or different PKEX key 198.

In a device table 104d, a responder public bootstrap key Br 101a can remain relatively static over time, such as the depicted same numeric value for key Br 101a of "Br-1" used for each sequence of initiator bootstrap keys. In other words, although a device 101 may undergo a factory reset or similar second instance of a device provisioning protocol, in exemplary embodiments the same responder key Br 101a can be reused. If the responder bootstrap public key Br 101a is changed for some reason (such as a device user reprograms device 101), then a second, new responder bootstrap public key Br 101a could be recorded in device table 104d with a designation "Br-2" for the same device with a new value for sequence number 197.

In device table 104d, different values for initiator bootstrap public key Bi 104a and initiator bootstrap private key bi 104b could be utilized over time, represented by increasing numbers for sequence number 197 for the same device 101 identified by ID-token.device 206. A device table 104d could also identify devices by ID.device 101i instead. For a first sequence number 197 with a value of "1", initiator bootstrap public key Bi 104a could record a value represented as "Bi-la". For a second sequence number 197 with a value of "2", initiator bootstrap public key Bi 104a could record a value represented as "Bi-1b", etc. In other words, the depicted number plus letter represents a different key for the same device. A different device could have initiator bootstrap public keys of "Bi-2a" for a first sequence number "1" and then a key "Bi-2b" for the second sequence number 197. Similar designations and tracking or mapping of keys could be utilized for an initiator bootstrap private key bi 104b as well.

In exemplary embodiments, the initiator bootstrap public key Bi 104a within a responder 101x can be updated by a DPP server 103, as depicted in FIG. 6a below. One benefit for updating key Bi 104a is that although (i) multiple manufactured devices 101 with responders 101x could initially share a common initiator bootstrap public key Bi 104a (e.g. Bi-la) in order to conduct a mutual authentication 142 (depicted with key table 104k in FIG. 2b as "shared keys"), (ii) a DPP server 103 or network 107 could subsequently update a device 101 with a different, new initiator bootstrap public key Bi 104a (e.g. Bi-1b). The tracking of (a) which initiator bootstrap public key Bi 104a (identified by a sequence number 197) is used with which responder 101x can be accomplished by (b) using a device table 104d. Alternatively, a device table could be omitted, and a device database 104 could record both (a) initial keys 104a and 104b for a manufactured responder 101x (for initial use or a "factory reset") and then (b) the subsequent, current keys 104a and 104b, and in this case a sequence number 197 could be optionally omitted.

In another embodiment keys 104a and 104b could be omitted from a device database 104, and only the responder bootstrap public key Br 101a is recorded. For these embodiments, key Br 101a may preferably not be sent to an initiator 102' using the embodiment depicted and described in connection with FIG. 3 below. Responder 101x and device 101 could be designed for use where all of (i) tag 101c does not record the responder bootstrap public key Br 101a, (ii) the entity recording key Br 101a is not designed to send or transfer the key Br 101a outside of a database 104 and a DPP server 103, and (iii) access to data, calculations, or algorithm output where key Br 101a is used as input would only be provided to an authenticated initiator 102'. Subsequently, responder 101x can know that any initiator 102' that has access to the responder bootstrap public key Br 101a (indirectly via DPP server 103) can then be mutually authenticated. In this manner, each of PXEX key 198, and initiator bootstrap PKI keys could also be omitted and still responder 101x can trust data from initiator 102', such as a configuration object 109. In other words, in the present invention a system 100 can (i) operate without a mutual authentication 142 from DPP Specification version 1.0 shown in FIG. 1c, and (ii) without an initiator 102' receiving the responder bootstrap public key Br 101a, and (iii) with DPP server 103 operating on the key and securely storing the key such that no other entities unnecessarily receive the responder bootstrap public key Br 101a, and in this manner a responder 101x can strongly mutually authenticate the initiator 102' (to a sufficient level to receive and use credentials 109), since only an initiator 102' that is authenticated with DPP server 103 could successful send and receive DPP message 191 with responder 101x.

FIG. 3a

FIG. 3a is a simplified message flow diagram illustrating an exemplary system with exemplary data sent and received by a device database, a DPP server, an initiator proxy, and a responder, in accordance with exemplary embodiments. Before starting steps and message flows depicted in FIG. 3a, the initiator proxy 102' and device database depicted for system 300 in FIG. 3a may previously complete exemplary message flows and steps depicted in FIG. 2a above. System 300 can include a device database 104, DPP server 103, initiator proxy 102', and responder 101x operating in device 101. Initiator proxy 102' can communicate with DPP server 103 via IP network 113 using an access network 112, as depicted in FIG. 2a. As contemplated herein, an initiator proxy 102' depicted in FIG. 3a may also be referred to as initiator 102', and an initiator 102' and initiator proxy 102' may be equivalent. In other words, an initiator 102' may operate as an initiator with some functions and operations by proxy with DPP server 103 and network 107.

Initiator 102' can be different than initiator 102* in FIG. 1b and FIG. 1c, since (a) some PKI and cryptographic computations (plus recording of PKI keys) that would normally be performed by an initiator 102* as contemplated by DPP specification version 1.0 can (b) be performed by DPP server 103 and thus initiator 102' is different than an initiator 102*. For system 300, DPP server 103 and device database 104 may establish a secure session setup 302a, which could comprise establishing a secure communications link between the two servers using protocols such as TLS, IPSec, a virtual private network (VPN), a secure shell (SSH), or similar networking, transport, or application layer technologies in order to establish secure communications between DPP server 103 and database 104. Secure session setup 302a can be (i) equivalent or similar to secure session setup 214 depicted in FIG. 2a above, and (ii) utilize certificates cert.DPPS 103c for DPP server 103 and a certificate for database 104 in order to provide mutual authentication and mutual key derivation for a symmetric encryption key for secure session 302a.

Initiator 102' in system 300 can operate a running DPP application 102g and WiFi radio 102w operating with initiator configuration 130 from FIG. 2a and FIG. 1d, in order to communicate with a WiFi radio 101h operating in device 101 with responder 101x, where the communications can use a WiFI data link 192. DPP application 102g may previously be downloaded in a step 213 as depicted in FIG. 2a and subsequently launched or activated for operation in a system 300. In exemplary embodiments, DPP application 102g may be (i) included or distributed along with an operating system 102e running on initiator 102' or (ii) acquired at a different time than a step 213, and thus from a separate download of DPP application 102g. In exemplary embodiments, WiFi radio 102w operating in initiator 102' can send either broadcast or unicast messages or datagrams to device 101 with responder 101x when using initiator configuration 130. In exemplary embodiments, responder 101x listens for incoming messages using the same initiator configuration 130.

DPP server 103 and initiator 102' can establish a secure session 302b, where secure session 302b could comprise a session using TLS, DTLS, IPSec, a VPN, and other possibilities exist as well. Initiator 102' can previously record the URL to reach DPP server 103 based on the value URL-DPPS 103b received in a message 220 in FIG. 2a. Initiator 102' can also use the certificate for DPP server 103 comprising cert.DPPS 103c also previously received in a message 220. As depicted in FIG. 3a, secure session 302b could also comprise DPP server 103 receiving and using an initiator certificate cert0.initiator 102m in order to authenticate initiator 102'. In exemplary embodiments where initiator 102' is operated by a DPP application 102g, such as an application on a mobile phone, setup of secure session 302b can include or comprise authentication of DPP application 102g with DPP server 103, and also mutual authentication between DPP application 102g and DPP server 103. Alternatively, DPP server 103 could authenticate an initiator user 103a via a user ID and password entered by user 102u into a user interface 102k for initiator 102'. In some exemplary embodiments, authentication of an initiator 102' or an initiator user 102u could be omitted, such as if an initiator certificate cert0.initiator 102m is not present in initiator 102.

At step 302c in FIG. 3, device 101 may power on from an unpowered or "deep sleep" state. Power could be provided from a battery or converted "wall power". Device 101 could (i) load the equivalent or responder version of information contained in initiator configuration 130 using a bootloader program and (ii) power on WiFi radio 101h. Responder 101 using WiFi radio 101h in device 101 could periodically cycle through a channels list 130b in order to listen for incoming DPP authentication request messages 122. In exemplary embodiments, before initiator 102' has conducted a step 127 to load initiator configuration 130, a device 101 can periodically power up and attempt to listen for incoming messages 122. In other words, device 101 can use equivalent information for initiator configuration 130 as the default state or condition, even without initiator 102' being present or configured, since device 101 may not know the time or place where initiator 102' with initiator configuration 130 may be present. Responder 101x could also read the values for responder bootstrap public key Br 101a and initiator bootstrap public key Bi 104a, if present, in a step 302c.

As depicted in FIG. 3a, initiator 102' using DPP application 102g can conduct a step 303a to collect an identity list 304, where identity list 304 comprises a list of identities for elements of systems 100, 200, and 300 around or nearby to device 101 during installation and/or operation. Identity list 304 can include a networks available list 304c. In order to conduct a step 303a, initiator 102' may need to temporarily disconnect from an access network 112, such as a mobile phone network, in order to perform a full frequency scan of all available mobile network operators and network access technologies around device 101 in order to collect a networks available list 304a. For embodiments where initiator 102' temporarily disconnects from an access network 112 or other cases where secure session 302b may be dropped, initiator 102' and DPP server 103 can pause secure session 302b and then restore the session when connectivity for initiator 102' through access network 112 is restored.

The networks available list 304c can be useful for DPP server 103 to select the best or a preferred access point 105 from the networks available list 304c for device 101. As depicted in FIG. 3a, a networks available list 304c can also include the access technology available from a plurality of access networks 112 and access points 105 around device 101, such as 2G, 3G, 4G LTE, 5G, WiFi, NB-IoT, LoRaWAN, LPWAN, etc. Identification of all available wireless networks around device 101 can support DPP server 103 or network 107 in a later step 308b below to receive or determine a working set of credentials 109 for device 101 to utilize in order to obtain network connectivity via the access network 112. In exemplary embodiments, the networks available list 304c of surrounding wireless networks also includes an associated RF signal strength for each, such as RSSI as well as a frequency band, frequency list in Mhz, or RF channel for each surrounding wireless network. In exemplary embodiments, initiator 102' can observe WiFi broadcast packets from network Wifi Access Point 105 depicted in FIG. 1a using SSID.Network-AP 109a and include the value in the networks available list 304c.

A step 303a may also comprise initiator 102' collecting a list of identities for a monitored unit associated with a device 101, and include the identities in the identity list 304. In exemplary embodiments, a step 303a in FIG. 3a may comprise initiator 102' using a camera 102z to scan for a bar code or QR code on a surrounding monitored unit in order to collect a monitored unit identity 304b. In exemplary embodiments, device 101 can include sensors and transducers for monitoring and controlling external devices or equipment. A monitored unit for a device 101 could comprise exemplary values of industrial equipment, health care equipment, security systems, etc. A step 303a could also comprise initiator 102' obtaining physical location 304a for device 101, which could comprise a room number, zone in a building or floor, shelf number, rack number, etc. Physical location 304a could also comprise a set of geographical coordinates for a value of physical location 304a or (ii) estimated geographical coordinates or similar physical location of device 101. In exemplary embodiments, initiator 102' can comprise a mobile phone or smart phone and can have a GPS or similar receiver for outdoor location, or use WiFi or Bluetooth for approximate indoor locations, and record the location in a physical location 304a.

Although step 303a to collect an identity list 304 for device 101 is depicted as after secure session setup 302a (confirming mutual authentication between initiator 102' and DPP server 103 in session 302a), step 303a to collect an identity list 304 could be conducted at other times, such as before FIG. 3a or after a initiator user 102u takes initiator 102 to the approximate physical location for installation or configuration of device 101, including possibly during a step 202 above in FIG. 2a. Or, in other exemplary embodiments the use of an identity list 304 can optionally be omitted, if initiator 102' and DPP server 103 can record the set of credentials 109 for a selected network access point 105, where the selected network access point 105 can be recorded without an identity list 304 (such as if the correct or preferred network access point 105 is known to DPP server 103 before a read step 202 in FIG. 2a). As depicted in FIG. 3a, initiator 102' can then send DPP server 103 a message 305 through secure session 302a, where message 305 can include ID-token.device 206 (from message 204 in FIG. 2a above) and the identity list 304. DPP server 103 can receive message 305 and record the data received in a server database 103a. The values of Physical Location 304a and Monitored Unit ID 304b can be recorded for support of subsequent operation of device 101 after a configuration step 106, and DPP server 103 could also send the values to another server supporting device 101 during operation such as a reporting server (not shown). DPP Server 103 can then send ID-token.device 206 through secure session 302a to device database 104 in a message 306.

A step 302d for DPP server 103 can also comprise DPP server 103 querying a server database 103a for an initiator bootstrap keys sequence number 197 for device 101 using ID-token.device 206 (or ID.device 101i). In exemplary embodiments, a device 101 with responder 101x could use multiple different initiator bootstrap public keys Bi 104a over time, such as updating the initiator bootstrap public key Bi 104a using the steps depicted and described in connection with FIG. 6a below after a DPP 191 and configuration step 106 has been previously completed. The multiple possible reasons and benefits for updating and initiator bootstrap public keys Bi 104a are discussed with a step 608 in FIG. 6a below. A server database 103a could record a value initiator bootstrap keys sequence number 197 in order to track which initiator bootstrap public key Bi 104a is currently recorded in responder 101x for device 101. For other embodiments, a responder 101x in device 101 could also record a plurality of different initiator bootstrap public keys Bi 104a concurrently, such as a first initiator bootstrap public key Bi 104a for a first network 107 and a second initiator bootstrap public key Bi 104a for a second network 107. Responder 101x could use the multiple different, concurrently available initiator bootstrap public keys Bi 104a to concurrently listen for a DPP authentication request message 122 from different possible networks 107. In a step 302d, A DPP server 103 could use an initiator bootstrap keys sequence number 197 to select the current, preferred initiator bootstrap public key Bi 104a for conducting a DPP 191 by an initiator 102'. DPP server 103 can send a database 104 a message 307 with an identity for device 101 of ID-token.device 206 (or identity ID.device 101i), and the selected initiator bootstrap keys sequence number 197.

At step 306, DPP server 103 can select the mode of operation for initiator 102' to conduct a DPP 191 with device 101. The selected mode of operation for initiator 102' can comprise a mode 306a or an initiator mode 306a, which could be recorded in a server database 103a as depicted and described in connection with FIG. 3b below. The selected mode 306a can specify the distribution of PKI keys between DPP server 103 and initiator 102'. The selected mode 306a can determine the subsequent series of steps and message flows between DPP server 103 and initiator 102'. A first mode 306a could (a) specify that DPP server 103 records all public and private bootstrap and ephemerals keys for initiator 102', plus the public keys Br 101a and Pr 101e for responder 101x such that (b) resulting cryptographic operations and ECDH key exchanges and symmetric ciphering reside within DPP server 103 and results from symmetric ciphering are transmitted in messages to initiator 102'. This first mode 306a could represent the message flows and steps in FIG. 3a. A second mode 306a could specify that (i.a) initiator bootstrap PKI keys 104a and 104b reside within DPP server 103 and (i.b) responder bootstrap and ephemeral public keys for responder 101x reside within initiator 102', such that (ii) resulting cryptographic operations and key exchanges are shared between DPP server 103 and initiator 102'. This second mode 306a could represent the message flows and steps depicted in FIG. 5a.

A third mode 306a selected in a step 306 for DPP server 103 could specify the same recording of bootstrap and ephemeral keys as the second mode, with the addition that DPP server 103 receives and uses the initiator ephemeral private key pi 102b, also with resulting cryptographic operations and key exchanges are shared between DPP server 103 and initiator 102' (but with a different allocation than the second mode). This third mode 306a could represent the message flows and steps depicted in FIG. 5b. In exemplary embodiments, all of the first, second, and third modes operate with initiator bootstrap private key bi 104b residing within DPP server 103 and not shared with initiator 102'. By not sharing initiator bootstrap private key bi 104b with initiator 102' (which could be a device with much less security than DPP server 103), the initiator bootstrap private key bi 104b can remain secured within network 107. These embodiments where initiator bootstrap private key bi 104b remains in network 107 (e.g. in DPP server 103 and device database 104) support securely sharing the same initiator bootstrap public key Bi 104a potentially across a plurality of device 101 with responders 101x. Sharing the same initiator bootstrap public key Bi 104a across multiple devices supports recording the key Bi 104a in a device 101 during manufacturing. This simplifies and enables the use of a device provisioning protocol 191 across multiple devices 101 with mutual authentication, where the initiator 102' does not need to receive or be provisioned with the initiator bootstrap private key bi 104b.

In other words, without the technology described in the present invention, a device provisioning protocol with mutual authentication can essentially shift the problem of (a) securely mutually authenticating a device and providing credentials 109 to a device 101 to a new, but related problem of (b) securely providing an initiator bootstrap private key bi 104b to an initiator 102*. The first, second, and third modes 306a can solve this shifted/new problem since the initiator bootstrap private key bi 104b can permanently reside in a network 107 and does not need to be sent to the initiator 102' or an initiator 102*. However, with the technology in the present invention, the initiator 102' can still transmit and receive the full set of a device provisioning protocol 191 messages with a responder 101x as specified in DPP specification version 1.0.

A fourth mode 306a could specify that initiator 102' records all of the initiator bootstrap and ephemeral PKI keys, as well as the responder 101x public keys, such that resulting cryptographic operations and key exchanges reside in initiator 102'. This fourth mode 306a could represent the message flows and steps depicted in FIG. 1b or FIG. 1c, and in this case initiator 102' could comprise an initiator 102*. Other possibilities exist as well without departing from the scope of the present invention. Additional details for the different modes 306a selected in a step 306, with the resulting different allocation or recording of PKI keys are described below in FIG. 3b for a server database 103a.

At step 308a, DPP server 103 can process data received in message 304 and the received identity list 304. DPP server 103 can use the values in a networks available list 304c in order to select an access network 112 for device 101. A step 308a could comprise DPP server 103 selecting a primary access network 308aa and a backup access network 308ab for a device 101, as depicted and described in connection with FIG. 3b below. The selected access networks 308aa and 308ab for device 101 in a step 308a could be based on criteria such as bandwidth cost, expected energy or power requirements (i.e. 3G/4G may use more power than LPWAN), signal strength or RSSI measurements recorded with a networks available list 304c, and commercial terms such as agreements between a (i) device owner for device 101 and (ii) networks in a networks available list 304c. DPP server 103 could also query other servers not depicted in FIG. 3a to select an access network 112 from the networks available list 304c. In other words, a preferred access network 112 in the form of a primary access network 308aa for device 101 may need to be selected by DPP server 103 in a step 308a before the credentials 109 for the access network (or network access point 105) can be obtained. Although FIG. 3a depicts DPP server 103 as conducting a step 308a in order to select a primary access network 308aa and backup access network 308ab, in exemplary embodiments a different server than DPP server 103 in a network 107 could (i) securely receive the networks available list 304c and (ii) select the primary access network 308aa and backup access network 308ab.

After the selection of a primary access network 112 (308aa) and a backup access network 112 (308ab) in a step 308a, DPP server 103 could perform a step 308b depicted in order to obtain a set of network credentials 109 for both the selected primary access network 308aa and the selected backup access network 308ab. For embodiments where (a) a network 107 operating DPP server 103 comprises a selected access network 308ab or 308ab, then (b) the credentials 109 for device 101 can be obtained from another server in a network 107 from FIG. 1a and recorded in DPP server 103. For example, if a network access point 105 for network 107 is selected as an access network 112 for device 101, then network 107 would normally already record the set of credentials 109 for access point 105. For embodiments where a selected access network 112 (e.g. selected primary access network 308aa) for device 101 other than network 107 operates the access point 105, then for a step 308b DPP server 103 could query the access network 112 for the equivalent of credentials 109. Additional details regarding embodiments where a different network than network 107 provide credentials for device 101 are depicted and described in connection with FIG. 3b and FIG. 6b below.

Note that in exemplary embodiments, a DPP server 103 can preferably conduct a step 308a to select an access network 112 and a step 308b to obtain credentials 109 for the selected access network 112 before continuing with a device provisioning protocol 191. The reason is that if either (i) a network cannot be selected potential from a networks available list 304c or (ii) credentials 109 cannot be obtained for the selected network, then there may be no reason to continue with a device provisioning protocol 191 since DPP server 103 may not have credentials 109 to send to device 101. In FIG. 3a, although a step 308a and step 308b are depicted as taking place after DPP server 103 sends message 307 with a query for PKI keys to device database 104, in some embodiments a step 308a and step 308b could take place before DPP server 103 sends message 307 to device database 104.

Further, in some exemplary embodiments where initiator 102' uses network access point 105 with SSID.network-AP 109a with a preshared secret key (PSK) or similar authentication (as an access network 112 for initiator 102'), then a message 305 could comprise initiator 102' sending DPP server 103 the set of network credentials 109 used by initiator 102'. DPP server 103 could then (i) record the credentials 109 in a server database 103a further described below in FIG. 3b, (ii) use the value SSID.network-AP 109a as a selected primary access network 308aa, and (ii) use the received credentials 109 from initiator 102' in a message 305 as the credentials 109 for device 101. Other possibilities regarding the source of credentials 109 exist without departing from the scope of the present invention.

Device database 104 can receive message 307 with ID-token.device 206 (or similarly ID.device 101i) and initiator bootstrap keys sequence number 197. Device database in step 309 can conduct a query of device database 104 for data associated with ID-token.device 206 and initiator bootstrap keys sequence number 197. In exemplary embodiments, a query in a step 309 can select an initiator boostrap private key bi 104b and an initiator bootstrap public key Bi 104a using the initiator bootstrap keys sequence number 197 from a device table 104d for device 101. In this manner, for embodiments where initiator bootstrap PKI keys for device 101 are updated over time (e.g. such as depicted and described in connection with FIG. 6a), then the most recently updated initiator bootstrap PKI keys can be selected by a database query in a step 309. The query in step 309 can return values for a message 310 from device database 104 to DPP server 103. The values in a message 310 can comprise data for ID-token.device 206 and the values can include responder bootstrap public key Br 101a, initiator bootstrap public key Bi 104a, initiator bootstrap private key bi 104b, a device identity ID.device 101i, a selected set of cryptographic parameters 199a for the PKI keys, and optionally PKEX key 198. Although not depicted in FIG. 3a, message 310 could also include ID-token.device 206 so that DPP server 103 can track which of a possible plurality of initiators 102' and devices 101 that message 310 is associated with. In some embodiments, a step 302d and the use of a sequence number 197 can be omitted, and a query in step 309 and message 310 can return the most recently updated or recorded values for responder bootstrap public key Br 101a, initiator bootstrap public key Bi 104a, and initiator bootstrap private key bi 104b. Note that in some exemplary embodiments, the device identity ID-token.device 206 can comprise the secure hash 199e value for the responder bootstrap public key Br 101a, which can be depicted in FIG. 3a as "H(Br)". However, in some embodiments a responder bootstrap public key Br 101a could be shared across multiple devices 101 (for embodiments where Br 101a can remain in a network 107 such as with FIG. 5b), and for these embodiments then device identity ID-token.device 206 can comprise a different value than a secure hash 199e value for the responder bootstrap public key Br 101a.

For embodiments where (A) a DPP session 191 between initiator 102' and device 101 fails due to a possible mismatch between (i) initiator bootstrap PKI keys selected in a query for step 309 and (ii) the actual initiator bootstrap public key Bi 104a recorded and used by a responder 101x in device 101 (such as the case where device 101 has undergone a "factory reset" to restore previously recorded initiator bootstrap public key Bi 104a), then (B) DPP server 103 could send a second message 307 with a request to use the oldest recorded initiator bootstrap PKI keys from a device table 104d (such as possibly the lowest or first recorded sequence number 197 for device 101 in device table 104d). For these embodiments where (A) a DPP session 191 between initiator 102' and device 101 fails due to a possible mismatch between (i) initiator bootstrap PKI keys selected in a query for step 309 and (ii) the actual initiator bootstrap public key Bi 104a recorded and used by a responder 101x in device 101, then (B) a query in step 309 can be for the oldest recorded initiator bootstrap PKI keys from a device table 104d. In other exemplary embodiments, DPP server 103 could send message 307 with a specific initiator bootstrap keys sequence number 197, and a query in a step 309 could be for a specific set of responder bootstrap public key Br 101a, initiator bootstrap public key Bi 104a, initiator bootstrap private key bi 104b designated by the initiator bootstrap keys sequence number 197 in a device table 104d. Further, a key table 104k in a device database 104 can record the most recently updated values and keys for a device 101, while a device table 104d can record the historical values and PKI keys for a device 101 used over time, where the historical different values or PKI keys can be tracked, queried, or selected using an initiator bootstrap keys sequence number 197.

DPP server 103 can receive the message 310 and record the data received in a server database 103a. As depicted in FIG. 3a, DPP server 103 can then send message 311 to initiator 102', where message 311 can include (i) the selected mode 306a of operation for initiator 102' and DPP server 103 for conducting a DPP 191 with responder 101x, (ii) a selected set of cryptographic parameters 199a for use with PKI keys and a device provisioning protocol, and (iii) optionally a PKEX key 198 for conducting a public key exchange with responder 101x. Message 311 can also optionally include device identity ID-token.device 206 in order to associate the data in message 311 with a particular responder 101x, since initiator 102' could potentially communicate with a plurality of different devices 101 over time.

At step 303b initiator 102' can receive and process the message 311. Initiator 102' and DPP server 103 can begin operating in the selected mode 306a for conducting a device provisioning protocol 191. Initiator 102' and DPP server 103 can apply and begin using the selected set of cryptographic parameters 199a. For a step 308b, if a PKEX key 198 is present in a message 311, then initiator 102' can conduct a public key exchange protocol with responder 101x in order to obtain responder bootstrap public key Br 101a via WiFi radio 102w and "in band". The public key exchange protocol is specified in the DPP specification version 1.0 section 5.6. If PKEX is optionally used between responder 101x and initiator 102', then initiator 102' could receive the responder bootstrap public key Br 101a and send the key Br 101a to DPP server 103 (and in this case DPP server 103 or database 104 may not have previously recorded responder bootstrap public key Br 101a). The use of a PKEX protocol and key 198 can also be optionally omitted in some embodiments, if responder bootstrap public key Br 101a can be recorded by a network 107 prior to a step 303b.

As depicted in FIG. 3a, the collection of steps and messages before a step 313 can be grouped together into a step 301. Step 301 with the collective group of sub-steps and messages depicted for a step 301 can also be performed in other embodiments depicted in FIG. 5a and FIG. 5b below. Subsequent messages and steps depicted in FIG. 3a starting after step 301 can represent a first mode 306a for DPP server 103 and initiator 102', where the allocation of recording PKI keys and symmetric keys from key exchanges for the first mode 306a are depicted below in FIG. 3b. In other words, for a first mode 306a depicted in FIG. 3a, DPP server 103 can record and conduct cryptographic calculations with the initiator bootstrap private key bi 104b, the initiator ephemeral private key pi 102b, and the responder bootstrap public key Br 101a.

A step 313 can comprise deriving an initiator ephemeral private key pi 102b and an initiator ephemeral public key Pi 102a, and in FIG. 3a the DPP server 103 is depicted as conducting the step 313 to derive the initiator ephemeral PKI keys. Step 313 can use a random number generator to produce a random number, which could be input into a key pair generation algorithm using the set of cryptographic parameters 199a. The resulting PKI key values from conducting a step 313 can comprise the initiator ephemeral private key pi 102b and the initiator ephemeral public key Pi 102a. The resulting PKI key values from conducting a step 313, if conducted by a DPP server 103, can be recorded in a server database 103a, as depicted in FIG. 3b below. Other embodiments depicted below contemplate a step 313 to derive initiator ephemeral PKI keys being conducted by an initiator 102'. In summary, some steps depicted as conducted by a DPP server 103 in FIG. 3a could be conducted instead by an initiator 102' for other embodiments such as those depicted in FIG. 5a and FIG. 5b, with a corresponding change in supporting message flows between DPP server 103 and initiator 102'. The ephemeral PKI key derivation by DPP server 103 in a step 313 can be equivalent to a PKI key derivation step 102y depicted and described in connection with FIG. 1b and FIG. 1c by an initiator 102*.

Step 314 can comprise DPP server 103 conducting a first initiator key exchange step 314 using an Elliptic Curve Diffie Hellman (ECDH) key exchange 401a, as depicted and described in connection with FIG. 4a below. Data input for a step 314 can comprise the initiator ephemeral private key pi 102b and the recorded responder bootstrap public key Br 101a. Data output from a step 314 can comprise a key k1 as described in FIG. 4a below. Step 314 can comprise the key exchange and symmetric key derivation step in DPP specification version 1.0 section 6.2.2 in order to for an initiator to obtain key k1.

At step 315, DPP server 103 can generate a random number for an initiator nonce 317a using parameters 199a. As used herein and throughout the present invention, the words "random number" can also mean a pseudo random number, since random numbers generated by nodes may not be truly random. However, their "randomness" may be sufficient in order to securely conduct the cryptographic operations contemplated herein. DPP server 103 can also determine the initiator capabilities, which could comprise a configurator for the initiator as depicted in FIG. 3a (where responder 101x would be the enrollee). In other embodiments, the initiator 102' could have initiator capabilities as an enrollee (where the responder 101x could be the configurator). A step 315 can comprise encrypting the initiator nonce 317a and initiator capabilities using the derived key k1 from step 314 in order to create a ciphertext 315a. An encryption step 315 step is further depicted and described in connection with FIG. 4a below.

At step 316, DPP server 103 can calculate secure hash values for initiator bootstrap public key Bi 104a and responder bootstrap public key Br 101a, using a secure hash algorithm 199e. The values are depicted in FIG. 3a as "H(Bi)" and "H(Br)", respectively. For embodiments that conduct a responder authentication 141 as depicted and described in connection with FIG. 1b, then the calculation of a secure hash value for initiator bootstrap public key Bi 104a can be omitted and a null value for H(Bi) can be transmitted in a subsequent DPP authentication request message 122. DPP server 103 can then send initiator 102' message 317, which can include the hash value for the initiator bootstrap public key Bi 104a and the responder bootstrap public key Br 101a, the derived initiator ephemeral public key Pi 102a, and ciphertext 315a, where ciphertext 315a is encrypted with key k1 and includes an initiator nonce 317a and the initiator capabilities. Initiator 102' can receive message 317 via the secure session 302b.

For a step 316a (not depicted in FIG. 3a, but conducted by initiator 102' after receipt of message 317 and also depicted in FIG. 5a below), initiator 102' can then send DPP Authentication Request message 122 to responder 101x, using WiFi radio 102w with initiator configuration 130. In exemplary embodiments, initiator 102' sends message 122 as a unicast message to responder 101x using MAC.R 101d as the destination/recpient, and initiator 102' received MAC.R 101d in a previous message such as message 220. Alternatively, initiator 102' sends message 122 as a broadcast message (and MAC.R 101d would not normally be required for broadcast). However, unicast for WiFi can be preferred, since unicast messages are acknowledged at the data link layer. In a step 316a, initiator 102' may need to repeat message 122 multiple times on several different channels in a channel list 130b from initiator configuration 130, since (i) responder 101x may be periodically sleeping in order to conserve battery power, and (ii) responder 101x may also be cycling through a channel list 130b in order to listen for message 122 on different channels (and the cycling by initiator 102' and responder 101x may not be synchronized). As depicted in FIG. 3a, message 122 sent by initiator 102' can include hash values for the public keys 101a and 104a, the initiator ephemeral public key Pi 102a, and the ciphertext 315a.

In addition, DPP authentication request message 122 in FIG. 3a can have some differences than message 122 in FIG. 1b and FIG. 1c. Message 122 in FIG. 3a can originate from an initiator proxy 102' (where initiator proxy 102' may not record an initiator bootstrap private key bi 104b for responder 101x), while message 122 in FIG. 1c can be from an initiator 102*, where initiator 102* can record and operate on the initiator bootstrap private key bi 104b. In other words, from the perspective of a responder 101x message 122 in FIG. 1c and FIG. 3a could be identical, but the initiator 102* and 102' can be different, depending on the recording and processing of PKI keys and shared secret keys. Further, although a message 122, message 123, etc. as depicted herein shows key values of "k1", "ke", etc., the depiction of the keys is to illustrate that ciphertext is encrypted with the corresponding key by the use of brackets. In other words, although the key values are shown with the messages, the actual key values are not transmitted inside or with the message in exemplary embodiments. The equivalent syntax is used in DPP specification version 1.0.

Responder 101x can receive message 122 and perform a series of steps to process the message and respond to the initiator 102'. Responder 101x in device 101 can compare (i) hash values received in message 122 with (ii) the calculated hash values for bootstrap public keys from a step 302c. If (a) the hash values match or are equal, then responder 101x can proceed to subsequent steps, and otherwise (b) continue to cycle through a channel list 130b in order to listen for incoming messages 122. At step 318, responder 101x can also generate two random numbers using a random number generator. The first random number can be used as a responder ephemeral private key pr 101f. The responder ephemeral private key pr 101f can be input into an ECC key pair generation algorithm in order to output a responder ephemeral public key Pr 101e. The set of cryptographic parameters 199a used for the responder ephemeral PKI key pair can match the recorded parameters 199a used with the bootstrap public keys such as responder bootstrap public key Br 101a. The second random number generated by responder 101x can be used as a responder nonce 318b. Responder 101x can also determine responder capabilities 319b, which could comprise the capabilities for an enrollee.

Responder 101x can conduct a first responder key exchange step 319, where the details for a key exchange step 319 are depicted in FIG. 4a below. In summary, the received initiator ephemeral public key Pi 102a (from message 122) and the responder bootstrap private key br 101b can be input into an ECDH key exchange in order to mutually derive a shared secret key M 410. The shared secret key M 410 can be input into a key derivation function 402a in order for responder 101x to derive mutually shared key k1 314a. A responder 101x can then conduct a decryption step 320 as depicted in FIG. 4a below. Responder can input the received ciphertext 315a into a symmetric ciphering algorithm 405b and key k1 314a using parameter 199f in order to read the plaintext 403, which could comprise the initiator nonce 317a and the initiator capabilities. In exemplary embodiments, the initiator 102' can have capabilities of a configurator, and responder 101x can select responder capabilities or an enrollee in a step 320. Steps 319 and steps 320 can also comprise the first four paragraphs of section 6.2.3 of DPP specification version 1.0.

Responder 101x can then conduct a second responder key exchange step 314b, where the details for a key exchange step 314b are depicted and described in connection with FIG. 4b below. In summary, the initiator ephemeral public key Pi 102a received in message 122 can be input into an ECDH key exchange algorithm 401a along with the responder ephemeral private key pr 101f derived in a step 318 above in order to output a secret shared key N 411. The value for shared secret key N 411 can be recorded and used in the derivation of a key ke 327a in a third key exchange step 321 below. For a step 314b, the value for the shared secret key N 411 can be input into a key derivation function 402b in order to derive a mutually shared symmetric key k2 314c.

Figure 4C:
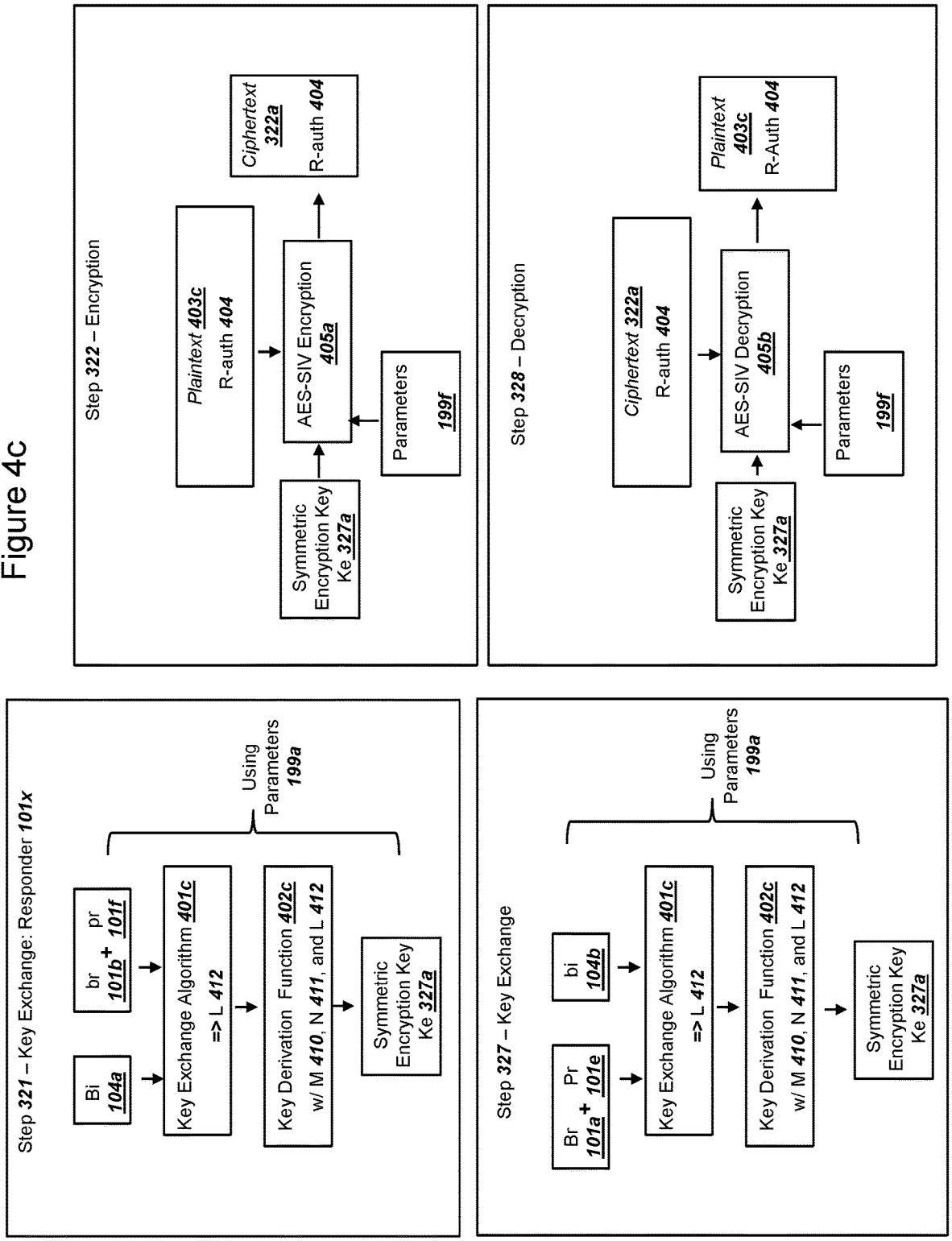
FIG. 4c is a flow chart illustrating exemplary steps for conducting a key exchange using PKI keys in order to derive a shared secret key, and for using the derived shared secret key to encrypt and decrypt data, in accordance with exemplary embodiments.

Responder 101x can conduct a third responder key exchange step 321, where the details for a key exchange step 321 are depicted in FIG. 4c below. In summary, both (i) the derived responder ephemeral private key pr 101f from a step 318 with the recorded responder bootstrap private key br 101b, and (ii) the recorded initiator bootstrap public key Bi 104a can be input into an ECDH key exchange algorithm 401c in order to output a secret shared key L 412. For embodiments where a DPP responder authentication 141 is conducted by responder 101x without the use of an initiator bootstrap public key Bi 104a, then calculation of a secret shared key L 412 can be optionally omitted in a step 321. Step 321 for responder 101x can then comprise a key derivation function 402c using the mutually derived secret shared keys M 410, N 411, and optionally L 412 in order to mutually derive secret shared key ke 327. An example for a key exchange step 321 is described in point 2 of section 6.2.3 of DPP specification version 1.0 on page 48.

Responder 101x can then conduct an encryption step 322, where the details for an encryption step 322 are depicted and described in connection with FIG. 4c below. Step 322 can also comprise responder 101x creating or calculation a value R-auth 404, where R-auth 404 can comprise a secure hash value of the initiator nonce 317a (decrypted from ciphertext 315a), the second random number R-nonce 318b from a step 318 above, and public PKI keys. The value for R-auth 404 in a step 322 can comprise the value in point 3 of section 6.2.3 of DPP specification version 1.0. An encryption step 322 can comprise responder 101x encrypting the value for R-auth 404 using the mutually derived key key 327 from the third key exchange step 321 above, where the output of encryption step 322 can comprise ciphertext 322a.

Responder 101x can then conduct an encryption step 315b, where the details for an encryption step 315b are depicted and described in connection with FIG. 4b below. Ciphertext 322a from an encryption step 322 in the paragraph above can also be encrypted again for an encryption step 315b. The symmetric ciphering key for encryption step 315b can comprise symmetric key k2 314c. Encryption step 315b, encryption step 322, and decryption step 320 can use a common symmetric ciphering algorithm 405a, which could comprise the Advanced Encryption Standard with Synthetic Initialization Vectors (AES-SIV) (and deciphering algorithm) also with a common set of symmetric ciphering parameters 199f. Symmetric ciphering parameters 199f can also specify the use of a block chaining mode such as cipher block chaining (CBC), counter mode (CTR), or Galois/Counter mode (GCM) and other possibilities exist as well. In addition, symmetric ciphering parameters 199f could specify a mode for message authentication, which could comprise a CMAC mode as specified in NIST publication SP-800-38B. In exemplary embodiments, a symmetric ciphering algorithm 405a can comprise the AES-SIV algorithm as specified in IETF RFC 5297. The output from an encryption step 315b can be ciphertext 315c, as depicted in FIG. 4b below. As depicted in FIG. 3a, the collection of steps for responder 101x comprising steps 318, 319, etc. through step 315b can comprise a step 325. In summary, a responder 101x can use a step 325 in order to receive a DPP authentication request message 122 and send a DPP authentication response message 123.

Responder 101x can then send an DPP Authentication Response message 123, where message 123 can include hash values of the bootstrap public keys H(Br 101a), H(Bi 104a), the responder ephemeral public key Pr 101e, and the ciphertext 315c. The ciphertext 315c can have encrypted values for (i) R-nonce 318b, (ii) I-nonce 317a, (iii) R-capabilities 318c, and (iv) ciphertext 322a. The ciphertext 315c can be encrypted with mutually derived symmetric encryption key k2 314c as shown for an encryption step 315b in FIG. 4b. Ciphertext 322a can be encrypted with the mutually derived symmetric key ke 327a and can include a plaintext value for R-auth 404. As described above, R-auth 404 can comprise a hash value over an initiator nonce 317a received and the responder nonce 318b.

As depicted in FIG. 3a, initiator 102' can receive DPP Authentication Response message 123. In exemplary embodiments, initiator 102' can conduct a step 323 to process the received responder ephemeral public key Pr 101e, such as evaluating that the received key in message 123 uses the parameters 199b specified in cryptographic parameters 199a. In addition, a step 323 can comprise initiator 102' can conduct public key validation step to ensure that received responder ephemeral public key Pr 101e is properly formatted and does not contain weak or compromising cryptographic data. For example, a step 323 could comprise initiator 102' performing the steps for an ECC Full Public-Key Validation Routine in section 5.6.2.3.2 of FIPS publication SP 800-56A (revision 2). Alternatively, step 323 can comprise initiator 102' performing the steps ECC Partial Public-Key Validation Routine in section 5.6.2.3.3 of the same FIPS publication. Other example steps within a public key validation step 323 can comprise (i) optionally verifying the public key is not at the "point of infinity", and (ii) verifying the coordinates of the point for the public key are in the range [0, p-1], where p is the prime defining the finite field. Other possibilities exist as well for evaluating and validating a received public key is cryptographically secure in a public key validation step 323, without departing from the scope of the present invention. As contemplated in the present invention, an initiator 102', a DPP server 103, or a responder 101x can conduct a public key validation step 323 each time a public key is received.

In exemplary embodiments, initiator 102' can send DPP server 103 a message 324 using secure session 302b. Message 324 can include the ID-token.device 206 (or alternatively ID.device 101b), and the ciphertext 315c. Hash values for public bootstrap keys can be useful over link 192 between responder 101x and initiator 102' in order to confirm identities, but the hash values can be substituted with an identity for device 101 in message 324 between initiator 102' and DPP server 103. The ciphertext 315c in message 324 can be the same as ciphertext 315c in message 123 in FIG. 3a. In other embodiments, the hash values for the public bootstrap keys of initiator 102 and responder 101x can be included in a message 324, thereby increasing the message size by at least 64 bytes.

DPP server 103 can receive message 324 from initiator 102' and conduct a series of steps in order to process the message and reply to the initiator 102'. In exemplary embodiments, DPP server 103 can also perform a public key validation step 323 on the received responder ephemeral public key Pr 101e. Although a step 323 by DPP server 103 may appear redundant with a step 323 by initiator 102', DPP server 103 may trust its own computation for a step 323 with a higher level than relying solely on a step 323 performed by initiator 102'. Initiator 102' as operating in FIG. 3a could also comprise a device with a lower level of security than DP server 103. After a step 323, DPP server 103 can record the validated, received responder ephemeral public key Pr 101e in a server database 103a, as depicted in FIG. 3b below.

At step 319a, DPP server 103 can conduct a second initiator key exchange step 319a, where DPP server 103 can input the received, validated responder ephemeral public key Pr 101e and the derived initiator ephemeral private key pi 102b into an ECDH key exchange algorithm 401b in order to calculate a shared secret key N 411. The second initiator key exchange step 319a is also depicted and described in connection with FIG. 4b below. Shared secret key N 411 can also be used by DPP server 103 in a step 327 below. DPP server 103 can input shared secret key N 411 into a key derivation function 402b in order to mutually derived the symmetric encryption key k2 314c.

At step 320b, DPP server 103 can use the derived key k2 314c from a step 319a in order to conduct a decryption step 320b on received ciphertext 315c. A decryption step 320b on received ciphertext 315c using key k2 314c is depicted an described in connection with FIG. 4b below. DPP server 103 can read the plaintext 403b values from decryption step 320b of ciphertext 315c. The plaintext values 403b can include the initiator nonce 317a from a message 317 and message 122 above. The plaintext values 403b can also include a second ciphertext 322a (e.g. ciphertext 322a can be inside ciphertext 315c). DPP server 103 verifies that the initiator nonce 317a received in message 123 and decrypted in step 320b is equal to the initiator nonce 317a value sent in message 122 above. If the two initiator nonce 317a values are not equal, then DPP server 103 can abort the DPP procedure and subsequent steps.

At step 327, DPP server 103 can conduct a third initiator key exchange step 327, where DPP server 103 can determine the secret shared key L 412 by inputting (i) the combination of the responder bootstrap public key Br 101a and the responder ephemeral public key Pr 101e (which could comprise an ECC point addition operation), and (ii) the initiator bootstrap private key bi 104b into an ECDH key exchange algorithm 401c. A third server key exchange step 327 is depicted and described in connection with FIG. 4c below. The shared secret key L 412 along with shared secret keys M 410 and N 411 can be used with a key derivation function 402c in order to output the mutually derived symmetric ciphering key ke 327a.

At step 328, DPP server 103 can conduct a decryption step 328 on the ciphertext 322a using the key ke 327a. A decryption step 328 is depicted and described in connection with FIG. 4c below. DPP server 103 can use the decryption step 328 in order to read the plaintext value of R-auth 404. R-auth 404 can comprise a hash 199e value over the combination of initiator nonce 317a and the responder nonce 318b, plus PKI public keys. At step 328, DPP server 103 can then also internally calculate the same value for R-auth 404, and if the internally calculated value and the received, decrypted value are equal, then the responder 101x can be consider authenticated with DPP server 103. In other words, at step 328 DPP server 103 can determine that the calculated value for R-auth 404 and the received, decrypted value for R-auth 404 are equal before proceeding with additional steps in FIG. 3a. If the calculated value for R-auth 404 and the received value for R-auth are not equal, then DPP server can end the DPP 191 session without sending network credentials 109. The calculation of R-auth 404 by DPP server 103 can be according to section 6.2.3 of DPP specification version 1.0.

DPP server 103 can then conduct a step 322b, where step 322b can comprise calculating an initiator authentication value I-auth 404a and encrypting the value I-auth 404a. Initiator authentication value 404a can be similar to responder authentication value R-auth 404, except the values of initiator nonce 317a can be sequenced before a responder nonce 318b inside a hash 199e calculation over the two nonces. A DPP server 103 can then encrypt the initiator authentication value 404a using an encryption step 322 using key ke 327a, as depicted in FIG. 4c below. In other words, an encryption step 322 in FIG. 4c depicts the encryption of R-auth 404, and encryption step 322b can comprise a DPP server 103 encrypting the initiator authentication value I-auth 404a using the key ke 327a derived in a step 327. The encrypted ciphertext for the initiator authentication value I-auth 404a using the key key 327a can comprise a ciphertext 349.

DPP server 103 can then send initiator 102' a message 329, where message 329 can include (i) an identity for device 101, such as ID-token.device 206, although ID.device 101i could be used instead, and (ii) the encrypted initiator authentication value I-auth 404a comprising the ciphertext 349. Initiator 102' can receive message 329 over secure session 302b. In an exemplary embodiment, the value MAC.R 101d could also be within message 329, such that initiator 102' can use the MAC.R 101d to send data in message 329 to responder 101x using the MAC.R 101d. Initiator 102' can determine which of a plurality of responders 101x is directed towards based on the value of ID-token.device 206 or MAC.R 101d. Initiator 102' can previously record the hash 199e values for the initiator and responder bootstrap public keys. Initiator 102 can take the recorded hash 199e values for the initiator and responder bootstrap public keys and append to them the encrypted value for I-auth 404a received in message 329. Initiator 102' can send responder 101x a DPP authentication confirm message 123a, as depicted in FIG. 3a. The data and steps to determine and calculate an DPP authentication confirm message 123a can be according to section 6.2.4 of DPP specification version 1.0.

Note that although the DPP authentication confirm message 123a can be equivalent to the DPP authentication confirm message from section 6.2.4 of DPP specification version 1.0, an important difference can be the operation of initiator 102' in FIG. 3a versus an initiator as contemplated by DPP specification version 1.0. In the embodiment of the present invention as depicted in FIG. 3a, initiator 102' can record neither the responder bootstrap public key Br 101a, nor the initiator bootstrap private key bi 104b. So, using the technology depicted in FIG. 3a, an initiator 102' can (i) send and receive messages that are fully compatible with a DPP protocol 191, but (ii) DPP server 103 can record keys 101a and 104b. In other words, a responder 101x may not "know" that an initiator operates as either (i) an initiator 102\* from FIG. 1b or FIG. 1c, or an initiator 102' from FIG. 3a since the messages transmitted by initiator 102' and received by the responder 101x can be fully compatible with a DPP 191.

Responder 101x can receive the DPP authentication confirm message 123a and process the message. Responder 101x can listen for either (i) a broadcast message with the hash 199e values for the bootstrap public keys 101a and 104a, or (ii) for a unicast message to MAC.R 101d. Responder 101x can first conduct a decryption step 328b, where decryption step 328b can use the same steps as a decryption step 328 as depicted in FIG. 4c below, with a difference being decryption step 328b operates on the initiator authentication value I-auth 404a instead of the R-auth 404 value.

In step 331, responder 101x can compare the decrypted value for I-auth 404a with a calculated value for I-auth 404a and if the two values match then data from the initiator 102' can be considered by responder 101x to be authenticated. After an authentication step 331, in step 332, responder 101x can take on a roll of enrollee, such that responder 101x can prepare to send a configuration attribute 330. Configuration attribute 330 can be used to specify that responder 101x can take the roll of enrollee and is expecting a set of network credentials 109 from initiator 102'. A configuration attribute 330 can be formatted and contain data fields according to section 6.3.4 of DPP specification version 1.0. For the exemplary embodiment depicted in FIG. 1a, device 101 with responder 101x would prefer a role of WiFi client (or "sta") for a configuration attribute 330, but other possibilities exist as well. For the exemplary embodiment depicted in FIG. 7 below a responder 101x operating within an access point 105 would prefer a role of WiFi access point (or "ap") for a configuration attribute 330.

In step 332, responder 101x can also generate a third responder random number, where the third responder random number can comprise an enrollee nonce E-nonce 332a. E-nonce 332a and other nonce values in FIG. 3a such as the initiator nonce I-nonce 317a and responder nonce R-nonce 318b can be processed using nonce parameters 199g. Responder 101x can then conduct an encryption step 322c, where encryption step 322c can comprise (i) an encryption step 322 using key ke 327a, and (ii) the plaintext to be encrypted can be the E-nonce 332a and the configuration attribute 330. The output of an encryption step 322c can be a ciphertext 322d. As depicted in FIG. 3a, the collection of steps comprising 328b through 322c for responder 101x can comprise a step 339, where a responder 101x processes both message 123a and message 123b in a step 339. Responder 101x can then send or transmit to initiator 102' a DPP Configuration Request message 123b, where the configuration request 123b can include the ciphertext 322d, where the plaintext in ciphertext 322d can include E-nonce 332a and the configuration object 330. DPP Configuration Request message 123b can be processed by responder 101x according to section 6.3.3 of DPP specification version 1.0.

Initiator 102' can receive DPP Configuration Request message 123b via connection 192 and using DPP application 102g. As contemplated herein, a DPP application 102g can perform the steps for initiator 102' depicted in FIG. 3a, such as transmitting/receiving DPP 191 messages using a first MAC.I 102n for connection 192 and transmitting/receiving messages with DPP server 103 using MAC.N 102q via access network 112. Although not depicted in FIG. 3a, DPP application 102g could also perform the depicted steps 323 to validate the received responder ephemeral public key Pr 101e from message 123b. For embodiments where initiator 102' uses a WAN radio 102h to connect with access network 112 and DPP server 103, then DPP application 102g could also use a different identity than MAC.N 102q to identify the physical interface of WAN radio 102h, such as an IMEI, device identity ID.device 102i, or other possibilities exist as well. For other embodiments where initiator 102' uses network access point 105 for an access network 112 to connect with DPP server 103, then MAC.I 102n could also potentially be the same as MAC.N 102q. Other possibilities exist as well without departing from the scope of the present invention for an identity used by initiator 102' to send messages to DPP server 103.

Initiator 102' can send DPP server 103 a message 334 via secure connection 302b, where message 334 can include the ciphertext 322d. Although not depicted in FIG. 3a, message 334 can also include an identity for device 101, such as, but not limited to, ID-token.device 206 or ID.device 101b, since both DPP server 103 and initiator 102' can communicate with a plurality of different devices 101 over time, and DPP server 103 may prefer to know which ciphertext 322d is associated with which device 101 in order to process the ciphertext 322d. As depicted in FIG. 3a, message 334 can include the encrypted values for E-nonce 332a and configuration attribute 330 in ciphertext 322d.

DPP server 103 can receive message 334 and process the message 334. DPP server 103 can conduct a decryption step 328c using decryption step 328 depicted in FIG. 4c below. A difference between decryption step 328 and decryption step 328c is that decryption step 328c uses the ciphertext 322d as input into the symmetric decryption algorithm 405b. DPP server 103 can use the previously calculated key ke 327a in order to read the plaintext within ciphertext 322d. DPP server 103 can record the plaintext E-nonce 332a and configuration attribute 330.

In step 335, DPP server 103 can process the received configuration attribute 330. For the exemplary embodiment depicted in FIG. 1a, configuration attribute 330 can specify that device 101 with responder 101x may have a role of WiFi client. In exemplary embodiments, DPP server 103 can previously select a primary access network 308aa in a step 308a above, using the received networks available list 304c from initiator 102'. Also, in a step 308b above, DPP server 103 could receive or record the set of network credentials 109 associated with the selected primary access network 308aa for device 101 using device identity ID-token.device 206 (or ID.device 101i) and server database 103a and credentials table 340 in FIG. 3b below. In step 335, DPP server can process the set of network credentials 109 for primary access network 308aa into a configuration object. The configuration object with network credentials 109 can comprise a connector or configuration object as specified in section 6.3.5 and 6.3.6 of DPP specification version 1.0. The configuration object with network credentials 109 can be signed using the recorded initiator ephemeral private key pi 102b, corresponding to public key Pi 102a sent in message 317 and 122 above. Or, in another embodiment the configuration object with network credentials 109 can be signed using the recorded initiator bootstrap private key bi 104b. The steps to create and verify a signature with ECC PKI keys can be according to FIPS publication 186-4, and other possibilities exist as well.

In a step 335, DPP server 103 can process a configuration object for network credentials 109, and the configuration object can include an SSID value of SSID.network-AP 109a, a pairwise master key value of PMK.network-AP 109b, and configuration values of config.network-AP 109c. The value of PMK.network-AP 109b can also include a value for PMKID (e.g. PMK identifier), such that PMK.network-AP 109b is used by each of a client and an access point with the PMKID value. The configuration values of config.network-AP 109c in a configuration object could also specify required supporting data for operation of device 101 with an access point 105 after a configuration step 106, such as an operating class 130a, channel list 130b, an authentication mode for device 101 to operate, which could be PSK, PMK, SAE, EAP, also with any required supporting data and/or identities. The configuration values of config.network-AP 109c in a configuration object could also include a passphrase or pre-shared key values of PSK for legacy WPA2 networks. As contemplated herein, a set of network credentials 109 can include either (i) network credentials 109 for a selected primary access network 308aa, or (ii)

network credentials 109 for both a selected primary access network 308aa and a selected backup access network 308ab. Or, in another exemplary embodiment, although a single configuration object of network credentials 109 is depicted in FIG. 3a, DPP server 103 could process (i) a first set of network credentials 109 for selected primary access network 308aa into a first configuration object and then (ii) s second set of network access credentials 109 for selected backup access network 308ab into a second configuration object.

At step 322e, DPP server 103 can conduct an encryption step 322e using an encryption step 322 depicted and described in connection with FIG. 4c below. Encryption step 322e can be performed using key ke 327a for device 101. For encryption step 322e, the plaintext values of (i) the E-nonce 332a and (ii) the configuration object comprising network credentials 109 can be input into a symmetric encryption algorithm 405a in order to generate a ciphertext 322f. DPP server 103 can then send initiator 102' a message 338, where message 338 includes the ciphertext 322f. Message 338 can also optionally include an identity for device 101 such as ID-token.device 206 or ID.device 101i. Message 338 can be sent via secure connection 302b, as depicted in FIG. 3a. Message 338 can also include a digital signature over at least the configuration object comprising network credentials 109, where the digital signature is created by DPP server 103 using the initiator ephemeral private key pi 102b or the initiator bootstrap private key 104b. Note that in some exemplary embodiments, message 338 can include an asymmetrically encrypted set of network access credentials 109' (instead of plaintext network access credentials 109), where the asymmetrically encrypted network access credentials 109' are depicted and described in connection with a step 336 and a message 515 in FIG. 5a below.

Initiator 102' using DPP application 102g can receive message 338 via secure connection 302b. Initiator 102' can use an optional identity for device 101 in a message 338 in order to determine which of a potential plurality of devices 101 associated with ciphertext 332f in order to forward the data. Initiator 102' can then send responder 101x a DPP configuration response message 124 via connection 192, where message 124 can include the ciphertext 322f, and the ciphertext 322f can include the encrypted E-nonce 332a and (i) the encrypted, signed network credentials 109 or (ii) the encrypted and also asymmetrically encrypted network access credentials 109' as depicted and described in a step 336 below in FIG. 5a.

Responder 101x can receive message 124 from initiator 102' with ciphertext 322f. Responder 101x can conduct a decryption step 328d using decryption step 328 depicted in FIG. 4c below. A difference between decryption step 328 and decryption step 328d is that decryption step 328d uses the ciphertext 322f as input into the symmetric decryption algorithm 405b. Responder 101x can use the previously calculated key ke 327a (from key exchange step 321) in order to read the plaintext within ciphertext 322f. Responder 101x can confirm that plaintext in ciphertext 322f includes the previously send E-nonce 332a. Responder 101x can read (i) the plaintext values for credentials 109 or (ii) the plaintext ciphertext value for asymmetrically encrypted network access credentials 109'. In other words, ciphertext 322f could include "double encrypted" ciphertext 109', and the first level of encryption with key ke 327a could be removed by a decryption step 328d. Note that credentials 109 may be previously signed by DPP server 103 using a private key initiator ephemeral private key pi 102b for the initiator 102' (or initiator bootstrap private key bi 104b), where the private key corresponds to public key Pi 102a. The responder could also verify a signature for the credentials 109 using the ephemeral public key for the initiator Pi 102a recorded with the responder 101x, such as the initiator ephemeral public key Pi 102a or the initiator bootstrap public key Bi 104a. The selection of PKI keys for signing and verifying a signature for credentials 109 could be specified in a set of parameters 199a.

After reading the network credentials 109 and optionally verifying a signature using a recorded public key 102a or 104a, device 101 can complete the configuration step 106 by loading the network credentials 109 and begin operating a WiFi radio 101h with the network credentials 109, as depicted in FIG. 1a. In this manner, device 101 can obtain connectivity to network access point 105. Note that for some exemplary embodiments, network credentials 109 could be applied to other radios besides a WiFi radio 101h in device 101 (equivalent to WiFi radio 102w in initiator 102), such as using the received network credentials 109 with a WAN radio for a 5G or 6G wireless WAN network for device 101. In exemplary embodiments, the initiator 102' can conduct the initiator restore step 129 depicted and described in connection with FIG. 1d above, such that initiator 102' can be returned to the previous state where WiFi radio 102w operates with a user configuration 131, thus minimizing impacts of the prior initiator configuration step 127 for an initiator user 102u.

FIG. 3b

FIG. 3b is an illustration of an exemplary server database, with tables for a server database recording exemplary data, in accordance with exemplary embodiments. A server database 103a depicted and described above in connection with FIG. 1a and FIG. 3a can record data for a DPP server 103 to work or operate with an initiator 102' in order for the initiator 102' to conduct a device provisioning protocol 191 with a device 101 operating a responder 101x. A server database 103a could record a plurality of tables for a plurality of devices 101 and a plurality of initiators 102', including the depicted device credentials table 340. Other possibilities exist as well for the organization, tables, and recorded data within a device database 103a without departing from the scope of the present invention. Data within server database 103a could be encrypted using a symmetric key. As depicted in FIG. 1a, a DPP server 103 operating in a network 107 could operate and record a server database 103a.

Server database 103a can record a device identity of ID-token.device 206, a responder MAC address MAC. R 101d, an initiator MAC address MAC. I 102n (or MAC.I 102q), a mode of operation for the DPP server 103 and initiator 102' comprising initiator mode 306a, a selected set of Cryptographic Parameters 199a, an Initiator Ephemeral Public Key 102a, an Initiator Ephemeral Private Key 102b, a Responder Ephemeral Public Key 101e, Bootstrap keys 399, an optional PKEX Key 198, a Shared Secret k1 314a, a Shared Secret k2 314c, and a Shared Secret ke 327a. For exemplary embodiments, not all depicted values may be recorded in a server database 103 a, as shown by the depicted value of "-", which can mean that the value is not recorded in a server database 103a. An initiator 102' could record the value depicted as "-" for a server database 103a in FIG. 3b for some initiator modes 306a, as depicted. For example, with the row in server database 103a depicted with a mode "FIG. 5a", the initiator 102' could derive, record, and operate on the initiator ephemeral private key pr 102b and initiator ephemeral public key Pr 102a, and DPP server 103 may not need or record the keys. Similarly, with the row in server database 103a depicted in FIG. 3b as a mode of "FIG.

5b", the initiator 102' could derive shared secret keys k2 314c and ke 327e, while server database 103a could derive and record key k1 314a. Note that in alternative exemplary embodiments, a server database 103a could record the values M 410, N 411, and L 412 respectively instead of key k1 314a, k2 314c, and/or ke 327e, and either DPP server 103 or initiator 102' could use the key derivation function 402a, 402b, and/or 402c, respectively in order to convert the values into keys. In exemplary embodiments, the time that a device shared secret key or a derived ephemeral PKI key, or a bootstrap key is recorded in a server database 103a can be minimized to the minimum time necessary to conduct a DPP 191. For example, shared secret keys and ephemeral PKI keys recorded in a server database 103a can be deleted once a configuration step 106 has been completed for a device 101, such as at the time DPP server 103 receives a report 605aa from device 101 in FIG. 6a below.

Initiator mode 306a can specify an operating mode for initiator 102 and DPP server 103, such that a sequence of steps and transmitting/receiving PKI and/or shared secret keys can be specified by the initiator mode 306a. An initiator mode 306a could also be referred to as a "server mode" 306a, since the mode specifies the operation of a DPP server 103. Or, initiator mode 306a could be referred to as a "mode 306a", since both steps for initiator 102' and DPP server 103 are affected by the mode. FIG. 3a above also described a first, second, third, and fourth operating initiator modes 306a. The first, second, third, and fourth modes for initiator 102' and DPP server 103 further described below in this FIG. 3b can also correspond to the same first, second, third, and fourth modes for initiator 102' and DPP server 103 as depicted and described for a step 306 in FIG. 3a.

A first mode is depicted as "FIG. 3a" in FIG. 3b and can comprise the mode 306a depicted in FIG. 3a. Note that all depicted ephemeral PKI keys and bootstrap PKI keys, as well as all depicted shared secret keys are recorded in a server database 103a for a device 101 (except responder private keys 101b and 101f) for the first mode. In other words, when conducting a DPP 191, initiator 102' and DPP server 103 would have all the depicted keys recorded in a server database 103 a for the first mode. This first mode for an initiator mode 306a can be preferred for embodiments where (i) initiator 102' may have a lower level of trust with network 107, or (ii) initiator 102' could have a lower level of processing resources, or (iii) an owner for device 101 or a network 107 may prefer that responder bootstrap public key Br 101a is not shared externally from network 107, or (iv) regulatory requirements where device 101 could comprise a high value or sensitive piece of equipment. Other possibilities exist as well for the reasons different modes 306a may be used in a server database 103a to specify the steps for an initiator 102' and DPP server 103 to conduct a DPP 191 with device 101.

A second mode is depicted as "FIG. 5a" in FIG. 3b, where the steps and message flows in FIG. 5a for initiator 102' and DPP server 103 can comprise the second mode. Note that all relevant bootstrap PKI keys 399 are recorded in a server database 103a for the mode depicted in FIG. 5a. The mode 306a can also have (i) the responder ephemeral public key Pr 101e and (ii) the shared secret key k1 314a recorded in a server database 103a. Note that initiator ephemeral PKI keys and secret shared keys can optionally not be recorded in a server database 103a for the second mode depicted in FIG. 5a. This exemplary embodiment may be preferred for cases where (i) initiator 102' can handle more of the cryptographic operations (e.g. reducing DPP server 103 processing load), but (ii) a network 107 and initiator user 102u could prefer that the initiator bootstrap private key bi 104b is not transmitted to or recorded in initiator 102'. An exemplary reason the second mode of "FIG. 5a" could be preferred may be embodiments where multiple different devices 101 record the same initiator bootstrap public key Bi 104a, and for these embodiments a network 107 may prefer to keep the initiator bootstrap private key bi 104b recorded in a server database 103a. This embodiment was also discussed above with the devices designated with "shared keys" in FIG. 2b. As depicted in FIG. 3b, devices 101 with the same recorded value or number for an initiator bootstrap public key Bi 104a could also record different responder bootstrap public keys Br 101a.

A third mode 306a is depicted as "FIG. 5b" in FIG. 3b, where the steps and message flows in FIG. 5b for initiator 102' and DPP server 103 can comprise the third mode. Note that all relevant bootstrap PKI keys 399 are recorded in a server database 103a for the third mode depicted in FIG. 5b. The third mode 306a can be a mix between the first mode of "FIG. 3a" and the second mode of "FIG. 5a". In other words, the third mode 306a of "FIG. 5b" can have the same data recorded for operation of the mode in "FIG. 5a", except the addition of recording the initiator ephemeral private key pi 102b and secret key k1 314a in server database 103a. Thus some additional computation resources are shifted from the initiator 102' to DPP server 103 from using a mode of "FIG. 5a" to the mode of "FIG. 5b". One reason to use the third mode of FIG. 5b could be a desire or requirement by DPP server 103 or initiator user 102u or a device 101 owner to have the cryptographic operations of a DPP 191 more evenly shared between an initiator 102' and a DPP server 103. In other words, a mode depicted in FIG. 3a could comprise a mode that is mostly on DPP server 103, a mode depicted in FIG. 5a could comprise a mode that is mostly on initiator 102', and a mode depicted in FIG. 5b could comprise a balanced mode where a mix of the keys and cryptographic operations are more evenly shared between DPP server 103 and initiator 102'.

A fourth mode 306a in FIG. 3b can comprise initiator 102' operating as an initiator 102* depicted in FIG. 1b and FIG. 1c, and in this case initiator 102* can record the keys shown for the fourth mode 306a in FIG. 3b. A DPP server 103 can still provide the bootstrap keys 399 shown to initiator 102* in this fourth mode of operation, or the initiator 102* could obtain the bootstrap keys 399 from other means, such as "out of band" messages 121 and 126 in FIG. 1c. In addition, an initiator 102* could obtain the bootstrap keys "in band" (e.g. via WiFi link 192) using PKEX key 198.

Bootstrap keys 399 in a server database 103a can record the bootstrap keys depicted in FIG. 3b, which could comprise a responder bootstrap public key Br 101a, an initiator bootstrap public key Bi 104a, and an initiator bootstrap private key 104b. For embodiments where a device 101 can support multiple different sets of cryptographic parameters 199a, a server database 103a can record the selected set of cryptographic parameters 199a for communication between an initiator 102' and device 101 with responder 101x. The keys for "bootstrap keys 399" can be according to the selected set of cryptographic parameters 199a. In other words, a device database 104 in FIG. 2b above can record all versions of the bootstrap PKI keys for all supported cryptographic parameters 199a for a device 101. However, since a set of cryptographic parameters 199a will need to be selected for a DPP 191 (e.g. one of the responder bootstrap public keys Br 101a selected), then the bootstrap keys 399 for that selected set of cryptographic parameters 199a can be recorded in a server database 103a.

A server database 103a can also record a preshared PKEX key 198, if PKEX is optionally supported by responder 101x. PKEX key 198 can be used by initiator 102' to securely transfer bootstrap public keys in band (i.e. via connection 192 in FIG. 1a and FIG. 3a). The use of a PKEX protocol to exchange the public keys is described in section 5.6 of DPP specification version 1.0. For embodiments where initiator 102' uses PKEX key 198 with responder 101x, the initiator bootstrap private key bi 104b preferably continues to reside within a network 107 and can be in a server database 103a. PKEX key 198 can be used with responder 101x MAC address MAC.R 101d. Embodiments can omit the use of PKEX key 198, as depicted with the value of "NA" for the key in FIG. 3b. Derived, shared secret keys with responder 101x can also be recorded in a server database 103a. The derived shared secret keys could comprise key k1 314a, key k2 314c, and key ke 327e. The steps to derive and use these keys are depicted and described below in FIG. 4a, FIG. 4b, and FIG. 4c, respectively. As discussed above, some keys may reside in server database 103a, and other keys may reside within an initiator 102' (depicted with a "-"), depending on the mode 306a.

The present invention contemplates other implementations of a device provisioning protocol besides the DPP specification version 1.0. These other implementations could have different mutually derived shared secret keys than those depicted in FIG. 3b, and the different mutually derived shared secret keys could be recorded in a server database as well. For example, a different key derivation function 402 could be used to derive a secret shared key than that specified in DPP specification version 1.0. In addition, other or different PKI keys for a responder 101x and/or initiator 102' could be recorded in a server database 103a. For example, the DPP specification version 1.0 could be extended to explicitly include a DPP server 103 public and private key, in order to extend support with a DPP server 103, and in these embodiments the DPP server 103 public and private keys could be included in a server database 103a. Other possibilities exist as well for (i) a server database 103a to record PKI keys and shared secret keys to support (ii) a device provisioning protocol without departing from the scope of the present invention.

A server database 103a could also record a device credentials table 340. Device credentials table 340 can record a device identity ID-token.device 206 (or ID.device 101i), a selected primary network 308aa, a selected backup network 308ab, a set of primary network credentials 109, and a set of backup network credentials 109. The selected primary network 308aa and selected backup network 308ab could be determined in a step 308a in FIG. 3a by DPP server 103 or network 107. The set of primary network credentials 109 can comprise the set of credentials (plus configuration) for a device 101 to use with the selected primary network 308aa. The set of backup network credentials 109 can comprise the set of credentials (plus configuration) for a device 101 to use with the selected backup network 308ab. The credentials 109 in a device credentials table 340 could be obtained from during a step 308b as depicted and described above in connection with FIG. 3b.

For example, with the first device depicted in a device credentials table 340, device 101 could record a selected primary network 308aa for network access point 105 in FIG. 1a. The value recorded for 308aa could be SSID.network-AP 109a. The credentials in device table for the first device could comprise the credentials 109 depicted in FIG. 1a. The depicted designation of "109a-1" means the first instance of a value of SSID.network-AP 109a. The device in the second row can use the same value for SSID.network-AP 109a. The device in the last depicted row can use a different value for a selected primary network 308aa of "109a-3" which could be the third distinct value in device credentials table 340. Values of "304c-1" for selected primary network 308aa can mean a first value from a networks identity list 304c from FIG. 3a, values of "304c-2" can mean a second value from a networks available list 304c, etc.

For embodiments where a network other than network 107 is selected for device 101 to be configured with credentials, the credentials in a device credentials table 340 are depicted as "from . . . ", where " . . . " can be the depicted, selected network from a networks available list 304c. In exemplary embodiments, the credentials for networks external to network 107 can be encrypted by the external network using Elgamal encryption and either (i) the responder bootstrap public key Br 101a or (ii) the responder ephemeral public key Pr 101e. The DPP server 103 could send either (i) the responder bootstrap public key Br 101a or (ii) the responder ephemeral public key Pr 101e to the external network for the external network to encrypt the credentials using the public key for the responder 101x and an Elgamal asymmetric encryption algorithm, which was also described above. Thus, the credentials are stored as ciphertext in a server database 103a and only the device 101 with responder 101x could feasibly decrypt the ciphertext in order to read the credentials for networks external to network 107. Additional details for receiving credentials from an external network, and recording the encrypted credentials in a server database 103a are depicted and described below in connection with a step 415 in FIG. 5a, depicted as credentials 109'. In other words, for embodiments where a network other than network 107 is selected for device 101 to be configured with credentials, the credentials in a device credentials table 340 depicted as "from . . . " can comprise an asymmetrically encrypted set of credentials 109'.

Note the present invention contemplates that (a) a selected access network 112 for device 101 in a step 308a above in FIG. 3a by a DPP server 103 or network 107 could (b) utilize wireless networking technology other than WiFi or 802.11 based technology. For example, surrounding wireless networks for device 101 could use exemplary potential use of 5G wireless technology or LPWAN networking technology depicted in a networks available list 304c in FIG. 3a above for potential access networks 112 for device 101. For these embodiments where a selected access network for device 101 from a step 308b comprises a network based on standards other than WiFi or 802.11, the credentials could comprise values equivalent or similar to (i) an SSID (such as mobile network codes transmitted by base stations or gNb), (ii) a PMK (such as a key K or other key for key derivation), and configuration (such as network configuration parameters). Or, a WiFi access point could also be selected by a DPP server 103 or a network 107 for device 101 in step 308a above in FIG. 3a using the networks available list 304c.

For the exemplary embodiment depicted in FIG. 3a and also FIG. 1a above, the exemplary network access point 105 can be selected in a step 308a using SSID.network-AP 109a from FIG. 1a, although different networks in a networks available list 304c could be selected instead, based on exemplary criteria listed for a step 308a above in FIG. 3a. In addition, a network access point 105 in FIG. 1a can comprise a form of an access network 112 as contemplated herein, such that device 101 obtains access to IP network 113 or the globally routable Internet via an exemplary network access point 105. A selected access network 112 for device 101 in a step 308a does not need to belong to network 107 from FIG. 1a, and could belong to a different network (so long as network 107 could obtain or point to credentials 109 for the access network 112 in order to conduct the configuration step 106 from FIG. 1a). Further, a step 308a could comprise the selection of both a primary access network 112 (identified in table 340 as selected primary network 308aa) for device 101 and a second, backup access network 112 (identified in table 340 as selected backup network 308ab) for device 101. The use of a primary and backup network for device 101 can provide increased reliability for the operation of device 101, such that if the primary access network 112 is not available then device 101 could use the selected backup network in order for device 101 to maintain connectivity to an IP network 113. In other words, a DPP 191 could be conducted by an initiator 102' and a responder 101x in order for the responder 101x to receive credentials 109 for both a primary network and a backup network, where the primary network and the backup network are selected in a step 308a in FIG. 3a.

FIG. 4a

FIG. 4a is a flow chart illustrating exemplary steps for conducting a key exchange using PKI keys in order to derive a shared secret key, and for using the derived shared secret key to encrypt and decrypt data, in accordance with exemplary embodiments. Exemplary steps for an initiator 102' and a responder 101x to mutually derive keys can comprise (i) a key exchange 314 step for DPP server 103 or initiator 102' (depending on the mode 306a) to derive a symmetric encryption key k1 314a and (ii) a key exchange 319 step for a responder 101x to derive the same symmetric encryption key k1 314a. Exemplary steps for a responder 101x to decrypt data and initiator 102' for DPP server 103 (depending on a mode 306a) to encrypt data can comprise (a) an encryption step 315 for initiator 102' or DPP server 103 (depending on a mode 306a) to utilize the symmetric encryption key k1 314a to convert plaintext to ciphertext, and (b) a decryption 320 step for responder 101x to utilize the symmetric encryption key k1 314a to convert the ciphertext received from initiator 102' into plaintext. The use of the steps for a key exchange 314, a key exchange 319, encryption 315, and decryption 320 were also depicted and described in connection with FIG. 3a above. Additional detail regarding the use of these steps will be provided herein with FIG. 4a. Further, although the steps are depicted specifically for the use of particular keys and plaintext/ciphertext combinations in FIG. 4a, the steps illustrated can be used with different keys and plaintext/ciphertext combinations. For example, FIG. 4b below depicts the same functionality used by the nodes as in FIG. 4a, but with (i) different PKI keys input to mutually derive a different symmetric encryption key, (ii) a different key derivation function and (iii) different plaintext encrypted and different ciphertext decrypted.

The processes and operations, described below with respect to all of the logic flow diagrams and flow charts may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the device, wherein one function of the device can be a computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions.

Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

A key exchange 314 step for initiator 102' or DPP server 103 (depending on a mode 306a) to derive a symmetric encryption key 314a can utilize a selected set of cryptographic parameters 199a as depicted and described in connection with FIG. 2b above. As depicted in FIG. 4a, a key exchange algorithm 401a can receive input both of a responder bootstrap public key Br 101a and an initiator ephemeral private key pi 102b. The key exchange algorithm 401a could comprise a Diffie Hellman key exchange (DH), an Elliptic Curve Diffie Hellman key exchange (ECDH), and other possibilities exist as well without departing from the scope of the present invention. A key exchange algorithm 401a can support either PKI keys based on elliptic curves or RSA algorithms, although support of elliptic curves may be preferred in some exemplary embodiments due to their shorter key lengths and lower processing requirements.

A summary of ECDH as a key exchange algorithm 401a is included in the Wikipedia article titled "Elliptic Curve Diffie-Hellman" from Mar. 9, 2018, which is herein incorporated by reference. An exemplary embodiment of key exchange algorithm 401a could comprise a "One-Pass Diffie-Hellman, C(1, 1, ECC CDH)" algorithm as described in section 6.2.2.2 on page 99 of the National Institute of Standards and Technology (NIST) document "NIST SP 800-56A Revision 3, Recommendation for Pair-Wise Key Establishment Schemes Using Discrete Logarithm Cryptography" from April, 2018 which is hereby incorporated by reference its entirety. Other key exchange algorithms in NIST SP 800-56A could be utilized as well for a key exchange algorithm 401a in FIG. 4a, FIG. 4b, and FIG. 4c without departing from the scope of the present invention. Example calculations for an ECDH key exchange for a key exchange algorithm 401a are shown on pages 88 and 89 of DPP specification version 1.0, where a selected set of parameters 199a can use the ECC curve P-256 with PKI key lengths of 256 bits.

Other algorithms to derive a shared symmetric encryption key using public keys and private keys may also be utilized in a key exchange algorithm 401a (and 401b in FIGS. 4b and 401c in FIG. 4c), such as, but not limited to, the American National Standards Institute (ANSI) standard X-9.63. Cryptographic parameters 199a can also include information for using a key exchange algorithm 401a and a key derivation function 402a in order to derive a commonly shared symmetric encryption key k1 314a. As contemplated herein, the terms "selected set of cryptographic parameters 199a" and "cryptographic parameters 199a", and "parameters 199a" can be equivalent. Parameters 199a input into a key exchange algorithm 401a can include a time-to-live for a key k1 314a that is derived, a supported point formats extension, where the supported point formats extension could comprise uncompressed, compressed prime, or "compressed char2" formats, as specified in ANSI X-9.62. In other words, an ECC keys input into a key exchange algorithm 401a may have several different formats and a set of parameters 199a can be useful to specify the format.

As depicted in FIG. 4a, the output of a key exchange algorithm 401a, such as an ECDH key exchange, can comprise a secret shared key M 410. The secret shared key M 410 can be input into both (i) a first key derivation function 402a in order to calculate the key k1 314a and (ii) a second key derivation function 402c in order to calculate a symmetric encryption key ke 327a as depicted in FIG. 4c below. Key derivation function 402a could use a hash algorithm 199e from parameters 199a, where an input into the hash algorithm 199e can comprise the value M 410 along with other text data mutually shared between initiator 102' and responder 101x. As contemplated herein, a secret shared key can also be referred to as a value, since the secret shared key can be a numeric value or a number in the form of a sequence of digits. In DPP specification version 1.0 a key derivation function 402a to determine key k1 314a is depicted on the fourth line of page 48. Other possibilities exist as well for a key derivation function 402a without departing from the scope of the present invention. For example, with other embodiments besides those within DPP specification version 1.0, the output of a key derivation function 402a can be both a symmetric encryption key k1 314a and a message authentication code (MAC) key, where a MAC key can function to verify message integrity of ciphertexts generated with the symmetric encryption key 314a.

As depicted in FIG. 4a, an encryption 315 step could be utilized with the derived symmetric encryption key k1 314a in order to convert plaintext 403b into ciphertext 315a. An encryption 315 step can utilize a symmetric encryption algorithm 405a, where symmetric encryption algorithm 405a could comprise an algorithm according to the Advanced Encryption Standard (AES), Blowfish, and Triple Data Encryption Standard (3DES), and other possibilities exist as well. As depicted in FIG. 4a, a symmetric encryption algorithm 405a can comprise the AES-SIV algorithm as specified in IETF RFC 5297. Parameters 199f could specify settings for a symmetric ciphering algorithm 405a as well, such as key length and a block cipher modes such as, but not limited to, ECB, CBC, OFB, and CFB. Parameters 199f may also specify an authenticated encryption mode such as CCM (NIST SP800-38C), GCM (NIST SP800-38D), and other examples exist as well.

Symmetric encryption algorithm 405a can accept input of (i) plaintext 403b, (ii) symmetric encryption key k1 314a, (iii) parameters 199f, and (iv) optionally an initialization vector (not shown in FIG. 4a), and output ciphertext 315a. Although not depicted in FIG. 4a, and encryption 405a step can output a message authentication code (MAC), where the MAC can be calculated with a MAC key from a key derivation function 402a. In exemplary embodiments the use of a MAC and MAC key, as well as an initialization vector can be optionally omitted. The exemplary listed values for plaintext and ciphertext in step 315 were described in connection with depicted step 315 in FIG. 3a.

Key exchange 319 step can be conducted by responder 101x in order to mutually derive the same value or number for the symmetric ciphering key k1 314a that was derived in a step 314 above. Key exchange 319 step can comprise inputting or using the initiator ephemeral Public key Pi 102a (from message 122) and the responder bootstrap private key br 101b into key exchange algorithm 401a, which can comprise the same or equivalent key exchange algorithm 401a depicted and described in connection with key exchange step 314 described above. Other elements or algorithms within a key exchange step 319 can be equivalent to a key exchange step 314 above, including the use of shared parameters 199a. In this manner, initiator 102' or DPP server 103 (depending on a mode 306a) and responder 101x can securely derive the same symmetric encryption key k1 314a as depicted in FIG. 4a.

A decryption 320 step allows responder 101x to convert the ciphertext 315a received in a message 122 from FIG. 3a into plaintext 403a. Decryption 320 step can utilize a symmetric decryption algorithm 405b, which could comprise the same algorithm used in symmetric encryption algorithm 405a except the algorithm being used for decryption instead of encryption. For example, if symmetric encryption algorithm 405a in FIG. 4a comprises an AES-SIV encryption, then symmetric decryption algorithm 405b can comprise an AES-SIV decryption. Note that the same values are input into symmetric decryption algorithm 405b as symmetric encryption algorithm 405a, such as symmetric encryption key k1 314a and parameters 199f in order to convert ciphertext 315a back into plaintext 403a. Responder 101x can the read and process plaintext 403a after a decryption 320 step.

For embodiments where a MAC code is received with ciphertext 315a, responder 101x can also verify the MAC code using a MAC key from a key derivation function 402a in a step 319 in order to verify the integrity of ciphertext 315a. Note that AES-SIV and similar symmetric ciphering algorithms can have a message integrity check built into the algorithm, and thus a separate MAC code and MAC key can be optionally omitted in some exemplary embodiments. In exemplary embodiments, the successful decryption of a ciphertext into a plaintext using decryption algorithms 405b supports mutual authentication between the two nodes, since successful decryption can only take place when the two nodes record the depicted private keys used for the depicted key exchanges 314 and 319.

FIG. 4b

FIG. 4b is a flow chart illustrating exemplary steps for conducting a key exchange using PKI keys in order to derive a shared secret key, and for using the derived shared secret key to encrypt and decrypt data, in accordance with exemplary embodiments. Exemplary steps for (i) an initiator 102' or a DPP server 103 (depending on the mode 306a) and (ii) a responder 102x to mutually derive keys can comprise (a) a key exchange 319a step for DPP server 103 or initiator 102' (depending on the mode 306a) to derive a symmetric encryption key k2 314c and (b) a key exchange 314b step for a responder 101x to derive the same symmetric encryption key k2 314c. Exemplary steps for a responder 101x to encrypt data and initiator 102' to decrypt data can comprise (i) an encryption 315b step for responder 101x to utilize the symmetric encryption key k2 314c to convert plaintext to ciphertext, and (ii) a decryption 320b step for either initiator 102' or DPP server 103 (depending on the mode 306a) to utilize the symmetric encryption key k2 314c to convert the ciphertext received from responder 101x into plaintext. The use of the steps for a key exchange 314a, a key exchange 319a, encryption 315b, and decryption 320b were also depicted and described in connection with FIG. 3a above.

Note that steps in FIG. 4b and the steps in FIG. 4a can share some algorithms and values, and the descriptions for the algorithms and values in FIG. 4a can be applicable for FIG. 4b. For example, a same key exchange algorithm 401a depicted and described in FIG. 4a can also be used in FIG. 4b. The key exchange algorithm 401a can comprise an ECDH key exchange. The set of parameters 199a depicted and described in FIG. 4a can also be used in FIG. 4b. Further, a symmetric encryption algorithm 405a and a symmetric decryption algorithm 405b can be the same in FIG. 4a and FIG. 4b. A set of parameters 199f for a symmetric encryption algorithm 405a and a symmetric decryption algorithm 405b can be the same in FIG. 4a and FIG. 4b A responder 101x can conduct a key exchange step 314b. In a key exchange step 314b, the initiator ephemeral public key Pi 102a received in message 122 from FIG. 3a can be input into an ECDH key exchange algorithm 401a along with the responder ephemeral private key pr 101f derived in a step 318 in FIG. 3a in order to output a secret shared key N 411. The value for shared secret key N 411 can be recorded and also used in the derivation of a key ke 327a in a key exchange step 321 below in FIG. 4c. For a step 314b, the value for the shared secret key N 411 can be input into a key derivation function 402b in order to derive a mutually shared symmetric key k2 314c. In exemplary embodiments which support DPP specification version 1.0, a key derivation function 402b can comprise the key derivation function for key k2 in point 2 of section 6.2.3 of DPP specification version 1.0.

Either an initiator 102' or a DPP server 103 can conduct a key exchange step 319a, depending on a mode 306a from a server database 103a. At step 319a, a received, validated responder ephemeral public key Pr 101e and a derived initiator ephemeral private key pi 102b can be input into an ECDH key exchange algorithm 401a in order to calculate a shared secret key N 411. Shared secret key N 411 can also be used by initiator 102' or DPP server 103 (depending on a mode 306a) in a step 327 below. DPP server 103 can input shared secret key N 411 into a key derivation function 402b in order to mutually derived the symmetric encryption key k2 314c. In exemplary embodiments which support DPP specification version 1.0, a key derivation function 402b can comprise the key derivation function for key k2 in section 6.2.4 of DPP specification version 1.0.

Responder 101x can conduct an encryption step 315b, where the use for an encryption step 315b are depicted and described in connection with FIG. 3a above. Ciphertext 322a can comprise a ciphertext from an encryption step 322 below in FIG. 4c. In other words, a responder 101x can conduct the encryption step 322 below and also key exchange step 321 below in FIG. 4c before conducting the encryption step 315b. As depicted in FIG. 4b, the ciphertext 322a can also be encrypted again for an encryption step 315b. The symmetric ciphering key for encryption step 315b can comprise symmetric key k2 314c from a key exchange step 314b in the paragraph above. The output from an encryption step 315b can be ciphertext 315c, as depicted in FIG. 4b.

A decryption 320b step can be performed by either an initiator 102' or a DPP server 103, depending on a mode 306a recorded in a server database 103a as depicted in FIG. 3b. A decryption 320b step converts the ciphertext 315c received in a message 123 from FIG. 3a into plaintext 403b. Decryption 320b step can utilize a symmetric decryption algorithm 405b, which could comprise the same algorithm used in symmetric encryption algorithm 405a except the algorithm being used for decryption instead of encryption. Note that the same values are input into symmetric decryption algorithm 405b as symmetric encryption algorithm 405a, such as symmetric encryption key k2 314c and parameters 199f in order to convert ciphertext 315c back into plaintext 403b. Initiator 102' or a DPP server 103 (depending on a mode 306a) can the read and process plaintext 403b after a decryption 320b step. In exemplary embodiments, the successful decryption of a ciphertext into a plaintext, including decryption of ciphertext 322a into plaintext 403c below in FIG. 4c, using decryption algorithms 405b supports mutual authentication between the two nodes, since successful decryption can only take place when the two nodes record the depicted private keys used for the depicted key exchange.

FIG. 4c

FIG. 4c is a flow chart illustrating exemplary steps for conducting a key exchange using PKI keys in order to derive a shared secret key, and for using the derived shared secret key to encrypt and decrypt data, in accordance with exemplary embodiments. Exemplary steps for (i) an initiator 102' or a DPP server 103 (depending on the mode 306a) and (ii) a responder 102x to mutually derive keys can comprise (a)

a key exchange 327 step for DPP server 103 or initiator 102' (depending on the mode 306a) to derive a symmetric encryption key ke 327a and (b) a key exchange 321 step for a responder 101x to derive the same symmetric encryption key ke 327a. Note that in some exemplary embodiments, such a mode 306a depicted and described in connection with FIG. 5a and FIG. 5b below, (i) a key exchange algorithm 401c can be processed by a DPP server 103 a key derivation function 402c can be processed by an initiator 102'. In other words, for some embodiments the key exchange 327 step can be shared or distributed between a DPP server 103 and an initiator 102'.

Exemplary steps in FIG. 4c for a responder 101x to encrypt data and initiator 102' to decrypt data can comprise (i) an encryption 322 step for responder 101x to utilize the symmetric encryption key ke 327a to convert plaintext to ciphertext, and (ii) a decryption 328 step for either initiator 102' or DPP server 103 (depending on the mode 306a) to utilize the symmetric encryption key ke 327a to convert the ciphertext received from responder 101x into plaintext. The use of the steps for a key exchange 321, a key exchange 327, encryption 322, and decryption 328 were also depicted and described in connection with FIG. 3a above.

Note that steps in FIG. 4c and the steps in FIG. 4a can share some algorithms and values, and the descriptions for the algorithms and values in FIG. 4a can be applicable for FIG. 4c. For example, the key exchange algorithm 401c can comprise an ECDH key exchange. The set of parameters 199a depicted and described in FIG. 4a can also be used in FIG. 4c. Further, a symmetric encryption algorithm 405a and a symmetric decryption algorithm 405b can be the same in FIG. 4a and FIG. 4c. A set of parameters 199f for a symmetric encryption algorithm 405a and a symmetric decryption algorithm 405b can be the same in FIG. 4a and FIG. 4c.

A responder 101x can conduct a key exchange step 321. In a key exchange step 321, (i) the initiator bootstrap public key Bi 104a received in message 126 from FIG. 1c can be input into an ECDH key exchange algorithm 401c along with (ii) both the responder ephemeral private key pr 101f and the responder bootstrap private key br 101b. An ECDH key exchange algorithm 401c can use (pr 101f+br 101b) modulo q, as specified in DPP specification version 1.0 in point 2 of section 6.2.3, so algorithm 401c for responder 101x can be slightly different than algorithm 401a for responder 101x above in FIG. 4a and FIG. 4b. The output of key exchange algorithm 401c can be a shared secret key L 412. Note that embodiments of the present invention which comprise a responder authentication 141 from FIG. 1b can omit the calculation of key L 412 and use of initiator bootstrap public ke Bi 104a. For these embodiments, subsequent calculations using the key L 412 can omit the key L 412, which is also contemplated and described in DPP specification version 1.0.

The responder 101x can then conduct a key derivation function 402c in order to calculate a shared secret key ke 327a. Note that for a key derivation function 402c, the input include all of key M 410 from a step 314, key N from a step 314b, and the derived key L 412 from step 321. As contemplated herein, a key derivation function 402a, 402b, and 402c can also use other data mutually shared between (i) responder 101x and (ii) initiator 102' or DPP server 103 (depending on a mode 306a). In exemplary embodiments which support DPP specification version 1.0, a key derivation function 402c can comprise the key derivation function for key ke 327a in point 2 of section 6.2.3 of DPP specification version 1.0.

Either an initiator 102' or a DPP server 103 can conduct a key exchange step 327, depending on a mode 306a from a server database 103a and transmitted to DPP server 103 in a message 311 as depicted in FIG. 3a. At step 327, (i) a combination of a recorded responder bootstrap public key Br 101a and received responder ephemeral public key Pr 101e, and (ii) the recorded initiator bootstrap private key bi 104b can be input into an ECDH key exchange algorithm 401c in order to calculate a shared secret key L 412. Note that the combination of public keys 101a and 101e in step 327 can comprise an ECC point addition operation. Also note that embodiments of the present invention which comprise a responder authentication 141 from FIG. 1b can omit the calculation of key L 412 and use of initiator bootstrap private key bi 104b. For these embodiments, subsequent calculations using the key L 412 can omit the key L 412, which is also contemplated and described in DPP specification version 1.0. Shared secret key L 412 can be input into a key derivation function 402c, along with shared secret key M 410 from a step 319 and shared secret key N 411 from a step 319a in order to mutually derive the symmetric encryption key ke 327a. In exemplary embodiments which support DPP specification version 1.0, a key derivation function 402c can comprise the key derivation function for key ke 327e in section 6.2.4 of DPP specification version 1.0.

Responder 101x can conduct an encryption step 322, where the use for an encryption step 322 are depicted and described in connection with FIG. 3a above and also FIG. 4b above. Plaintext 403c in a step 322 can comprise the responder authentication value 404, where value R-auth 404 can comprise a secure hash value with input including the initiator nonce 317a, the second random number R-nonce from a step 318 above in FIG. 3a, and public PKI keys. The value for R-auth 404 in a step 322 (also described with step 322 in FIG. 3a) can comprise the value in point 3 of section 6.2.3 of DPP specification version 1.0. The symmetric ciphering key for encryption step 322 can comprise symmetric key ke 327a from a key exchange step 321. The output from an encryption step 322 can be ciphertext 322a, as depicted in FIG. 4c. Note that ciphertext 322a in a step 322 is also encrypted again in a step 315b above in FIG. 4b. In other words, a responder 101x can conduct the encryption step 322 herein for FIG. 4c (along with the key exchange 321 herein in FIG. 4b) before conducting the encryption step 315b in FIG. 4b above.

A decryption step 328 can be performed by either an initiator 102' or a DPP server 103, depending on a mode 306a recorded in a server database 103a as depicted in FIG. 3b. A decryption 328 step converts the ciphertext 322a received in a message 123 (after decrypting a first layer of encryption of ciphertext 315b in a step 320b) from FIG. 3a into plaintext 403c. Decryption 328 step can utilize a symmetric decryption algorithm 405b, which could comprise the same algorithm used in symmetric encryption algorithm 405a except the algorithm being used for decryption instead of encryption. Note that the same values are input into symmetric decryption algorithm 405b as symmetric encryption algorithm 405a in FIG. 4c, such as symmetric encryption key ke 327a and parameters 199f in order to convert ciphertext 322a back into plaintext 403c. Initiator 102' or a DPP server 103 (depending on a mode 306a) can the read and process plaintext 403c after a decryption 328 step (and the prior step 302b to remove a first layer of encryption in ciphertext 315b). In exemplary embodiments, the successful decryption of a ciphertext into a plaintext using decryption algorithms 405b supports mutual authentication between the two nodes, since successful decryption of ciphertext 322a can only take place when the two nodes record the depicted private keys used for the depicted key exchange As depicted and described in connection with FIG. 3a, a responder 101x can also conduct both an encryption step 322 and a decryption step 328. The steps for responder 101x to conduct a decryption step 328 can comprise step 328b and step 328d as depicted and described in FIG. 3a. When responder 101x conducts decryption step 328 using symmetric encryption key ke 327a, the ciphertext and plaintext will comprise different values than those depicted in FIG. 4c. For example, in FIG. 3a a responder 101x can use a decryption step 328b (e.g. step 328 but with different ciphertext than that depicted in FIG. 4c) in order to decrypt the encrypted initiator authentication value 404a into a plaintext authentication value 404a. Also, in FIG. 3a a responder 101x can use a decryption step 328d (e.g. step 328 but with different ciphertext 322f than that depicted in FIG. 4c) in order to decrypt the encrypted network credentials 109.

Note that in some exemplary embodiments, the "plaintext" network credentials 109' (for the purposes of a step 328d in FIG. 5a) can comprise network credentials 109' that can also be encrypted with an asymmetric ciphering algorithm such as Elgamal using a step 336 in FIG. 5a below. In other words, network credentials 109' can comprise credentials that are "double encrypted" with both (i) a symmetric key 327a (which can be decrypted by responder 101x using a decryption step 328d, where decryption step 328d uses the depicted decryption 328 in FIG. 4c), and (ii) an asymmetric ciphering algorithm such as Elgamal from a step 336, (which could be decrypted by responder 101x using a step 337 from FIG. 5a below and either (i) responder ephemeral private key pr 101f or (ii) responder bootstrap private key br 101b).

As depicted and described in connection with FIG. 3a, a DPP server 103 or initiator 102' (in FIG. 5a) can conduct both an encryption step 322 and a decryption step 328. The steps for a DPP server 103 or initiator 102' (depending on a mode 306a) to conduct an encryption step 322 can comprise step 322b and step 322e as depicted and described in FIG. 3a. When DPP server 103 or initiator 102' conducts encryption step 322b or 322e using symmetric encryption key ke 327a, the ciphertext and plaintext will comprise different values than those depicted in FIG. 4c. For example, in FIG. 3a a DPP server 103 can use an encryption step 322b (e.g. step 322 but with different plaintext than that depicted in FIG. 4c) in order to encrypt the initiator authentication value 404a. In FIG. 5a, an initiator 102' can use an encryption step 322b (e.g. step 322 but with different plaintext than that depicted in FIG. 4c) in order to encrypt the initiator authentication value 404a. In FIG. 3a a DPP server 103 can use an encryption step 322e (e.g. step 322 but with different plaintext than that depicted in FIG. 4c) in order to encrypt the network credentials 109. In FIG. 5a, an initiator 102' can use an encryption step 322e (e.g. step 322 but with different plaintext than that depicted in FIG. 4c) in order to encrypt the network credentials 109'.

FIG. 5a

FIG. 5a is a simplified message flow diagram illustrating an exemplary system with exemplary data sent and received by a device database, a DPP server, an initiator proxy, and a responder, in accordance with exemplary embodiments. Before starting steps and message flows depicted in FIG. 5a, the initiator, DPP server, and device database depicted for system 500 in FIG. 5a may previously complete exemplary message flows and steps depicted for a step 301 in FIG. 3a above. System 500 can include a device database 104, DPP server 103, initiator proxy 102', and responder 101x operating in device 101. Initiator proxy 102' can communicate with DPP server 103 via IP network 113 using an access network 112, also as depicted in FIG. 3a above. As contemplated herein, an "initiator proxy 102'" depicted in FIG. 5a may also be referred to as initiator 102', and an initiator 102' and initiator proxy 102' may be equivalent. A difference between system 500 in FIG. 5a and system 300 in FIG. 3a can be that (i) responder bootstrap public key Br 101a, (ii) initiator bootstrap public key Bi 104a, (iii) initiator ephemeral public key Pi 102a, and (iv) initiator ephemeral private key pi 102b are recorded and operated within an initiator 102'. In exemplary embodiments depicted in FIG. 5a the initiator bootstrap private key bi 104b can remain recorded in a DPP server 103 and not exposed to initiator 102' The exemplary embodiment depicted in FIG. 5a can comprise a second mode 306a of operation for initiator 102' and DPP server 103, as depicted in FIG. 3b above.

At step 502, DPP server 103 can select a mode 306a for both initiator 102' and DPP server 103. Note that the mode 306a selected is not normally observable to a responder 101x, since the full and complete set of DPP 191 messages between responder 101x and initiator 102' can be transmitted and received. In other words, (a) the different distribution of PKI and shared secret keys in a server database 103a and initiator 102' for a first mode 306a in FIG. 3a and a second mode 306a in FIG. 5a (b) would not normally be observable to a responder 101x. The recording of PKI and shared secret keys in a server database is depicted in a server database 103a in FIG. 3b, where the value "-" can mean that the key is recorded and/or operated by initiator 102'. Step 502 can also comprise DPP server 103 selecting an initiator bootstrap public key Bi 104a and a responder bootstrap public key Br 101a for device 101 using ID-token.device 206.

In exemplary embodiments, a responder 101x for a device 101 could record a plurality of responder bootstrap public keys Br 101a, as depicted in FIG. 2a above. Reasons could include the use of different keys Br 101a for different purposes, such as a first key Br 101a for a responder authentication 141 and a second key Br 101a for a mutual authentication 142. Or, a third key Br 101a could be recorded or mapped in a tag 101c, while a fourth key Br 101a in a responder 101x could only be recorded in a network 107. Responder 101x can designate the use of the fourth key Br 101a with a higher level of trust, with the following exemplary results (A) and (B). For (A), device 101 could provide additional privileges for a configuration step 106 for an initiator 102' or initiator 102* that uses the second key Br 101a (e.g. the first key Br 101a could be easier for potentially any initiator 102' to obtain if the first key Br 101a is recorded in a QR code that can be scanned from outside device 101). As one example of additional privileges, a set of credentials 109 or configuration object delivered to device 101 using the fourth key Br 101a could allow the installation of a new certificate authority root certificate for device 101. As one example of normal or other privileges, a set of credentials 109 delivered to device 101 using the third key Br 101a could deny the installation of a new certificate authority root certificate for device 101 as well.

In summary for a step 502, (i) a device 101 with responder 101x can use a plurality of responder bootstrap public keys Br 101a (including for reasons other than simply use of different sets of cryptographic parameters 199a for the different keys), and (ii) a DPP server 103 can select the responder bootstrap public key Br 101a in a step 502. DPP server 103 can select the responder bootstrap public key Br 101a based on the device identity 206 received in a message 305 in a step 301 from FIG. 3a. Also, although a step 502 is depicted in FIG. 5a, a step 502 could be used in other Figures and embodiments herein, include embodiments depicted in FIG. 3a and FIG. 5b. In addition for a step 502, DPP server 103 can use an initiator bootstrap keys sequence number 197 in order to select the appropriate initiator bootstrap public key Bi 104a. For example, if an pair of initiator bootstrap keys had be deprecated (such as depicted in FIG. 6a below), then an updated pair of initiator bootstrap keys should be selected using a device table 104d and sequence number 197 (also selected with device ID 206).

Other possibilities exist as well for a network 107 to have access to a responder boostrap public key Br 101a without departing from the scope of the invention. In some embodiments in order for a DPP server 103 to record a responder bootstrap public key Br 101a, an initiator 102' could conduct a PKEX key exchange in band via WiFi link 192 using PKEX key 198, where initiator 102' receives the key 198 in a message 311 in a step 301 in FIG. 3a. Initiator 102' could (i) conduct the PKEX using key 198 with responder 101x during a step 303b, and then send the received responder bootstrap public key Br 101a to DPP server 103. Other embodiments depicted in FIG. 3a and FIG. 5a also could optionally use a PKEX with key 198 in order to receive the key Br 101a "in band" via WiFi link 192, such as if device database 104 does not record key Br 101a before a step 301 in FIG. 3a.

DPP server 103 can then send initiator 102' a message 503, where message 503 can include an identity 206 for device 101 (since initiator 102' may communicate with a plurality of responders 101x over time), the selected responder bootstrap public key Br 101a from a step 502, the selected initiator bootstrap public key Bi 104a, and optionally a value for the MAC address of the responder 101x comprising MAC.R 101d. Message 503 can be sent via the secure session 302b setup during a step 301 depicted in FIG. 3a above.

Initiator 102' can receive message 503 and process the data received in a step 504. A step 504 can include validating the received public keys from a message 503 using public key validation steps from FIPS publication SP 800-56A (revision 2) and subsequent and related versions. Initiator 102' can use a step 504 in order to verify the public PKI keys received in a message 503 are consistent or comply with a selected set of cryptographic parameters 199a. At step 505 the initiator 102' can determine the initiator capabilities for conducting a DPP 191 with device 101 and responder 101x. In the exemplary embodiment depicted in FIG. 5a, initiator 102' can select and use the capabilities of the role as a configurator. In other embodiments, an initiator 102' could select and use the capabilities of the role an enrollee for a step 504. In addition, an initiator 102' can generate a random number for an initiator nonce I-nonce 317a in a step 504.

Initiator 102' can then conduct a step 313 to derive the initiator ephemeral public key Pi 102a and the initiator ephemeral private key pi 102b. A step 313 was previously depicted and described above in FIG. 3a. Although DPP server 103 conducted the step 313 in FIG. 3a, an initiator 102' can also conduct the step 313 in system 500 in order to derive the initiator ephemeral PKI key pairs. Further, subsequent steps depicted in FIG. 5a that were previously depicted as conducted by a DPP server 103 can be conducted by an initiator 102' using the embodiment depicted in FIG. 5a. For example, depicted subsequent steps such as steps 314, 315, 319a, 320b, 322b, 328, etc. can be conducted, performed, or processed by initiator 102' using a DPP application 102g in an exemplary system 500, which could also represent a different, second mode 306a than system 300 in FIG. 3a, which could comprise a first mode 306a.

Initiator 102' in step 314 can use (i) the derived initiator ephemeral private key pi 102b from step 313, and (ii) the received responder bootstrap public key Br 101a from a message 503 to conduct the first initiator key exchange step 314, which is also depicted in FIG. 4a above. The output or results from a step 314 can comprise a mutually derived shared secret key k1 with responder 101x. An intermediate step within the key exchange step 314 can include calculating the value M 410 (which could also be a secret shared key). Initiator 102' in step 315 can then conduct the encryption step 315 depicted in FIG. 4a, and also described in FIG. 3a. The plaintext input into a symmetric encryption algorithm 405a can comprise the initiator nonce 317a and initiator capabilities from a step 504 above. The shared secret key k1 314a can be used with symmetric ciphering algorithm 405a in a step 315 from FIG. 4a. The ciphertext output from an encryption step 315 can comprise ciphertext 315a.

At step 316, initiator 102' can calculate secure hash values for initiator bootstrap public key Bi 104a and responder bootstrap public key Br 101a. For embodiments that conduct a responder authentication 141 as depicted and described in connection with FIG. 1b, then the calculation of a secure hash value for initiator bootstrap public key Bi 104a can be omitted and a null value for H(Bi) can be transmitted in a subsequent DPP authentication request message 122. The selected hash 199e could be received by initiator 102' in a set of selected parameters 199a from a message 311 in a step 301. In exemplary embodiments, initiator 102' records the full set of cryptographic parameters 199, and a message to select a set of cryptographic parameters 199a could then specify a hash 199e to use with the public keys. For example, a selected set of cryptographic parameters 199a from message 311 in a step 301 could be the value "A", which would then be used by initiator 102' to determine that hash 199e in a set of cryptographic parameters 199 would be "SHA-256", as depicted in FIG. 2b. Or, a message 311 in a step 301 could specify the full set of selected cryptographic parameters 199, such as listing out the individual values of key length 199b, curve name 199c, hash 199e, etc. The hash values calculated by initiator 102' in a step 316 in FIG. 5a are depicted in FIG. 5a as "H(Bi)" and "H(Br)", respectively.

Initiator 102' can then conduct a step 316a to send responder 101x a message 122, where message 122 can include the hash values for (i) the initiator bootstrap public key Bi 104a and (ii) the responder bootstrap public key Br 101a, (iii) the derived initiator ephemeral public key Pi 102a for a step 313 by initiator 102', and ciphertext 315a, where ciphertext 315a is encrypted with key k1 and includes an initiator nonce 317a and the initiator capabilities. Sending DPP authentication request message 122 was also depicted and described in connection with FIG. 1b, FIG. 1c, and FIG. 3a above.

In FIG. 5a, responder 101x can receive message 122 and conduct the series of steps 325. The series of steps 325 for responder 101x were depicted and described in connection with FIG. 3a above, and steps 325 can comprise the steps 318, 319, 320, 314b, 321, 322, and 315b. Responder 101x can process the message 122 using steps 325 and generate a DPP authentication response 123. The steps 325 for a responder 101x to process the received message 122 and generate the response message 123 can comprise section 6.2.2 of DPP specification version 1.0. Other possibilities exist as well without departing from the scope of the present invention. In general, responder 101x can use the recorded bootstrap private keys and the derived ephemeral private keys in order to conduct ECDH key exchanges. Responder 101x can also (i) derive a responder nonce 318b, (ii) decrypt ciphertext in message 122 and (iii) encrypt ciphertext in message 123 using derived secret shared keys from the ECDH key exchanges. Responder 101x can send initiator 102' the DPP authentication response 123 after conducting the steps 325.

Initiator 102' can receive the DPP authentication response 123 and process the message. Using broadcast messages over connection 192, initiator 102' can identify the message from responder 101x based on the hash values for the bootstrap public keys in response 123. For embodiments where message 122 and response 123 are sent as unicast messages, initiator 102' can identify the message from responder 101x based on the MAC.R 101d in the response 123. Initiator 102' can then extract and record responder ephemeral public key Pr 101e (depicted for a response 123 in FIG. 3a). Initiator 102' can also a key verification step on the received key Pr 101e according to FIPS publication SP 800-56A (revision 2).

Initiator 102' can then send DPP server 103 a message 506 using secure connection 302b via access network 112, where message 506 can include (i) an identity for device 101 such as ID-token.device 206 (or ID.device 101i), and (ii) the responder ephemeral public key Pr 101e. In an exemplary embodiment a message 506 can include the MAC address MAC.R 101d to also identify device 101 and the associated key Pr 101e. DPP server 103 can receive the message 506 and record the responder ephemeral public key Pr 101e along with the device identity in a server database 103a, as depicted in FIG. 3b above.

DPP server 103 can then conduct an ECDH key exchange step 401c as depicted in FIG. 4c in order to determine a secret shared key L 412. As depicted in FIG. 5a and also FIG. 4c, a step 401c can comprise DPP server 103 inputting (i) the recorded initiator bootstrap private key bi 104b and (ii) a combination of the received responder ephemeral public key Pr 101e and the recorded responder bootstrap public key Br 101a into key exchange algorithm 401c in order to (iii) calculate the secret shared key L 412. An ECDH key exchange step 401c can combine responder public keys 101e and 101a using an ECC point addition operation. Secret shared key L 412 can also comprise a secret shared key L according to section 6.2.4 of DPP specification version 1.0.

As depicted in FIG. 5a, an initiator 102' can then conduct a second key exchange step 319a, where the second key exchange step 319a was depicted and described above in FIG. 4b and also FIG. 3a. Although a DPP server 103 was depicted as conducting a key exchange step 319a in FIG. 3a, for the embodiments depicted in FIG. 5a, an initiator 102' can conduct the key exchange step 319a. At step 319a, initiator 102' can input the received, validated responder ephemeral public key Pr 101e and the derived initiator ephemeral private key pi 102b into an ECDH key exchange algorithm 401b in order to calculate a shared secret key N 411. Shared secret key N 411 can also be used by initiator 102' in a key derivation function 402c step below in FIG. 5a. For a key exchange step 319a in FIG. 5a, initiator 102' can input shared secret key N 411 into a key derivation function 402b in order to mutually derived the symmetric encryption key k2 314c. Note that secret shared key N 411 can also be used by initiator 102' for later use in a key derivation function step 402c, as depicted in FIG. 5a.

As depicted in FIG. 5a, initiator 102' can then conduct a decryption step 320b on received ciphertext 315c using the derived symmetric encryption key k2 314c from a step 319a above by initiator 102' in FIG. 5a. The use and operation of a decryption step 320b was also depicted and described above in connection with FIG. 4b and FIG. 3a. Initiator 102' can read the plaintext 403b values from decryption step 320b. The plaintext values 403b can include the initiator nonce 317a from a message 122 above. The plaintext values 403b can also include a second ciphertext 322a (e.g. ciphertext 322a can be inside ciphertext 315c). Initiator 102' verifies that the initiator nonce 317a received in message 123 and decrypted in step 320b is equal to the initiator nonce 317a value sent in message 122 above. If the two initiator nonce 317a values are not equal, then initiator 102' can abort the DPP procedure and subsequent steps.

Initiator 102' can then receive a message 510 from DPP server 103, where message 510 can include an identity for device 101 such as ID-token.device 206 and the value L 412, where the value or secret shared key L 412 was calculated by DPP server 103 in a step 401c as depicted in FIG. 5a. The value L 412 can be calculated by DPP server 103 using the initiator bootstrap private key bi 104b, and thus initiator 102' does not need to record or receive the initiator bootstrap private key bi 104b for embodiments depicted in FIG. 5a.

Initiator 102' can then conduct a key derivation function step 402c using (i) the received value L 412 from message 510, (ii) the calculated shared secret key M 410 from a step 314, and (iii) the calculated shared secret key N 411 from a step 319a. A key derivation function step 402c is depicted and described in connection with FIG. 4c above. The output from a key derivation function step 402c conducted by initiator 102' can be a shared secret key ke 327a, as depicted in FIG. 4c.

At step 328, initiator 102' can conduct a decryption step 328 on the ciphertext 322a using the key ke 327a from the previous step 402c. A decryption step 328 is depicted and described in connection with FIG. 4c above. Initiator 102' can use the decryption step 328 in order to read the plaintext value of R-auth 404 from the responder 101x in message 123. R-auth can comprise the value R-auth 404 from FIG. 3a and FIG. 4c and also comprise a hash 199e value that includes the combination of at least the initiator nonce 317a and the responder nonce 318b. At step 328, initiator 102' can then also internally calculate the same value for R-auth 404, and if the internally calculated value for R-auth 404 and the received, decrypted value for R-auth 404 are equal, then the responder 101x can be considered authenticated. The calculation of R-auth 404 by initiator 102' in a step 328 can be according to section 6.2.3 of DPP specification version 1.0.

Initiator 102' can then conduct a step 322b, where step 322b can comprise calculating an initiator authentication value I-auth 404a and encrypting the value I-auth 404a. Initiator authentication value 404a can be similar to responder authentication value R-auth 404, except the values of initiator nonce 317a can be sequenced before a responder nonce 318b inside a hash 199e calculation over the two nonces. Initiator 102' can then encrypt the initiator authentication value 404a using an encryption step 322 using key ke 327a, as depicted in FIG. 4c above. In other words, an encryption step 322 in FIG. 4c depicts the encryption of R-auth 404, and encryption step 322b can comprise initiator 102' encrypting the initiator authentication value I-auth 404a using the key ke 327a derived in a step 402c.

Initiator 102' can previously record the hash 199e values for the initiator and responder bootstrap public keys. Initiator 102 can take the recorded hash 199e values for the initiator and responder bootstrap public keys and append to them the encrypted value for I-auth 404a calculated by initiator 102 in step 322b. Initiator 102' can send responder 101x a DPP authentication confirm message 123a, as depicted in FIG. 5a. The data and steps to determine and calculate a DPP authentication confirm message 123a can be according to section 6.2.4 of DPP specification version 1.0. As depicted in FIG. 5a, the collection of steps and messages after a message 506 through transmitting a message 123a can collectively comprise a step 512.

Note that although the DPP authentication confirm message 123a can be equivalent to the DPP authentication confirm message from section 6.2.4 of DPP specification version 1.0, an important difference can be the operation of initiator 102' in FIG. 5a versus an initiator as contemplated by DPP specification version 1.0. In the present invention as depicted in FIG. 5a, initiator 102' does not need to record the initiator bootstrap private key bi 104b. So, using the technology depicted in FIG. 5a, an initiator 102' can (i) send and receive messages that are fully compatible with a DPP protocol 191, but (ii) DPP server 103 can record key bi 104b. In other words, a responder 101x may not "know" that an initiator operates as either (i) an initiator 102\* from FIG. 1b or FIG. 1c, or an initiator 102' from FIG. 5a since the messages transmitted and received by the responder 101x can be fully compatible with a DPP 191.

The technology depicted in FIG. 5a can enhance security since an initiator bootstrap private key bi 104b does not need to be shared with an initiator 102'. The initiator 102' can also not feasibly be able to determine the initiator bootstrap private key bi 104b using value L 412. By only recording the initiator bootstrap private key bi 104b in DPP server 103 (or also a device database 104), then a common, shared initiator bootstrap public key Bi 104a can be more securely shared across multiple devices 101, as contemplated by key table 104k in FIG. 2b (with the depiction of "shared keys"). In other words, a manufacturer of device 101 could record a common initiator bootstrap public key Bi 104a across a plurality of devices 101, since a network 107 could share the initiator bootstrap public key Bi 104a with a device manufacturer of devices 101 (or a device distributor) before the devices are deployed near network access points 105. In other embodiments besides those depicted in FIG. 5a, the initiator bootstrap private key bi 104b can be shared with initiator 102', such as with a fourth mode 306a described with a step 306 in FIG. 3a and also depicted and described in connection with FIG. 3b.

In FIG. 5a, responder 101x can receive message 123a and conduct the series of steps 339. The series of steps 339 for responder 101x were depicted and described in connection with FIG. 3a above, and steps 339 can comprise the steps 328b, 331, 332, and 322c. Responder 101x can process the message 123a using steps 339 and generate a DPP configuration request 123b. In summary, responder 101x can decrypt the ciphertext in message 123a, where the ciphertext can include the initiator authentication value 404a. Responder 101x can also internally calculate a value for the initiator authentication value 404a and the received value 404a, and if the two values are equal then responder 101x can consider the initiator 102' to be authorized. The responder 101x can take the roll of an enrollee and process a configuration attribute 330. The responder 101x can generate a random number comprising an enrollee nonce E-nonce 332a. Responder 101x can then conduct an encryption step 322c, where encryption step 322c can comprise (i) an encryption step 322 using key ke 327a, and (ii) the plaintext to be encrypted can be the E-nonce 332a and the configuration attribute 330. The output of an encryption step 322c can be a ciphertext 322d. Responder 101x can then send initiator 102' a DPP Configuration Request message 123b, where the configuration request 123b can include the ciphertext 322d, where the plaintext in ciphertext 322d can include E-nonce 332a and the configuration object 330. DPP Configuration Request message 123b can be processed by responder 101x according to section 6.3.3 of DPP specification version 1.0.

Initiator 102' can receive DPP Configuration Request message 123b via connection 192 and using DPP application 102g. As contemplated herein, a DPP application 102g can perform the steps for initiator 102' depicted in FIG. 5a, such as transmitting/receiving DPP 191 messages using a first MAC.I 102n for connection 192 and transmitting/receiving messages with DPP server 103 using MAC.N 102q via access network 112. A DPP application 102g in initiator 102' can also perform the depicted steps for an initiator 102' in FIG. 5a such as, but not limited to, 504, 505, 313, 314, etc. Initiator 102' can receive message 123b and process the message. Initiator 102' can conduct a decryption step 328c using decryption step 328 depicted in FIG. 4c above. A difference between decryption step 328 and decryption step 328c is that decryption step 328c uses the ciphertext 332d as input into the symmetric decryption algorithm 405b. Initiator 102' can use the previously calculated key ke 327a from a step 402c in FIG. 5a in order to read the plaintext within ciphertext 332d. Initiator 102' can record the plaintext E-nonce 332a and configuration attribute 330.

Initiator 102 can send DPP server 103 a message 513 via secure connection 302b from a step 301, where message 513 can include and identity for device 101 such as ID-token.device 206 and the plaintext value for the configuration attribute 330. Message 513 can be sent via secure session 302b, so the "plaintext" would be encrypted when transmitted over secure session 302b. In step 335, DPP server 103 can process the received configuration attribute 330 received in message 513. For the exemplary embodiment depicted in FIG. 1a and FIG. 5a, configuration attribute 330 can specify that device 101 with responder 101x may have a role of WiFi client. In exemplary embodiments, DPP server 103 can previously select a primary access network 308aa in a step 308a within a step 301 depicted in FIG. 3a above, using the received networks available list 304c from initiator 102'. Also, in a step 308b in a step 301 in FIG. 3a above, DPP server 103 could receive or record the set of network credentials 109 associated with the selected primary access network 308aa for device 101 using device identity ID-token.device 206 (or ID.device 101i).

In step 335, DPP server 103 can process the set of network credentials 109 for primary access network 308aa into a configuration object. The configuration object with network credentials 109 can comprise a connector or configuration object as specified in section 6.3.5 and 6.3.6 of DPP specification version 1.0. The configuration object with network credentials 109 can be optionally signed by DPP server 103 using the recorded initiator bootstrap private key bi 104b. In a different embodiment, a DPP server 103 can omit a signature for network credentials 109 in a step 335, and an initiator 102' can sign the network credentials 109 using the derived initiator ephemeral private key pi 102b. The steps to create and verify a signature with ECC PKI keys can be according to FIPS publication 186-4, and other possibilities exist as well. In FIG. 5a, a DPP server 103 can also take the other steps described for a step 335 in FIG. 3a above.

In a step 336, DPP server 103 can optionally encrypt network credentials 109 using an asymmetric encryption algorithm and a public key from the responder comprising one of (i) the responder bootstrap public key Br 101a or (ii) the derived responder ephemeral public key Pr 101e (received in message 506), or (iii) the public key for a device recorded by a certificate for device 101 in cert.device 101m. In some preferred exemplary embodiments, a step 336 can comprise encrypting network credentials 109 into credentials 109' using (i) the public key in cert.device 101m, and (ii) the an Elgamal asymmetric encryption algorithm. Or, a step 336 can comprise encrypting network credentials 109 into credentials 109' using either responder public key Pr 101e or Br 101a, and an Elgamal asymmetric encryption algorithm. The encryption algorithm could be from using Elgamal asymmetric encryption as summarized in the Wikipedia article for ElGamal encryption from Apr. 18, 2018, which is herein incorporated by reference. A set of network credentials 109 that may be optionally encrypted using Elgamal asymmetric encryption and a responder public key is depicted as credentials 109' in FIG. 5a. The optional Elgamal asymmetric encryption in a step 336 can use a set of parameters 199a in order to specify values such as encoding rules, byte or bit order, padding, etc. An optional encryption step 336 could also comprise (i) deriving a symmetric key and encrypting the symmetric key with Elgamal encryption and a responder public key and then (ii) encrypting the set of credentials 109 using a symmetric ciphering algorithm 405a and the derived symmetric key, in order to determine an encrypted set of credentials 109'.

In exemplary embodiments, an encrypted set of credentials 109' can be sent to initiator 102' instead of plaintext credentials 109, since an initiator 102' can read plaintext credentials 109, but not feasibly read encrypted credentials 109'. Note that encrypted credentials 109' can include a plaintext public key "h" or "g'" along with the credentials 109' in order for responder 101x to use a private key such as responder bootstrap private key br 101b or responder ephemeral private key pr 101f or the secret key for cert.device 101m in FIG. 1a to decrypt the encrypted credentials 109'. A reason that a step 336 can be performed in FIG. 5a is that (i) initiator 102' could otherwise read and operate on a plaintext network credentials 109 (since initiator 102' uses encryption key ke 327a to encrypt plaintext 403c), and (ii) a DPP server 103 or a network 107 may prefer for initiator 102' to not read plaintext network credentials 109 (since initiator 102' may not be secured or under the full control of a network 107). In other embodiments, an encryption step 336 can be optionally omitted and plaintext credentials 109 can be sent to an initiator 102' via the secure session 302b via message 514.

In another embodiment, the asymmetric encryption step 336 can be performed by an external network, such that the external network generates the asymmetrically encrypted credentials 109', and the asymmetrically encrypted credentials 109' could be stored in a device credentials table 340 from FIG. 3b. For example, credentials 109' could comprise the exemplary depicted credentials in table 340 of "from . . . ", where " . . . " was an external network in a networks available list 304c. In other words, a DPP server 103 may not be able to read the plaintext credentials 109 within an asymmetrically encrypted credentials 109', since an external network could encrypt the credentials using a step 336 before providing the credentials to network 107 and DPP server 103. Again, as noted above, a step 336 could comprise asymmetrically encrypting a symmetric ciphering key using Elgamal asymmetric encryption and a public key for responder 101x or device 101, and then encrypting the plaintext credentials 109 into credentials 109' with the symmetric ciphering key.

DPP server 103 can then send initiator 102' a message 514, where the message 514 can include an identity for device 101 such as ID-token.device 206 and the network credentials 109' (plus the asymmetrically encrypted symmetric ciphering key for embodiments where credentials 109' are encrypted with the symmetric ciphering key), where the network credentials 109' can be in the form of a configuration object and optionally encrypted using an Elgamal asymmetric encryption algorithm. Although a single value for network credentials 109' in message 514 are depicted, network credentials 109' could provide credentials for device 101 to connect with both a selected primary network 308aa and a selected backup network 308ab (with different credentials for each). Or, two sets of configuration objects with two sets of network credentials 109' could be sent in a message 514. Other possibilities exist as well without departing from the scope of the present invention.

Initiator 102' can receive message 514 and process the received credentials. At step 322e, initiator 102 can conduct an encryption step 322e using an encryption step 322 depicted and described in connection with FIG. 4c above. Encryption step 322e can be performed using key ke 327a for device 101. For encryption step 322e, the plaintext value for the E-nonce 332a and the configuration object comprising network credentials 109' (where network credentials 109' may be optionally asymmetrically encrypted) can be input into a symmetric encryption algorithm 405a in order to generate a ciphertext 322f. Note that the use of asymmetrically encrypted credentials 109' can be optionally omitted, and an initiator 102' in a step 322e can input plaintext credentials 109 into a symmetric ciphering algorithm 405a. Initiator 102' can then send responder 101x a DPP configuration response message 124 via connection 192, where message 124 can include the ciphertext 322f, and the ciphertext 322f can include the encrypted E-nonce 332a and the encrypted network credentials 109'

Responder 101x can receive message 124 from initiator 102' with ciphertext 322f. Responder 101x can conduct a decryption step 328d using decryption step 328 depicted in FIG. 4c below. A difference between decryption step 328 and decryption step 328d is that decryption step 328d uses the ciphertext 322f as input into the symmetric decryption algorithm 405b. Responder 101x can use the previously calculated key ke 327a in order to read the plaintext within ciphertext 322f. Note that the plaintext within ciphertext 322f can include an encrypted network credentials 109'. In other words, and as depicted in FIG. 5a, credentials 109' in message 124 received by responder 101x can be "double decrypted", and the first layer of encryption using key ke 327a can be removed using step 328d. Responder 101x can confirm that plaintext in ciphertext 322f includes the previously sent E-nonce 332a.

For embodiments that use an optional encryption step 336 on network credentials 109 by DPP server 103 in step 336 (or an external network) in order to create asymmetrically encrypted network credentials 109', a responder 101x can use an asymmetric decryption step 337 in order to convert the encrypted network credentials 109' into plaintext network credentials 109. Responder 101x could use an Elgamal asymmetric decryption algorithm and either a recorded (i) responder bootstrap private key bi 101b or (ii) responder ephemeral private key pr 101f. Note that device 101 could decrypt credentials 109' using a private key for the public key in a certificate cert.device 101m, and in this case responder 101x could pass the received asymmetrically encrypted credentials 109' to device 101. Note that when using Elgamal asymmetric decryption, the responder 101x or device 101 uses the private key that corresponds to the public key used with asymmetric encryption of the credentials 109 in a step 336. Responder 101x could also use a selected set of cryptographic parameters 199a in order to conduct the Elgamal asymmetric decryption.

Note that encrypted network credentials 109' could include the public key "h" or "g$^x$" in order to conduct the Elgamal asymmetric decryption. For embodiments (a) without an optional encryption step 336 on network credentials 109 to create encrypted credentials 109', then (b) responder 101x can read the plaintext network credentials 109 in a step 337. Note that credentials 109 may be previously signed by DPP server 103 or initiator 102' using a private key for the initiator 102'. The responder could also verify a signature for the credentials 109 using a public key for the initiator, such as the initiator ephemeral public key Pi 102a or the initiator bootstrap public key Bi 104a. For embodiments where (i) a symmetric key is asymmetrically encrypted using Elgamal, and (ii) the credentials 109' are symmetrically encrypted with the symmetric key, then (x) message 124 can include the asymmetrically encrypted symmetric key with the symmetrically encrypted credentials 109' and (y) a step 337 by responder 101x can include asymmetrically decrypting the symmetric key and then using the plaintext symmetric key to decrypt the credentials 109'

After reading the plaintext network credentials 109 and optionally verifying a signature forth credentials 109 using a recorded public key 102a or 104a, device 101 can complete the configuration step 106 by loading the network credentials 109 and begin operating a WiFi radio 101h with the network credentials 109, as depicted in FIG. 1a. In this manner, device 101 can obtain connectivity to network access point 105. In exemplary embodiments, the initiator 102' can conduct the initiator restore step 129 depicted and described in connection with FIG. 1d above, such that initiator 102' can be returned to the previous state where WiFi radio 102w operates with a user configuration 131, thus minimizing impacts of the prior initiator configuration step 127 for an initiator user 102u. As depicted in FIG. 5a, the collection of steps beginning with step 339 for responder 101x through step 106 for responder 101x can comprise a step 513.

FIG. 5b

FIG. 5b is a simplified message flow diagram illustrating an exemplary system with exemplary data sent and received by a device database, a DPP server, an initiator proxy, and a responder, in accordance with exemplary embodiments. Before starting steps and message flows depicted in FIG. 5b, the initiator, DPP server, and device database depicted for system 501 in FIG. 5b may previously complete exemplary message flows and steps depicted for a step 301 in FIG. 3a above. System 501 can include a device database 104, DPP server 103, initiator proxy 102', and responder 101x operating in device 101. Initiator proxy 102' can communicate with DPP server 103 via IP network 113 using an access network 112, also as depicted in FIG. 3a above. As contemplated herein, an "initiator proxy 102'" depicted in FIG. 5b may also be referred to as initiator 102', and an initiator 102' and initiator proxy 102' may be equivalent herein. A difference between system 501 in FIG. 5b and system 300 in FIG. 3a can be that the exemplary secret shared keys comprising key k2 314c and ke 327a are recorded and operated within an initiator 102'. In other words, a DPP server 103 does not need access to these keys for the embodiment depicted in FIG. 5b. In exemplary embodiments depicted in FIG. 5b, both (i) the initiator bootstrap private key bi 104b and (ii) the responder bootstrap public key Br 101a can remain recorded in a DPP server 103 and not exposed to initiator 102'. The exemplary embodiment depicted in FIG. 5ba can comprise a third mode 306a of operation for initiator 102' and DPP server 103, as depicted in FIG. 3b above. Note that a difference between the third mode 306a in FIG. 5b and the second mode 306a in FIG. 5a is that (a) the responder bootstrap public key Br 101a can remain recorded in a DPP server 103 and not exposed to or shared with initiator 102' for the third mode 306a in FIG. 5b, while (b) the responder bootstrap public key Br 101a is shared with initiator 102' in the second mode 306a in FIG. 5a.

After a step 301 from FIG. 3a, DPP server 103 can conduct a step 502 in order to select a responder bootstrap public key Br 101a for device 101 using an identity ID-token.device 206. The value ID-token.device 206 could be received within step 301 in message 305 as depicted in FIG. 3a. The responder bootstrap public key Br 101a could be recorded in a device database 104 or received from a device manufacturer for a device 101. As mentioned for a step 502 in FIG. 5a, a responder 101x could record a plurality of responder bootstrap public keys Br 101a, and the key 101a can be selected in a step 502. A MAC address for MAC.R 101d for device 101 using ID-token.device 206 can also be selected from a server database 103a in a step 502.

Initiator 102' can then conduct a step 313 to derive the initiator ephemeral public key Pi 102a and the initiator ephemeral private key pi 102b. A step 313 was previously depicted and described above in FIG. 3a. Although DPP server 103 conducted the step 313 in FIG. 3a, an initiator 102' can also conduct the step 313 in order to derive the ephemeral PKI key pairs. For example, initiator 102' also derives the initiator ephemeral PKI keys in a step 313 in FIG. 5a. Initiator 102' can then send DPP server 103 the derived initiator ephemeral private key pi 102b in a message 521. Message 521 could be securely send to DPP server 103 via secure session 302b. Message 521 can also include device identity ID-token.device 206 (or ID.device 101i) in order for DPP server 103 to track the device 101 and initiator 102' associated with the key pi 102b. DPP server 103 can record the data received in message 521 in a server database 103a, as depicted in FIG. 3b.

DPP server 103 for a step 314z can comprise DPP server 103 conducting a first initiator key exchange step 314 using an Elliptic Curve Diffie Hellman (ECDH) key exchange 401a, as depicted and described in connection with FIG. 4a below. Data input for a step 314z can comprise the initiator ephemeral private key pi 102b and the recorded responder bootstrap public key Br 101a. Data output from a step 314z can comprise the secret shared key M 410 as described in FIG. 4a above. In other words, the difference between a step 314z and a step 314 is the a step 314z can terminate before the key derivation function 401a and the output of a step 314z can comprise the secret shared key M 410. In an alternative embodiment for system 501 in FIG. 5b, DPP server 103 can also calculate key k1 using the full set of steps for a key exchange 314 (but key k1 may not be needed by DPP server 103 for the embodiment depicted in FIG. 5b).

At step 316, DPP server 103 can calculate secure hash values for initiator bootstrap public key Bi 104a and responder bootstrap public key Br 101a, using a secure hash algorithm 199e. The values are depicted in FIG. 3a as "H(Bi)" and "H(Br)", respectively. DPP server 103 can then send initiator 102' a message 522, where message 522 can include an identity for device 101 ID-token.device 206 (or ID.device 101i), the hash values for the initiator bootstrap public key Bi 104a and the responder bootstrap public key Br 101a, the shared secret key M 410 from a step 401a in key exchange step 314z, and the MAC address for the responder 101x comprising MAC.R 101d. Message 522 can be sent through secure session 302b and received and recorded by initiator 102'.

Initiator 102' can receive message 522 and conduct a series of steps in order to create and process a DPP authentication request message 123. Initiator 102' can input the received value M 410 from a message 522 into a key derivation function 402a in order to derive a secret shared key k1 314a, depicted as a step 402a for initiator 102' in FIG. 5b. At step 504 the initiator 102' can determine the initiator capabilities for conducting a DPP 191 with device 101 and responder 101x. In the exemplary embodiment depicted in FIG. 5b, initiator 102' can select and use the capabilities of the role as a configurator. In other embodiments, an initiator 102' could select and use the capabilities of the role an enrollee for a step 504. In addition, an initiator 102' can generate a random number for an initiator nonce I-nonce 317a in a step 504. A step 504 can also take place before a step 402a in some exemplary embodiments.

Initiator 102' in step 315 can then conduct the encryption step 315 depicted in FIG. 4a, and also described in FIG. 3a and FIG. 5a. The plaintext input into a symmetric encryption algorithm 405a can comprise the initiator nonce 317a and initiator capabilities from a step 504 above. The shared secret key k1 314a from key derivation function 402a by initiator 102' can be used with symmetric ciphering algorithm 405a in a step 315. The ciphertext output from an encryption step 315 can comprise ciphertext 315a.

Initiator 102' can then conduct a step 316a to send responder 101x a message 122, where message 122 can include the hash values for (i) the initiator bootstrap public key Bi 104a and (ii) the responder bootstrap public key Br 101a, the derived initiator ephemeral public key Pi 102a (from a step 313 above), and ciphertext 315a, where ciphertext 315a is encrypted with key k1 and includes an initiator nonce 317a and the initiator capabilities. Sending DPP authentication request message 122 was also depicted and described in connection with FIG. 1b, FIG. 1c, FIG. 3a, and FIG. 5a above.

In FIG. 5b, responder 101x can receive message 122 and conduct the series of steps 325. The series of steps 325 for responder 101x were depicted and described in connection with FIG. 3a above, and steps 325 can comprise the steps 318. 319. 320, 321, 314b, 322, and 315b. Responder 101x can process the message 122 using steps 325 and generate a DPP authentication response 123. The steps 325 for a responder 101x to process the received message 122 and generate the response message 123 can comprise section 6.2.2 of DPP specification version 1.0. Other possibilities exist as well without departing from the scope of the present invention. In general, responder 101x can use the recorded bootstrap private keys and the derived ephemeral private keys in order to conduct ECDH key exchanges. Responder 101x can also (i) derive a responder nonce 318b, (ii) decrypt ciphertext in message 122 and (iii) encrypt ciphertext in message 123 using derived secret shared keys from the ECDH key exchanges. Responder 101x can send initiator 102' the DPP authentication response 123 after conducting the steps 325.

Initiator 102' can receive the DPP authentication response 123 and process the message. Using broadcast messages over connection 192, initiator 102' can identify the message from responder 101x based on the hash values for the bootstrap public keys in response 123. For embodiments where message 122 and response 123 are sent as unicast messages, initiator 102' can identify the message from responder 101x based on the MAC.R 101d in the response 123. Initiator 102' can then extract and record responder ephemeral public key Pr 101e (depicted for a response 123 in FIG. 3a). Initiator 102' can also a key verification step on the received key Pr 101e according to FIPS publication SP 800-56A (revision 2).

Initiator 102' can then send DPP server 103 a message 506 using secure connection 302b via access network 112, where message 506 can include (i) an identity for device 101 such as ID-token.device 206 (or ID.device 101i), and (ii) the responder ephemeral public key Pr 101e. In an exemplary embodiment a message 506 can include the MAC address MAC.R 101d to also identify device 101 and the associated key Pr 101e. DPP server 103 can receive the message 506 and record the responder ephemeral public key Pr 101e along with the device identity in a server database 103a, as depicted in FIG. 3b above.

As depicted in FIG. 5b, initiator 102', DPP server 103, and responder 101x can then conduct a step 512. A step 512 can comprise the series of steps and message depicted and described in connection with FIG. 5a above. In summary, initiator 102' can conduct a key exchange step 319a to derive the key k2 314c and then decrypt the ciphertext from message 123 into plaintext using a step 320b. Key exchange step 319a can also calculate a shared secret key N 411 as depicted in FIG. 4b. The plaintext from a step 320b can comprise a second ciphertext 322a encrypted with a key ke 327a. DPP server 103 can (i) conduct a key exchange step 401c in order to derive shared secret key L 412. DPP server 103 can send initiator 102' the shared secret key L 412. Initiator 102' can conduct a key derivation function step 402c from FIG. 4c using the values M 410 (from message 522), N 411 (from a step 319a), and L 412 (from DPP server 103 in a message 510 in a step 512) in order to derive key ke 327a, as depicted in FIG. 4c. Initiator 102' can decrypt the second ciphertext 322a in message 123 into plaintext with a decryption step 328 using the derived key ke 327a and read the value R-auth 404. Initiator 102' can also use a step 328 to compare the received, decrypted value for R-auth 404 with an internally calculated value for R-auth (e.g. a derived value for R-auth), and responder 101x can be authenticated if the two values for R-auth 404 are equal. Initiator 102' can calculate a value for I-auth 404a and encrypt the value with key ke 327a in a step 322b. Initiator 102' can then send responder 101x a DPP authentication confirm message 123a in a step 512, as depicted in FIG. 5a and FIG. 5b.

As depicted in FIG. 5b, initiator 102', DPP server 103, and responder 101x can then conduct a step 513. A step 513 can comprise the series of steps and message depicted and described in connection with FIG. 5a above. In summary, responder 101x can use a step 339 to receive and process the DPP authentication confirm message 123a. Responder 101 can decrypt the I-auth value 404a in a step 331. Responder 101x can calculate the value for I-auth 404, and if the received and calculated values for I-auth 404a are equal, then initiator 102' can be authenticated with responder 101x. Responder 101x can send a DPP configuration request 123b message, which can include a ciphertext 322d an E-nonce 332a and a configuration attribute 330. Initiator 102' can decrypt the ciphertext 322d and send DPP server 103 the configuration attribute 330. DPP server 103 can send initiator 102' a set of network credentials 109. The set of credentials 109 may optionally be encrypted with an asymmetric encryption algorithm using a public key for the responder, and for these embodiments the set of credentials 109 can be designated an encrypted set of credentials 109'. The public key for the responder with an optional asymmetric encryption for the credentials 109' could be (i) the responder bootstrap public key Br 101a, or (ii) the responder ephemeral public key, or (iii) a private key for the device public key in cert.device 101m (e.g. step 337 in FIG. 5a). Credentials 109 or credentials 109' can also be signed by either (i) the DPP server 103 using the recorded initiator bootstrap private key bi 104b, or (ii) using the derived initiator ephemeral private key pi 102b.

Continuing with a step 513 in FIG. 5b, the credentials 109 or credentials 109' could be signed by both the DPP server 103 and the initiator 102 in a step 513. The initiator 102' can receive the signed network credentials 109' or 109 and encrypt the credentials and the E-nonce 332a using the derived key ke 327a. The initiator 102' can send responder 101x a DPP configuration response 124 message with the encrypted and signed credentials for device 101. Responder 101 can verify the signature and decrypt the credentials 109 or asymmetrically encrypted credentials 109'. Device 101 can apply the credentials 109 and connect with another node using the credentials 109, and the other node could be network access point 105. The other node could also be a WiFi peer-to-peer (P2P) connection. In another embodiment, device 101 could operate as an access point 105 for other WiFi clients, and in this embodiment the credentials 109 received in a message 124 could be for device 101 to operate as a WiFi access point using the credentials 109. Other possibilities exist as well for a responder 101x to receive a set of credentials 109 from an initiator 102' without departing from the scope of the present invention.

System 501 as depicted in FIG. 5b can provide several benefits for conducting a device provisioning protocol, compared to the conventional technology depicted in FIG. 1b and FIG. 1c. First, an initiator bootstrap private key bi 104b can remain recorded in a network 107 and does not need to be shared with an initiator 102'. The operating environment and security for an initiator 102' or initiator 102* in FIG. 1b and FIG. 1c may be outside the control of a network 107 or a device 101 with responder 101x. If an initiator bootstrap private key bi 104b is sent to initiator 102' or initiator 102*, then the initiator bootstrap private key bi 104b cannot be securely reused (since initiator 102' or initiator 102* could then share the key bi 104b or attempt to reuse it with other devices 101 recording the same initiator bootstrap public key Bi 104a). Further, recording the same, shared initiator bootstrap public key Bi 104a across a plurality of devices 101 (such as during device manufacturing or before distribution) can provide benefits for scalability and ease of deployment, especially if the initiators 102' or initiators 102* are not known to a network 107 before distribution of devices 101. Note that recording the same, shared initiator bootstrap public key Bi 104a across a plurality of devices 101 is depicted with "shared keys" for a key table 104k in device database 104 in FIG. 2b.

In other words, recording a same initiator bootstrap public key Bi 104a across a plurality of devices may not be securely feasible if the initiator bootstrap private key bi 104b needs to be used by multiple, insecure initiators 102' or initiators 102*. In addition, the responder bootstrap public key Br 101a can remain securely recorded in a network 107 and not exposed to an initiator 102' for a system 501 in FIG. 5b (where Br 101a can be recorded in a device database 104 instead of being received by an initiator 102' from a message 503 in FIG. 5a). During the lifetime of a device 101 that could be a decade or longer, a device owner or device user may prefer the device 101 to conduct a device provisioning protocol multiple times, such as after a "factory reset" for device 101. Keeping or recording the responder bootstrap public key Br 101a and initiator bootstrap private key bi 102b in a network 107 can support the steps for a device provisioning protocol to be securely reused for the same device 101.

Yet another benefit of a system 300, system 500, and system 501 is that an overall trust level by responder 101x for conducting a device provisioning protocol can be enhanced or increased, since both an initiator 102' and a DPP server 103 must work in conjunction in order to successfully compete a DPP 191. In other words, for a system 300, system 500, and system 501, security risks for an insecure initiator 102' can be compensated by likely a higher overall level of security for a DPP server 103. These are just a few of the exemplary benefits for a systems 300, 500, and 501 compared to conventional technology for conducting a device provisioning protocol, and other benefits will be available as well for those of ordinary skill in the art.

FIG. 6a

FIG. 6a is a simplified message flow diagram illustrating an exemplary system with exemplary data sent and received by a device database, a DPP server, a WiFi access point, and a device, in accordance with exemplary embodiments. Before starting steps and message flows depicted in FIG. 6a, a device 101 with responder 101x could have completed the exemplary configuration step 106 as depicted in FIGS. 1a, 3a, 5a, and 5b above in order for device 101 to receive and load a set of network access credentials 109. System 600 can include a device database 104, a DPP server 103, a WiFi access point 105, and a device 101. WiFi access point 105 can broadcast an SSID with a value of SSID.network-AP 109a, which also could have been observed by an initiator 102' in a step 303a to collect a networks available list 304c. A DPP server 103 (or another server within a network 107) could (i) conduct a step 308a to select WiFi access point 105 from the networks available list 304c and then (ii) obtained the credentials 109 using a step 308b, and then sent the credentials 109 through initiator 102' in a DPP message 124.

Configuration data for device 101 to utilize with WiFi access point 105 could be included in data and values for network credentials 109 for device 101. For embodiments where a selected access network 308aa for device 101 is not a WiFi access point 105 (such as possibly a 5G wireless WAN connection), then network credentials 109 could comprise a profile for an embedded universal integrated circuit card (eUICC) as specified in GSMA standards SGP.22 and SGP.02. For embodiments where credentials 109 comprise an eUICC profile, then the credentials 109 may preferably be asymmetrically encrypted into credentials 109' using a step 336 from FIG. 5a by an external network recording the eUICC profile, and then asymmetrically decrypted by responder 101x or device 101 using a step 337 from FIG. 5a. DPP server 103 would record the eUICC profile as credentials 109' (or "from . . . " in FIG. 3b). For embodiments where asymmetrically encrypted credentials 109' comprising an eUICC profile are received by responder 101x in a DPP Configuration Response 124 message, then device 101 can also operate an eUICC as specified in as specified in GSMA standards SGP.22 and SGP.02.

Values or data in credentials 109 could comprise frequencies or channels to utilize, a service set identifier (SSID) or network name, user identities and passwords, and/or public certificates for device 101, public certificates for a certificate authority, etc. As contemplated herein, a set of credentials 109 can include supporting data to use the credentials 109 and/or connect with an access network 112 or network 107, such as configuration data for a WiFi radio 101*h* in device 101. The supporting data could comprise Config.network-AP 109*c* as depicted and described in connection with FIG. 1*a*. Data collected for a set of credentials 109 was also described in a step 335 in FIG. 3*a*

Device 101 and access point 105 can conduct a WiFi session setup 602 using the WiFi radio 101*i* with credentials 109. WiFi connection setup 602 can utilize standard WiFi security protocols such as, but not limited to, WPA2, WPA3, or subsequent and related standards. In exemplary embodiments, WiFi connection setup 602 utilizes PMK and a PMKID, where PMK and PMKID can be uniquely associated with device 101. Or WiFi connection setup 602 could use a preshared secret key (PSK) in credentials 109. At step 603, device 101 can select the DPP server 103 and a URL for DPP server 103. A URL for DPP server 103 could be included with credentials 109, or otherwise fetched by device 101 from an IP network 113 after session setup 602. A step 603 can also comprise device 101 confirming expected connectivity to an IP network 113 is provided via access point 105, such as performing domain name server (DNS) requests and downloading data via HTTP or HTTPS/TLS from an IP network 113.

Device 101 and DPP server 103 can then conduct a secure session setup 604. Secure session setup 604 could comprise a session using TLS, IPSec, VPN, SSH, or similar secure networking technologies to establish secure sessions. In exemplary embodiments, DPP server 103 uses the responder bootstrap public key Br 101*a* as a public key for device 101 in secure session 603 and device 101 uses the initiator bootstrap public key Bi 104*a* as a public key for DPP server 103 in secure session 603. In other words, (i) DPP server 103 uses the initiator bootstrap private key bi 104*b* as the private key for DPP server 103 in secure session 603, and (ii) device 101 uses the responder bootstrap private key br 101*b* as the private key for device 101 in secure session 603. In exemplary embodiments, the public keys responder bootstrap public key Br 101*a* and the initiator bootstrap public key Bi 104*a* are not transmitted between the nodes in a secure session setup 603, but rather the public keys are selected for use since they are already recorded by the two nodes. In this manner, security of secure session 603 can be enhanced, because the public keys are not transmitted or received in a plaintext form, but rather are already previously recorded by the two nodes. In an exemplary embodiment, secure session setup 603 could designate or identify the initiator bootstrap public key Bi 104*a* (and corresponding private key) for device 101, which could be selected by DPP server 103 sending an initiator bootstrap keys sequence number 197 in a secure session setup 603, for embodiments where device 101 can record a plurality of initiator bootstrap PKI keys, as depicted in device table 104*d* in FIG. 2*b*. Note that a secure session setup 604 could also use different public keys than those depicted in FIG. 6*a*, such as a certificate for DPP server 103 cert.DPPS 103*c* and a certificate for device 101 cert.device 101*m*.

At step 605*a*, device 101 can download and install a configuration package for device 101 using WiFi session 602 in FIG. 6*a*. The configuration package can be downloaded from network 107, and also potentially from DPP server 103 using secure session 604. Configuration package for device 101 can comprise an updated operating configuration for device 101. Configuration package for device 101 could be downloaded from a network 107. Configuration package for device 101 could include updated software or firmware for device 101, different credentials for device 101 to use when connecting with servers within a network 107, such as potentially a reporting server or a monitoring server within a network 107, timers for device 101 to use with servers in a network 107, and other data as well for the ongoing operation of device 101 with a network 107. After internally recording or loading the files for a configuration package in a step 605*a*, device 101 can perform a reboot, so that device 101 restarts with the new files from the configuration package. Upon a reboot in a step 605*a*, connections 602 and 603 may temporarily terminate with the reboot, but device 101 can re-establish connections 602 and 603 after reboot. A step 605*a* can then also comprise device 101 creating a report 605*aa*, where report 605*aa* includes a status code with success or errors for each file in a configuration package. In other words, report 605*aa* can record the success or errors of applying each of the files in a configuration package, which may be useful for network 107 in system 100 to know the configured state of device 101 after a step 605*a*. Note that step 605*a* can take place before a secure session setup 604.

At step 605*b* device 101 can perform an RF frequency scan or sweep all available mobile network operators and network access technologies around device 101 in order to collect a second networks available list 304*a*. The second networks available list 304*c* can be useful for DPP server 103 or network 107 to confirm that a selected primary access network 308*aa* for device 101 is in fact a preferred network. An exemplary first networks available list 304*c* was depicted in FIG. 3*a* above (for initiator 102'). Although initiator 102' also collected a first networks available list 304*c*, device 101 can operate with a different antenna and set of radios 101*h* with different capabilities than initiator 102'. For example, RSSI or RF signal strength measurements by initiator 102' in a step 303*a* may be different than for a device 101. As another example, device 101 may operate at a different location (such as an exemplary tens of meters away) from the location of initiator 102' in a step 303*a*, and thus a preferred access network 112 for device 101 may be different using the second networks available list 304*a* from device 101 in step 605*b* than a first networks available list 304*a* from initiator 102'. In other words, a network selection step 308*a* may provide an initial estimate for a preferred access network 112 (identified by selected primary network 308*aa* in FIG. 3*b*), but the actual/updated preferred access network 112 for device 101 using the criteria from a step 308*a* could be selected in a step 605*b* using the second networks available list 304*c* from device 101. A step 605*b* for device 101 can include the actions for an initiator 102' in a step 303*a* to collect a first networks available list 304*a* for initiator 102'.

Device 101 can send DPP server 103 a message 606, where message 606 can include a device identity ID-token.device 206, the second networks available list 304*c* collected by device 101 in a step 605*b*, an initiator bootstrap sequence number 197 for the most recent initiator bootstrap public key Bi 104*a* used by device 101, and a report 605*aa*, which could comprise the report generated in a step 605*a*. As depicted in FIG. 6*a*, message 606 can be sent via (i) access point 105 and then (ii) access network 112 for access point 105. Although a DPP server 103 is depicted in FIG. 6*a* as communicating with device 101 and receiving message 606, another server in a network 107 or associated with network 107 could receive the message 606 (using a secure session similar to secure session 604 depicted in FIG. 6*a*). Note that message 606 could also include the most recent initiator bootstrap public key Bi 104*a* recorded by device 101.

A DPP server 103 could then conduct a step 308a using the second networks available list 304c from device 101, in order to select an updated, selected primary access network 308aa. A step 308a was depicted and described above in connection with FIG. 3a. For embodiments where a step 308a by DPP server 103 selects a different, second primary access network 308aa for device 101 in FIG. 6a (e.g. different than a first primary access network 308aa in FIG. 3a), a DPP server 103 could then conduct a step 308b in order to receive an updated, second set of credentials 109 for the second primary access network 308aa. Note that the credentials 109 received and recorded in a step 308b by DPP server 103 can comprise an asymmetrically encrypted credentials 109', where a server functioning as the source of asymmetrically encrypted credentials 109' could perform a step 336 depicted and described in connection with FIG. 5a. In exemplary embodiments, only device 101 could feasibly read the plaintext credentials 109 for an asymmetrically encrypted credentials 109', where device 101 would use a recorded private key (e.g. key 101b, 101f, or the private key for cert.device 101m) in order to perform an Elgamal asymmetric decryption on the credentials 109'

A DPP server 103 could conduct a step 607, where DPP server 103 can process the received report 605aa in order to confirm a configuration package for device 101 was successfully applied in a step 605a. DPP server 103 could also forward report 605aa to other servers in a network 107 in a step 607. If errors or problems are detected in report 605aa in a step 607, then DPP server 103 can send a command to device 101 to back out the configuration package (e.g. uninstall) or restore a previous state for device 101.

At step 608, DPP server 103 can determine if recorded initiator bootstrap public key Bi 104a for device 101 should be updated. There could be many reasons both device 101 and network 107 may prefer to update initiator bootstrap public key Bi 104a for a responder 101x operating in device 101. A device 101 may have a lifetime of a decade or longer, and increased key security, use of different cryptographic algorithms, or different cryptographic parameters 199 may be preferred over time. Another reason could be that device 101 or network 107, after (a) a first configuration step 106 via a first session of a device provisioning protocol, may prefer (b) to support a second configuration step 106 via a second session of a device provisioning protocol, where the second session could use a different initiator bootstrap PKI key pair. Another reason could be that a first device 101 used the same key (e.g. same numeric value) for an initiator bootstrap public key Bi 104a as second device 101 (or possibly multiple other devices 101), which is also depicted for "shared keys" in a key table 104k in a device database 104 in FIG. 2b. Security could be increased for the first device 101 by changing the recorded initiator bootstrap public key Bi 104a after the key has been used. Other reasons for a device 101, DPP server 103, or network 107 may exist for a DPP server 103 to determine key Bi 104a should be updated for device 101, without departing from the scope of the present invention. FIG. 6 depicts an embodiment where DPP server 103 selects to update the initiator bootstrap public key Bi 104a for device 101 in a step 608.

At step 609, DPP server 103 can derive a new, updated initiator bootstrap public key Bi 104a and a corresponding new, updated initiator bootstrap private key bi 104b. The DPP server 103 can use a selected set of cryptographic parameters 199a to derive the keys. The DPP server 103 can use a random number generator and a key pair generation algorithm in order to derive the new, update initiator bootstrap PKI keys. The DPP server 103 can use the step 313 depicted and described in FIG. 3a to derived the initiator bootstrap PKI keys (e.g. using same or similar steps as deriving initiator ephemeral PKI keys). Although FIG. 6a depicts DPP server 103 as conducting a step 609 to derive new initiator bootstrap PKI keys, another server in a network 107 could conduct a step 609, including device database 104. At step 609, DPP server 103 can also update initiator bootstrap keys sequence number 197 recorded in a device database 104 depicted in FIG. 2b to reflect or account for the use of new initiator bootstrap PKI keys. The updated number 197 is depicted in FIG. 6a an initiator bootstrap keys sequence number 197a. In exemplary embodiments, the initiator bootstrap keys sequence number 197 can be used at a later time by DPP server 103 when conducting a step 302d for device 101 (e.g. querying device database 104 for initiator bootstrap PKI keys in FIG. 3a), such as if DPP server 103 supports a device provisioning protocol for device 101 again at a later time.

A DPP server 103 can then send device database 104 a message 609a, where message 609a can include a device identity ID-token.device 206 (or ID.device 101i), the new, updated initiator bootstrap public key Bi 104a and the corresponding new, updated initiator bootstrap private key bi 104b, where the PKI keys were generated in a step 609. Message 609a can also include the updated initiator bootstrap keys sequence number 197a. Note that DPP server 103 and device database 104 can continue to use secure session 302a from a FIG. 3a in order to secure message 609a. In some embodiments, initiator bootstrap private key bi 104b can be recorded only within DPP server 103 in a server database 103a, and for these embodiments initiator bootstrap private key bi 104b can be omitted from a message 609a.

At step 610, device database 104 can record the data from a message 609a in a device table 104d for device 101 using ID-token.device 206 (or ID.device 101i). The data can be recorded by adding a row in device table 104d for device 101. The new, updated initiator bootstrap public key Bi 104a and the corresponding new, updated initiator bootstrap private key bi 104b could be recorded in the added row, along with the received value for an initiator bootstrap keys sequence number 197a. In this manner, device database 104 can record and identify the initiator bootstrap PKI keys for use with device 101 at a later time, for reasons such as, but not limited to, the reasons discussed in connection with step 608 above. Database 104 can then send DPP server 103 a message 611, where message 611 can confirm that step 610 was successfully completed and the new initiator bootstrap PKI keys were recorded in a device table 104d.

After receiving message 611, DPP server 103 can send device 101 a message 612 via secure session 604. Message 612 can include the new, updated initiator bootstrap public key Bi 104a, which was previously derived by DPP server 103 in a step 609 and recorded by device database 104 in a step 610. Message 612 can also include (i) a selected set of parameters 199a associated with the new Bi 104a (e.g. key length, ECC curve name, etc.), and (ii) the updated initiator bootstrap keys sequence number 197a. Device 101 can receive message 612 with the new, updated initiator bootstrap public key Bi 104a and updated initiator bootstrap keys sequence number 197a.

At step 613, device 101 could record the data received in message 612 with a responder 101x operating in device 101. In exemplary embodiments, in step 612, device 101 could also use the received parameters 199a to derive an updated responder bootstrap private key br 101b and responder bootstrap public key Br 101a. Device 101 could use the equivalent steps as DPP server 103 in step 313 depicted and described in FIG. 3*a* in order for responder 101*x* to derive a new, updated bootstrap private key br 101*b* and responder bootstrap public key Br 101*a*. A step 613 can also comprise device 101 recording the derived PKI keys and received key Bi 104*a* in nonvolatile memory of device 101. Device 101 can also update a responder 101*x* operating in device 101 to use the new PKI keys for any subsequent, later instance of a device provisioning protocol either with an initiator 102' or an initiator 102*.

In message 614, device 101 can send DPP server 103 and "OK" message noting the successful receipt and recording of the new, updated initiator bootstrap public key Bi 104*a*, and message 614 can comprise a confirmation of recording key Bi 104*a*. Message 614 can also include the new, updated responder bootstrap public key Br 101*a*. At a step 615, DPP server 103 can receive message 614 and record the data in a server database 103*a* for a device 101 using device identity ID-token.device 206. In exemplary embodiments, the new, updated responder bootstrap public key Br 101*a* can be used by DPP server 103 when supporting an initiator 102' to conduct a device provisioning protocol with device 101 and responder 101*x* at a later time.

DPP server 103 can then send device database 104 a message 615, where message 615 can include a device identity ID-token.device 206 (or ID.device 101*i*) and a confirmation that device 101 received and recorded the new, updated initiator bootstrap public key Bi 104*a*. In this manner, device database 104 can confirm that the new key Bi 104*a* with corresponding private key bi 104*b* is "ready for use", and can be selected in a subsequent query 309 (in FIG. 3*a*) from a DPP server 103 for device 101 with identity ID-token.device 206. As depicted in FIG. 6*a*, message 615 can also include a new, updated responder bootstrap public key Br 101*a*. Device database 104 can also record the received new key Br 101*a* in a key table 104*k* for device 101 with identity ID-token.device 206 as depicted in FIG. 2*b*. In this manner, device database 104 can select the new, updated responder bootstrap public key Br 101*a* (along with initiator PKI keys) in a subsequent query 309 from a DPP server 103 for device 101, in order to conduct a later device provisioning protocol 191.

Initiator 102' can conduct a step 617, where step 617 can comprise the DPP application 102*g* or initiator 102' sending a query 618 to DPP server 103 in order to confirm successful completing of configuration step 106. The query 618 could be sent in a message over secure session 302*b* which was established between DPP server 103 and initiator 102' in a step 301 in FIG. 3*a*. DPP server 103 could determine if a configuration step 106 is complete based on the successful establishment of secure session 604 and receipt of a report 605*aa*. DPP server 103 could also determine that a configuration step 106 is complete using a report 605*aa* and any of: (i) device 101 has wireless connectivity properly established for a selected primary network 308*aa* and/or selected backup network 308*ab* (e.g. credentials 109 were received by device 101 and installed), (ii) device 101 has successfully collected a networks available list 304*c*, (iii) a configuration package was downloaded and installed in a step 605, (iv) device 101 has received an updated initiator bootstrap public key Bi 104*a*, and/or (v) device 101 has successfully updated responder bootstrap PKI keys comprising Bi 104*a*, Br 101*a*, and br 101*b*.

As depicted in FIG. 6*a*, DPP server 103 can reply to query 618 with a message 619 of "device OK", if configuration step 106 has been confirmed by DPP server 103 as completed, such as through any of (i) through (v) in the paragraph above. Individual components within (i) through (v) in the paragraph above could be recorded or confirmed in a report 605*aa*. Not all of (i) through (v) are required for some embodiments, although connectivity for device 101 to an IP network 113 can be required for DPP server 103 to consider a configuration step 106 completed. In exemplary embodiments, upon successful receipt of a message 619 with a status of "device OK" for device 101 or an equivalent message 619, then initiator 102' can display to initiator user 102*u* that a configuration step 106 for device 101 has been completed and device 101 can be left in operation, potentially without additional steps or manual changes to be performed by initiator user 102*u*. For embodiments where message 619 provides a status of "device not OK" or equivalent, then initiator 102' could display to initiator user 102*u* an error status and initiator user 102*u* could work with device 101 and network 107 in order to diagnose and rectify an error code or error condition in order to retransmit message 619 with a second query 618 and receive a subsequent message 619 of "device OK".

FIG. 6*b*

Figure 6B:
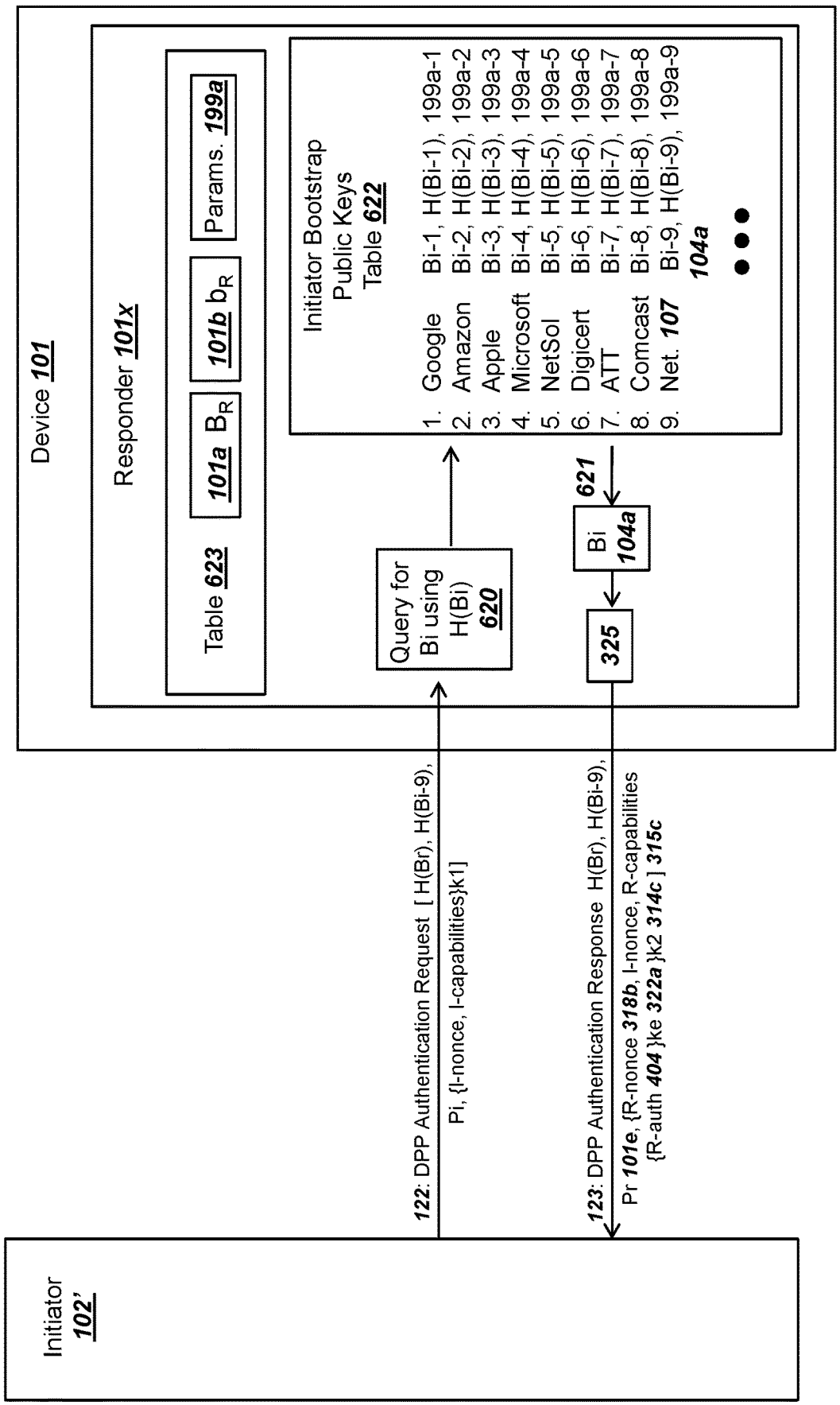
FIG. 6b is a graphical illustration of an exemplary system, where a responder records a plurality of initiator bootstrap public keys and the responder selects and uses an initiator bootstrap public key, in accordance with exemplary embodiments.

FIG. 6*b* is a graphical illustration of an exemplary system, where a responder records a plurality of initiator bootstrap public keys and the responder selects and uses an initiator bootstrap public key, in accordance with exemplary embodiments. The present invention contemplates that the systems and methods for (i) using an initiator 102' with a DPP server 103 and a responder 101*x* for a device provisioning protocol, where (ii) a responder 101*x* can record a plurality of initiator bootstrap public keys Bi 104*a*. Benefits can include the plurality of initiator bootstrap public keys 104*a* can be recorded in a device 101 with responder 101*x* before device 101 is taken to the physical location of a network access point 105. The plurality of initiator bootstrap public keys can be written to device 101 during manufacturing or distribution, thereby increasing the flexibility of (a) recording at least one compatible or supported initiator bootstrap public key Bi 104*a* in a device 101 for initiator 102', before (b) an initiator 102' is selected or known for conducting the device provisioning protocol steps 191 with a responder 101*x*. In exemplary embodiments, different values for recorded initiator bootstrap public keys Bi 104*a* can represent different possible networks 107 for configuration 106 of device 101 with responder 101*x*. As contemplated herein, (a) pre-recording a plurality of initiator bootstrap public keys Bi 104*a* in a plurality of devices 101 can still keep the various systems depicted herein secure, because (b) the corresponding initiator bootstrap private keys bi 104*b* can remain recorded individually and separately within each of a plurality of networks 107 which can conduct the device provisioning protocol 191 with the plurality of devices 101 recording the same values for initiator bootstrap public keys Bi 104*a*. In other words, each of the plurality of different initiator bootstrap public keys Bi 104*a* depicted in FIG. 6*b* can comprise "shared keys" as depicted and described in connection with FIG. 2*b*, such that different devices 101 and responders 101*x* can record the same value or number for an initiator bootstrap public key Bi 104*a*.

System 601 in FIG. 6*b* can include an initiator 102' and a device 101, where device 101 can operate a responder 101*x*. Initiator 102' in FIG. 6*b* can operate as an initiator 102' in FIG. 1*a*, FIG. 3*a*, FIG. 5*a*, etc. above. Responder 101*x* can record (i) responder bootstrap PKI keys Br 101*a* and br 101*b*, as well as (ii) at least one of a set of selected cryptographic parameters 199*a*. Although FIG. 6*b* depicts only a single set of PKI keys Br 101*a* and br 101*b*, and a set of selected cryptographic parameters 199*a*, a responder 101*x* could also record a plurality of different sets of PKI keys Br 101*a* and br 101*b*, with different parameters 199*a* (e.g. a first set of responder bootstrap keys for a first ECC curve P-256, a second set of bootstrap keys for a second ECC curve P-384, etc.). Responder 101*x* could determine which of the different sets of responder bootstrap PKI keys to utilize for conducting a device provisioning protocol 191 based on the received hash value for a responder bootstrap public key Br 101*a* received in a message 122. Although not depicted in FIG. 6*b*, a responder 101*x* could pre-compute the hash values for each of a possible plurality of bootstrap public keys Br 101*a* using a hash 199*e* over private key br 101*b* using cryptographic parameters 199*a* for each different responder bootstrap public key pair. Responder 101*x* could (i) listen for receiving a hash 199*e* value for any of the recorded bootstrap public keys Br 101*a* in an incoming message 122. When responder 101*x* observes a matching hash 199*e* value for a recorded key Br 101*a*, then select the private key br 101*b* for use in creating a response message 123. In other embodiments, a single recorded set of bootstrap PKI keys Br 101*a* and br 101*b* can be sufficient in order for device 101 to securely conduct a device provisioning protocol 191.

In some embodiments of the present invention, a responder 101*x* could record a plurality of different initiator bootstrap public keys Bi 104*a* in an initiator bootstrap public keys table 622, as depicted in FIG. 6*b*. Each of the different initiator bootstrap public keys 104*a* could also be recorded with both (i) a hash 199*e* value for each individual key Bi 104*a*, and (ii) a selected set of cryptographic parameters 199*a*. Each of the different initiator bootstrap public keys 104*a* could be associated with a different network 107, as depicted by the exemplary values for possible networks 107 (e.g. "Google", "Amazon", etc.). The corresponding bootstrap private key bi 104*b* for each of the different depicted initiator bootstrap public keys Bi 104*a* could be recorded in each of the different networks 107. The ninth listed exemplary network 107 in a table 622 in responder 101*x* can comprise the exemplary network 107 depicted in FIG. 1*a*, which can also operate the DPP server 103 in FIG. 3*a* or FIG. 5*a*, etc.

Although a single initiator bootstrap public key Bi 104*a* is depicted in FIG. 6*b* for each different exemplary network 107, each different exemplary network 107 could also record multiple different initiator bootstrap public keys Bi 104*a*, such as (i) a first initiator bootstrap public key Bi 104*a* for a network 107 with a first set of selected cryptographic parameters 199*a* (e.g. with exemplary curve P-256), and (ii) a second initiator bootstrap public key Bi 104*a* with a second set of selected cryptographic parameters 199*a* (e.g. with exemplary curve P-384). Other possibilities exist as well for recording a plurality of keys Bi 104*a* for the same network 107 in a table 622 without departing from the scope of the present invention.

Further, the exemplary recorded initiator bootstrap public key Bi 104*a* for multiple networks 107 in a table 622 can either comprise (i) a "shared key" depicted and described in a key table 104*k* in FIG. 2*b* where the value or number for the key Bi 104*a* can be recorded across a plurality of different devices 101, or (ii) a "unique key", where the value or number for the key Bi 104*a* can be unique for a device 101 (e.g. not recorded in other devices 101). The use of unique initiator bootstrap public keys Bi 104*a* recorded for responders 101*x* is also depicted in a key table 104*k* in FIG. 2*b*. For embodiments where each device 101 records a "unique key" for the initiator bootstrap public key Bi 104*a* (such as during device manufacturing), then a device database 104 could record both (i) the unique initiator bootstrap public key Bi 104*a* for device 101 and (ii) the corresponding unique initiator bootstrap private key bi 104*b* (such as receiving the keys from the device manufacturer). Other possibilities exist as well, where a set of initiator bootstrap public keys 104*a* recorded in a device 101 for a network 107 can comprise either (i) shared keys or (ii) unique keys, without departing from the scope of the present invention.

As depicted in FIG. 6*b* the responder 101*x* in device 101 can receive the message 122 from an initiator 102'. Message 122 was depicted and described in connection with FIG. 3*a* above, and can comprise a DPP authentication request message. Responder 101*x* can process the message 122 and extract the hash 199*e* value of an initiator bootstrap public key Bi 104*a*. Responder 101*x* can (a) query 620 a table 622 with the hash 199*e* value H(Bi) in order to (b) select and read the value for the initiator bootstrap public key Bi 104*a*. The results of a query 620 can comprise a result 621 with key Bi 104*a* and parameters 199*a*. The result 621 (comprising at least one key Bi 104*a* as depicted in FIG. 6*b*) can be used with a set of steps 325 depicted and described in connection with FIG. 3*a* and FIG. 5*a*. Steps 325 can generate a DPP authentication response 123 for initiator 102' using the selected key Bi 104*a* and other PKI keys.

Although not depicted in FIG. 6*b*, for embodiments where responder 101*x* records a plurality of different responder bootstrap PKI keys 101*a* and 101*b*, a query 620 can also be performed by responder 101*x* in order to select one responder bootstrap public key Br 101*a* and the corresponding responder bootstrap private key br 101*b*. Responder 101*x* could record the plurality of different responder bootstrap PKI keys in a table 623, along with a hash value 199*e* for each responder bootstrap public key Br 101*a* (not shown). Upon receipt of a message 122, responder 101*x* could conduct a query 620 using the received hash 199*e* H(Br) for a key Br 101*a* in a table 623 with a plurality of different responder bootstrap public keys Br 101*a* and hash 199*e* values over Br 101*a* comprising H(Br) from message 122 in order to select at least one key Br 101*a* and the corresponding private key br 101*b*. In exemplary embodiments, if the hash 199*e* value received in a message 122 does not match an internally calculated or recorded hash 199*e* value for a recorded responder bootstrap public key Br 101*a*, then responder 101*x* and device 101 remains silent on WiFi link 192, where WiFi link 192 is depicted above in FIG. 3*a*, FIG. 5*a*, etc. Device 101 and responder 101*x* can then wait for a subsequent, different message 122 with different hash 199*e* values for H(Br) in order conduct a subsequent, second query 620 for a matching responder bootstrap public key Br 101*a* in a table 623. Device 101 with responder 101*x* can conduct steps 325 to process message 122 and create message 123 when a matching value for H(Br) is received in a subsequent message 122.

FIG. 7

FIG. 7 is a graphical illustration of an exemplary system, where an access point conducts a configuration step for a device using a hosted device provisioning protocol, in accordance with exemplary embodiments. The present invention contemplates that the systems and methods for using an initiator 102' with a DPP server 103 can support a device provisioning protocol 191 in order to configure a network access point 105'. System 700 in FIG. 7 can include an unconfigured network access point 105', a mobile phone 701, and a network 107. Unconfigured network access point 105' can include a responder 101*x*, where responder 101*x* can have the same or equivalent functionality as a responder 101*x* for a device 101 depicted and described above in FIG.

1a, FIG. 1b, FIG. 1c, FIG. 3a, FIG. 5a, and FIG. 5b. In other words, for the embodiment depicted in FIG. 7, network access point 105' can comprise a device 101. FIG. 7 also illustrates that a device 101 can comprise different possible computing devices with radios for communicating data. Responder 101x in network access point 105' can include a responder bootstrap public key Br 101a, a responder bootstrap private key br 101b, and an initiator bootstrap public key Bi 104a. PKI keys could be recorded in access point 105' before access point 105' is installed at an operating location, such as during manufacturing or distribution of unconfigured access point 105'. Responder 101x operating in unconfigured access point 105' can have responder capabilities of an enrollee.

Mobile phone 701 can comprise a smart phone or a mobile handset, such as a mobile phone manufactured by Apple® or running an Android based operating system. Mobile phone 701 could also comprise another mobile and networked computing device, such as a laptop or a tablet. Mobile phone 701 could include an initiator 102', where initiator 102' could have the same or equivalent functionality as initiator 102' depicted and described in connection with FIG. 1a, FIG. 1b, FIG. 1c, FIG. 1d, FIG. 2a, FIG. 3a, FIG. 5a, FIG. 5b, and FIG. 6a. In exemplary embodiments, initiator 102' can operate as an application for mobile phone 701 downloaded from a repository of mobile phone applications, such as an "app store" or "play store", or possibly a private application. In other words, embodiments herein contemplate that a mobile phone 701 could comprise the physical entity for an initiator 102' and the software or firmware instructions for operation of initiator 102' could comprise a DPP application 102g. Other physical and/or logical arrangements for the operation of an initiator 102' are possible as well, without departing from the scope of the present invention. Mobile phone 701 can have both a Wifi radio 102w and a WAN radio 102h. Mobile phone 701 can communicate with unconfigured access point 105' via the WiFi radio 102w and a network 107 via the WAN radio 102h and an access network 112. Initiator 102' for mobile phone 701 can have capabilities of a configurator.

Network 107 can operate a DPP server 103, where a DPP server 103 in FIG. 7 can have the functionality of a DPP server 103 depicted and described in connection with FIG. 1a, FIG. 3a, FIG. 3b, FIG. 5a, FIG. 5b, and FIG. 6a. Although not depicted in FIG. 7, a network 107 can also operate other supporting servers and/or running processes depicted in FIG. 1a, FIG. 2a, etc. Network 107 could be connected to mobile phone 107 via the access network 112 and an IP network 113 depicted in FIG. 1a.

As depicted in FIG. 7, mobile phone 107 using initiator 102' could conduct the series of messages for a device provisioning protocol 191 with responder 101x operating in unconfigured access point 105'. The series of messages for a device provisioning protocol 191 could comprise the messages 122, 123, 123a, 123b, and 124 as depicted and described in connection with FIG. 3a and FIG. 5a. In order for initiator 102' to send and receive the device provisioning protocol messages 191 depicted in FIG. 7, initiator 102 transmit and receive a series of messages with DPP server 103 in network 107, where the series of messages could comprise a hosted device provisioning protocol 702.

For a first mode 306a, representing embodiments depicted in FIG. 3a (where initiator bootstrap and ephemeral secret keys remain in DPP server 103), the series of messages for a hosted device provisioning protocol 702 could comprise the messages between initiator 102' and DPP server 103 that are depicted in FIG. 3a (e.g. messages 302b, 305, 311, 317, etc.). For a second mode 306a, representing embodiments depicted in FIG. 5a where (i) the initiator bootstrap private key bi 104b can remain in DPP server 103, but (ii) initiator 102' receives, records, and operates with public keys Bi 104a and Br 101a, the series of messages for a hosted device provisioning protocol 702 could comprise the messages between initiator 102' and DPP server 103 that are depicted in FIG. 5a (e.g. messages 302b, 305, 311, 503, 506, 510, etc.). For a third mode 306a, representing embodiments depicted in FIG. 5b where the initiator bootstrap private key bi 104b and responder bootstrap public key Br 101a can remain in DPP server 103, the series of messages for a hosted device provisioning protocol 702 could comprise the messages between initiator 102' and DPP server 103 that are depicted in FIG. 5b (e.g. messages 302b, 305, 311, 521, 522, etc.).

Upon completion of a device provisioning protocol 191 and a hosted device provisioning protocol 702, unconfigured network access point 105' can conduct a configuration step 106 to load a set of network credentials 109 and begin operating with the credentials 109, as depicted in FIG. 7. The configuration step 106 can convert the unconfigured network access point 105' into an operating network access point 105, such that WiFi clients (or "sta") can connect with network access point 105 using a compatible set of network credentials 109. As depicted in FIG. 7, a mobile phone 701 could also operate as an initiator 102' with a roll of a configurator for the access point 105'.

A configuration object for credentials 109 in a message 124 in DPP 191 can specify that the network access point 105' operates as an access point (or "ap"), where the configuration object for credentials 109 in a message 124 in DPP 191 can specify a device 101 in FIG. 1a and FIG. 3a operates as a WiFi client (or "sta"). Note that a configuration object with credentials 109 in message 124 in DPP 191 can also include credentials for network access point 105' to connect with an access network 112. In other words, credentials 109 for network access point 105' can comprise two subsets of credentials 109, where a first subset is for network access point 105' to operate as an access point and a second subset is for network access point 105' to establish a secure session equivalent to secure session 302b with access network 112. Thus, the first subset of credentials 109 can include a first key 109b for a WiFi link 192, and the second subset of credentials 109 can include a second key 109b for an access network 112 and/or network 107.

Mobile phone 701 could also conduct a device provisioning protocol 191 using a hosted device provisioning protocol 702 with DPP server 103 in order to transfer a set of compatible network credentials 109 to device 101 in FIG. 7, such that device 101 could connect with network access point 105'. The compatible network credentials 109 for device 101 can specify that device 101 operates in a WiFi client mode with network access point 105.

FIG. 8

FIG. 8 is a graphical illustration of an exemplary system, where an access point operates as an initiator for a device with a responder, in order transfer a set of network credentials to the device, in accordance with exemplary embodiments. The present invention contemplates embodiments where a network access point 105 can operate as an initiator 102' for a device 101 operating as a responder 101x, in order for the network access point 105 to transfer network credentials 109 to the device 101. System 800 in FIG. 8 can include an unconfigured device 101', a network access point 105, and a network 107.

Network access point 105 in a system 800 can operate with a set of network access credentials 109 and also operate as an initiator 102'. Network access point 105 can connect with a network 107 via an access network 112. Network 107 can operate a DPP server 103, where the function and operation of a DPP server 103 is depicted and described above in connection with FIG. 1a, FIG. 3a, FIG. 5a, etc. Although not depicted in FIG. 8, network 107 could also operate a device database 104 and DPP server 103 could include a server database 103a. Network access point 105 could comprise a WiFi router and operate a WiFi radio. Network access point 105 can have the internal electrical components equivalent to an initiator 102' depicted and described above in connection with FIG. 1d, including a CPU, RAM, nonvolatile memory, and a system bus. For the embodiment depicted in FIG. 8, the initiator 102' in network access point 105 could comprise software, firmware, or a running process within network access point 105. Initiator 102' in network access point 105 could have the same or equivalent functionality as initiator 102' depicted and described in connection with FIG. 1a, FIG. 1b, FIG. 1c, FIG. 1d, FIG. 2a, FIG. 3a, FIG. 5a, FIG. 5b, and FIG. 6a. Network access point 105 could operate with capabilities as a configurator 801, as depicted in FIG. 8.

An unconfigured device 101' could be a device with a WiFi radio 101h and operate a responder 101x. The electrical components inside device 101' could be similar to the electrical components depicted for an initiator 102' in FIG. 1d, such as including a CPU, RAM, nonvolatile memory, an operating system, and a system bus. Responder 101x in unconfigured device 101 could have the same or equivalent functionality as a responder 101x depicted and described above in FIG. 1a, FIG. 1b, FIG. 1c, FIG. 3a, FIG. 5a, and FIG. 5b. Unconfigured device 101' can have capabilities as an enrollee 802.

As depicted in FIG. 8, network access point 105 initiator 102' could conduct the series of messages for a device provisioning protocol 191 with responder 101x operating in unconfigured device 101'. The series of messages for a device provisioning protocol 191 could comprise the messages 122, 123, 123a, 123b, and 124 as depicted and described in connection with FIG. 3a and FIG. 5a. In order for initiator 102' to send and receive the device provisioning protocol messages 191 depicted in FIG. 8, initiator 102' (or AP 105 operating the initiator 102') transmits and receives a series of messages with DPP server 103 in network 107, where the series of messages could comprise a hosted device provisioning protocol 702. The series of messages for a hosted device provisioning protocol 702 were depicted and described in connection with FIG. 7 above. Note that the steps and messages for conducting a hosted device provisioning protocol 702 can depend on a mode 306a, where the mode 306a can be selected by a DPP server 103 in a step 306 for initiator 102' operating in access point 105 in FIG. 8. The present invention also contemplates that a mode 306a for a hosted device provisioning protocol 702 can be selected by an initiator 102'. For these embodiments, where mode 306a is selected by an initiator 102', a selected mode 306a could be transmitted from initiator 102' to DPP server 103 in a message 305 depicted and described in connection with FIG. 3a above.

The combined (i) device provision protocol 191 between network access point 105 and device 101 and (ii) hosted device provisioning protocol 702 between network access point 105 and DPP server 103 can securely transfer a set of compatible network access credentials 109 to device 101'. Upon completion of a device provisioning protocol 191 and a hosted device provisioning protocol 702, unconfigured device 101' can conduct a configuration step 106 to (i) load a compatible set of network credentials 109 for network access point 105 and (ii) begin operating with the credentials 109, as depicted in FIG. 8. The configuration step 106 can convert the unconfigured device 101' into an operating device 101, such that device 101 can conduct a WiFi connection setup step 803 using the received set of compatible network credentials 109.

CONCLUSION

Various exemplary embodiments have been described above. Those skilled in the art will understand, however, that changes and modifications may be made to those examples without departing from the scope of the claims.

The invention claimed is:

1. A method for supporting a device provisioning protocol (DPP), the method performed by a server, the method comprising:
   storing, by the server, an initiator bootstrap private key and an initiator bootstrap public key;
   establishing, by the server, a secure session with a first computing device, wherein the secure session comprises at least authentication of the server with the first computing device;
   receiving, by the server and from the first computing device, (i) at least a portion of a tag value for a second computing device and (ii) a networks available list;
   selecting a responder bootstrap public key using the portion of the tag value;
   receiving, by the server and from the first computing device, a responder ephemeral public key, wherein the responder ephemeral public key is generated by the second computing device;
   conducting, by the server, an elliptic curve point addition with the responder bootstrap public key and the responder ephemeral public key to derive a point;
   conducting, by the server, an elliptic curve Diffie-Hellman key exchange using the point and the initiator bootstrap private key in order to derive a shared secret;
   sending, from the server and to the first computing device, the shared secret;
   receiving, by the server and from the first computing device, a configuration attribute for the second computing device;
   selecting, by the server, a set of network credentials for the second computing device using (i) the configuration attribute and (ii) the networks available list;
   encrypting, by the server, the set of network credentials; and
   sending, from the server and to the first computing device, the encrypted set of network credentials.

2. The method of claim 1, further comprising receiving, by the first computing device and from the second computing device, a tag value for a responder.

3. The method of claim 1, further comprising:
   sending, by the first computing device and to the second computing device, an initiator nonce, wherein the initiator nonce is encrypted using at least a first shared secret derived by the first computing device; and,
   receiving, by the first computing device and from the second computing device, a responder ephemeral public key for the second computing device.

4. The method of claim 1, wherein the secure session comprises at least mutual authentication of the server and the first computing device.

5. The method of claim 1, wherein the first computing device comprises an initiator and the second computing device comprises a responder, and wherein the responder ephemeral public key comprises a responder protocol public key.

6. The method of claim 5, wherein the first computing device comprises a mobile phone operating a software application for the initiator, and wherein the initiator derives an initiator ephemeral public key and an initiator ephemeral private key.

7. The method of claim 1, further comprising sending, by the server and to the first computing device, the responder bootstrap public key, wherein the first computing device derives a shared secret M using the responder bootstrap public key and an initiator ephemeral public key.

8. The method of claim 1, wherein the tag value includes the responder bootstrap public key, wherein the portion of the received tag value comprises the responder bootstrap public key, and wherein the first computing device derives a shared secret M using the responder bootstrap public key and an initiator ephemeral public key.

9. A method for supporting a device provisioning protocol (DPP), the method performed by a network, the method comprising:
   storing, by the network, an initiator bootstrap private key;
   establishing, by the network, a secure session with a computing device, wherein the computing device and the network mutually authenticate for the secure session, and wherein the network receives a responder bootstrap public key for a responder via the secure session;
   sending, by the network and to the computing device, (i) an initiator bootstrap public key for the initiator bootstrap private key, and (ii) an initiator configuration;
   receiving, by the network and from the computing device, a responder ephemeral public key;
   conducting, by the network, a first elliptic curve Diffie-Hellman (ECDH) key exchange using the responder bootstrap public key, the responder ephemeral public key, and the initiator bootstrap private key in order to derive a shared secret key;
   sending, by the network and to the computing device, the derived shared secret key via the secure session;
   receiving, by the network and from the computing device, a configuration attribute for the responder;
   selecting, by the network, a set of network credentials for the responder using the configuration attribute; and
   sending, by the network and to the computing device, the set of network credentials.

10. The method of claim 9, wherein the network includes a database and a DPP server, and wherein the database stores the initiator bootstrap private key and the DPP server conducts the first ECDH key exchange.

11. The method of claim 9, wherein the computing device reads a tag value with the responder bootstrap public key from the responder, and wherein the computing device establishes a DPP session with the responder over a WiFi connection.

12. The method of claim 9, wherein the derived shared secret key comprises a value of "L" according to the DPP.

13. The method of claim 9, wherein the computing device derives an initiator ephemeral private key at least for conducting a second ECDH key exchange, wherein the second ECDH key exchange derives a value of "M" according to the DPP, and wherein the computing device derives the value of "M" before the computing device sends a DPP authentication request message.

14. The method of claim 13, further comprising decrypting, by the computing device, a ciphertext of the configuration attribute using at least (i) the shared secret key derived by the network, and (ii) the value of "M".

15. A mobile device for supporting a device provisioning protocol (DPP), the mobile device comprising:
   a camera for reading a tag value associated with a WiFi device;
   a WAN radio for establishing a secure session with a server, for sending the tag value to the server, for receiving from the server (i) an initiator configuration, (ii) a first hash value of an initiator bootstrap public key, and (iii) a first ciphertext;
   a WiFi radio for operating with a user configuration before the mobile device reads the tag value, for operating with the initiator configuration after the mobile device reads the tag value, for transmitting a DPP authentication request message with the first ciphertext and the first hash value, and for receiving a DPP authentication response message with a second ciphertext and a responder ephemeral public key;
   a nonvolatile memory for storing (i) the user configuration while the WiFi radio operates with the initiator configuration and (ii) a DPP application for conducting the DPP over the WiFi radio;
   a processor for validating the responder ephemeral public key, for encrypting the responder ephemeral public key and the second ciphertext for the secure session, and for storing a third ciphertext from the server, wherein the third ciphertext includes data for a DPP authentication confirm message; and
   a data bus for electrically connecting the camera, the WAN radio, the WiFi radio, the nonvolatile memory, and the processor and for transferring a fourth ciphertext with a set of credentials for the WiFi device from the WAN radio to the WiFi radio.

16. The mobile device of claim 15, wherein the mobile device (i) does not store and (ii) does not receive the responder bootstrap public key for the WiFi device.

17. The mobile device of claim 15, wherein the DPP application applies the user configuration to the WAN radio after the mobile device sends the set of credentials to the WiFi device, and wherein the mobile device comprises at least one of (i) a mobile phone, (ii) a tablet computer, and (iii) a laptop computer.

18. The mobile device of claim 15, wherein the WiFi device comprises a responder for the DPP, and wherein the DPP authentication request message is transmitted by the mobile device as a broadcast message over a WiFi link using the initiator configuration.

19. The mobile device of claim 15, wherein the server records an initiator bootstrap private key corresponding to the initiator bootstrap public key, wherein the mobile device receives a second hash value of the initiator bootstrap public key via the secure session, and wherein the DPP authentication request message includes the second hash value.

20. The mobile device of claim 15, wherein the third ciphertext is encrypted with a symmetric ciphering key, and wherein the symmetric ciphering key is derived using an elliptic curve Diffie Hellman (ECDH) key exchange and at least (i) an initiator bootstrap private key, (ii) a responder bootstrap public key, and (iii) the responder ephemeral public key.

21. The mobile device of claim 20, wherein the WiFi radio transmits a DPP authentication confirm message that includes the third ciphertext, wherein the WiFi radio receives a DPP configuration request message after the WiFi radio transmits the DPP authentication confirm message, wherein the WiFi radio transmits a DPP configuration response message with the fourth ciphertext to the WiFi device, and wherein the fourth ciphertext is encrypted with the symmetric ciphering key.

* * * * *